United States Patent [19]
Weir et al.

[11] Patent Number: 5,937,185
[45] Date of Patent: Aug. 10, 1999

[54] METHOD AND SYSTEM FOR DEVICE VIRTUALIZATION BASED ON AN INTERRUPT REQUEST IN A DOS-BASED ENVIRONMENT

[75] Inventors: Andrew P. Weir, Blue Bell; Joseph T. Friel, Havertown, both of Pa.

[73] Assignee: Creative Technology, Inc., Singapore

[21] Appl. No.: 08/988,913

[22] Filed: Dec. 11, 1997

Related U.S. Application Data

[63] Continuation-in-part of application No. 08/712,363, Sep. 11, 1996, Pat. No. 5,790,837.
[51] Int. Cl.$^6$ .............................. G06F 12/08; G06F 9/455
[52] U.S. Cl. ................... 395/500.45; 395/561; 395/580; 395/868; 395/680; 711/203
[58] Field of Search ...................................... 395/500, 712, 395/868, 870, 653, 580, 561, 680, 681, 684; 711/203, 2

[56] References Cited

U.S. PATENT DOCUMENTS

| | | | |
|---|---|---|---|
| 5,293,590 | 3/1994 | Keener et al. ............................ | 395/325 |
| 5,303,378 | 4/1994 | Cohen ...................................... | 395/700 |
| 5,390,332 | 2/1995 | Golson .................................... | 395/725 |
| 5,459,869 | 10/1995 | Spilo ...................................... | 395/700 |

OTHER PUBLICATIONS

Phar Lap Software, Inc., "Virtual Control Program Interface," Version 1.0, Jun. 12, 1989, 22 pages.
*Encyclopedia of Computer Science*, Third Edition, IEEE Press, 1993, p. 486.
Intel, "386™ DX Microprocessor," *Microprocessors*, 1989, pp. 4–190 to 4–191.
Adrian King, "Inside Windows™ 95," *Microsoft Press*, Chapter Two, pp. 33–43.
Microsoft Corporation, "Microsoft MS–DOS 6 User's Guide," 1993, Chapter 4, pp. 87–89 and Chapter 6, pp. 131–132.

*Primary Examiner*—Kevin J. Teska
*Assistant Examiner*—Thai Phan
*Attorney, Agent, or Firm*—Woodcock Washburn Kurtz Mackiewicz & Norris LLP

[57] ABSTRACT

A technique for providing device virtualization in an MS-DOS based operating environment, using an interrupt request (e.g., a non-maskable interrupt), is described. The technique includes executing an application on a processor within the MS-DOS based operating environment and, when the application attempts to address the device to be emulated, causing a processor interrupt to occur. In response to the interrupt, the processor executes code representing the virtualization of a device. The code for servicing the interrupt and emulating the device are written in protected-mode code, stored in the extended memory area, and made available by making appropriate entries into the interrupt descriptor tables (IDTs) for the protected-mode contexts which exist for the native protected-mode operating systems and for the DOS extender. The entries made into the IDT for the protected-mode context established for the DOS extender are accomplished by intercepting communications between the DOS extender and the virtual control program interface (VCPI) and patching the DOS extender's IDT with the vectors to the stored emulation code.

11 Claims, 8 Drawing Sheets

METHOD AND SYSTEM FOR DEVICE VIRTUALIZATION BASED ON AN INTERRUPT REQUEST IN A DOS-BASED ENVIRONMENT

CROSS-REFERENCE TO RELATED APPLICATIONS

The present application is a continuation-in-part of U.S. patent application Ser. No. 08/712,363, filed Sep. 11, 1996 U.S. Pat. No. 5,790,837, issued Aug. 4, 1998 by the present assignee. The contents of that application are hereby incorporated by reference.

COPYRIGHT NOTICE

A portion of the disclosure of this patent document contains material which is subject to copyright protection, particularly Appendices A, B and C. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention generally relates to computer software and, more particularly, it relates to the use of an interrupt request for triggering device virtualization services in a DOS-based operating system environment.

2. Description of the Prior Art

MS-DOS is Microsoft's 16-bit operating system which runs on PC-XT- and PC-AT- type personal computers (PCS). This operating system (OS) was originally developed for the Intel 8086 and 8088 microprocessors which operate in what is generally referred to as "real-mode." Real-mode refers to the way the microprocessor handles memory (i.e., providing the user with a single-tasking working environment in which programs can freely access system memory and input/output devices). It is noted that real-mode, by itself, does not include features such as memory management or protection.

Today's personal computers are equipped with more advanced processors from Intel, specifically the 80386, 80486, and Pentium, all of which are capable of running 8086-compatible code (real-mode). These processors, however, have a more advanced 32-bit protected-mode which provides hardware support for multitasking, data security and virtual memory. Among other things, protected-mode allows access to more random access memory (RAM) than the 1 megabyte (MB) that the standard real-mode MS-DOS operating system permits (additional details described in King, A., "Inside Windows 95", Microsoft Press, pp. 33–43, 1994, which is herein incorporated by reference).

A typical memory configuration of a personal computer is shown in FIG. 1. The memory configuration of FIG. 1 shows a memory area 110 containing 640 kilobytes (K) of conventional memory. Because MS-DOS is designed for managing this conventional memory, an additional memory manager is not required. All MS-DOS based programs require conventional memory.

The remainder of the standard 1 MB is referred to as the upper memory area 112 which comprises 384K of memory above the 640K of conventional memory. The upper memory area 112 is generally used by system hardware, such as a display adapter. Unused parts of the upper memory area 112 are called upper memory blocks (UMBs). On any PC, UMBs can be used for running device drivers and memory-resident programs as described below.

An extended memory (XMS) area 114 is memory located beyond the 1 MB boundary on computers with 80286, 80386 or 80486 processors. Extended memory requires an extended-memory manager, such as HIMEM. A high memory area (HMA) 116 is approximately the first 64K of the extended memory area 114. The HMA 116 is a small address region, slightly less than 64K, above the 1 MB boundary that can be accessed by real-mode code. The address region of the HMA is from 100000h through 10ffefh. On a computer with extended memory, the setup program can install MS-DOS to run in the HMA 116. This provides more conventional memory to be available for other software programs.

Another type of memory available, as shown in FIG. 1, is known as expanded memory. An expanded memory board (EMS) 118 contains additional memory that some MS-DOS based applications can use. Most personal computers accommodate expanded memory. Expanded memory is installed on an expanded memory board 118 and requires an associated expanded memory manager. Computer software programs use expanded memory 64K at a time by addressing a part of the upper memory area 112 known as the EMS page frame. Because an expanded memory manager gives access to a limited amount of expanded memory at a time, using expanded memory is slower than using extended memory. A conventional software program such as EMM386 can simulate expanded memory using extended memory for programs that require it.

As MS-DOS matured through the 1980s, much of its functionality was added in the form of device drivers. As set forth in the Encyclopedia of Computer Science, Third Edition, IEEE Press (1993), which is hereby incorporated by reference, a device driver is a program or subprogram that is written to control either a particular hardware device or another software routine. This low-level software program is loaded into memory after the operating system boots and remains in memory for the duration of the operating session. As mentioned, the device driver can deal directly with the hardware of a particular device. The device driver is capable of responding to hardware and software interrupts and interfacing to the operating system through an established MS-DOS device driver protocol in order to serve as an interface between such hardware or software and the operating system (described in "Microsoft MS-DOS 6 User's Guide", Microsoft Corporation, pp. 87–89, 1993, and which is also hereby incorporated by reference). It should be noted that device drivers are generally limited in size to 64K bytes.

In addition to device drivers, MS-DOS also uses memory-resident software programs, often referred to as terminate-and-stay-resident programs (TSRs). These programs are executed like normal software programs, but after termination, a portion of the program remains installed in memory in order to monitor and/or service hardware or software interrupts. TSRs can also interface with the operating system in a limited sense, but they do not use the MS-DOS device driver protocol.

Both device drivers and TSRs are typically real-mode code and reside in memory below the MS-DOS 1 MB limit. In many cases, these resident software programs reside within the conventional 640K of memory which is normally used by MS-DOS to load and execute programs. As mentioned above, they may reside above the conventional 640K in the upper memory area 112 when, for example, a memory optimizing routine is executed such as MemMaker (additional details are provided in MS-DOS User's Guide, beginning on page 131). In this case, the driver or TSR would be placed into the upper memory area 112 with a link to its location placed in the 640K conventional memory 110 to indicate its memory location in the upper memory area 112. Even so, as more and more device drivers and TSRs are loaded into a system, the maximum allowable memory area for MS-DOS programs, drivers and TSRs is rapidly reduced.

To further illustrate the functional inter-relationships of MS-DOS, device drivers, hardware, etc., FIGS. 2 through 4 illustrate the evolution, from a functional perspective, beginning with the original MS-DOS real-mode environment up to present day environments allowing for protected-mode and DOS extenders. It is noted that the functional interrelationships shown in FIGS. 2 through 4 are well known to those of ordinary skill in the art and well documented as well; therefore, each figure is only briefly described. A more comprehensive treatment of DOS extenders and their evolution is provided in Duncan et al., *EXTENDING DOS, A Programmer's Guide to Protected-Mode DOS,* 2nd Edition, Addison-Wesley (1992), which is herein incorporated by reference for its teaching of DOS extenders and associated aspects relevant herein.

FIG. 2 shows a block diagram of a conventional DOS operating environment with no memory management services. This operating environment is similar to that used in the 8086- and 8088-based PCS. The hardware 210 sends an interrupt request, represented by the dotted line 211, to the DOS operating system 212 which is initially serviced by the DOS Interrupt Vector Table 213. Based on the entries in Interrupt Vector Table 213, the interrupt request can be directed to the DOS OS 212, device drivers 214, TSRs 216, etc. Similarly, software interrupts generated by programs 218 are serviced by the DOS Interrupt Vector Table 213 and directed as appropriate.

As mentioned above, with the release of more powerful Intel processors in the late 1980s, special "extensions" to the standard MS-DOS operating system were developed to allow MS-DOS programs to easily access computer memory that would not otherwise be addressable using real-mode code. These extensions (i.e., device drivers) to the operating system take advantage of the protected-mode features of the 80X86 processors while allowing MS-DOS to continue executing in real-mode. These device drivers implement, as a minimum, memory management services referred to as EMS and XMS services. These services allow software programs to store and retrieve large amounts of data from the memory pool above the 1 MB boundary. However, they do not allow software programs to occupy this memory for execution purposes. The well known programs provided by Microsoft to implement this functionality are called HIMEM-SYS and EMM386.EXE.

FIG. 3 shows a block diagram of a conventional DOS operating environment with conventional memory management services 312 installed for managing the extended memory area 114. This operating environment is similar to that used in 80286-based PCS through Pentium-based PCS. As shown in FIG. 3, a protected-mode operating system 310 executes above the DOS operating system 212. An interrupt request 311 generated in this environment passes first into the protected-mode operating system 310 allowing for higher level management. As shown, the interrupt request 311, based on entries in an Interrupt Descriptor Table (IDT, described in more detail below), may be directed to memory management services 312, to the Virtual Control Program Interface (VCPI) 314, to the default DOS service via the DOS Interrupt Vector Table 213, or the like, as in the FIG. 2 type systems. As shown, the protected-mode OS includes the IDT 318 as well as a GDT 320. Additional details of the operation of the VCPI are described in the Virtual Control Program Interface specification, Version 1.0, (1989), which is herein incorporated by reference for its teachings regarding the operation of a VCPI.

Concurrent with the development of these memory extensions was the development of DOS extenders. FIG. 4 shows a block diagram of a conventional DOS operating environment with memory management services 312 installed and a DOS extender 410 running. DOS extenders are low-level software components that allow programs to be executed in protected-mode under MS-DOS. The DOS extender 410 allows protected-mode applications 412 to communicate with hardware and the operating system and vice versa.

These programs can use the vast amount of memory above 1 MB to execute code as well as to store and retrieve data. However, the DOS extenders do not allow executable code to permanently reside in memory above the 1 MB boundary; rather, upon switching into protected-mode, the DOS extenders can temporarily copy executable code into the extended memory area for purposes of execution, but upon termination, it no longer exists in extended memory. Even so, the DOS extenders allow programs to apply a much simpler and much more powerful programming model. DOS extenders achieve their task by switching the processor into protected-mode while running the program, and switching the processor back to real-mode when the program completes.

The DOS extenders also switch the processor in and out of real-mode during the program execution when MS-DOS functions need to be called, or when device drivers or TSRs need to run. To do this, the DOS extender must be in complete control of the system. Thus, a new protected-mode operating environment is created by the DOS extender. As shown in FIG. 4, the newly created protected-mode operating environment created by the DOS extender 410 includes its own IDT 418 and GDT 420. It is noted, however, that when the DOS extender switches back to real mode it then uses system IDT 318 and system GDT 320.

In systems with memory management enabled, as shown in FIGS. 3 and 4, the device drivers that provide these services create their own protected-mode environment and already have MS-DOS running as a (virtual 8086) real-mode task. Therefore, they provide contention management services to negotiate memory allocation and mode switching between themselves and DOS extenders. This contention management is implemented by all memory managers today via the VCPI 314. If a DOS extender 410 determines that a VCPI 314 is present in a system, it uses this interface to acquire its protected-mode context and to perform its mode switching (real versus protected). In most cases, the DOS extender 410 also allocates all of its required program memory through the VCPI 314.

With this evolution in mind, as available memory, as well as processing power, continue to increase, it is desirable to make efficient use of these computing resources to provide device virtualization, thereby reducing the amount of hardware necessary to provide desirable features.

The 80386 and later processors do generally provide for hardware virtualization by allowing certain instructions to be "trapped." Specifically, if a program executes an "IN" or "OUT" (I/O) instruction, a General Protection Fault handler can be invoked to decide whether or not to let the IN/OUT execute and/or whether or not to emulate the presence of some hardware. This "I/O Trapping" can be applied to any process running below processor privilege level (or ring) 0. Unfortunately, most DOS extenders (Rational Systems' DOS4GW for example) run at ring 0, thus they are not subject to the 80386 I/O trapping mechanism.

In addition to the 80386 I/O trapping mechanism, at least one hardware manufacture has used a combination of external hardware interrupts and software to replace the functions of more costly hardware. Specifically, Advanced Gravis has used a technique which combines a Non-Maskable Interrupt (NMI) and a DOS TSR to virtualize hardware. Although this technique provides hardware virtualization for applications executing in real-mode, it does not provide virtualization for applications executing under a DOS extender, since there is no predetermined method for the operating system to direct the interrupt services of the DOS extender.

There is, therefore, a real need to provide an efficient way of performing device virtualization which is also accessible by DOS extenders.

SUMMARY OF THE INVENTION

The present invention involves a technique for providing device virtualization in a DOS based operating environment including the steps of executing an application, under a DOS extender, on a processor within the DOS-based operating environment, where the application executes within a protected-mode context created for the DOS extender and the protected-mode context includes an interrupt descriptor table (IDT). A processor interrupt is generated when the application addresses a predetermined address related to the device to be emulated and, responsive to the processor interrupt, an appropriate entry in the IDT associated with the protected-mode context of the DOS extender is referenced. In accordance with the invention, the DOS extender's IDT is patched at run-time to vector to device emulation software, thereby allowing the processor to execute computer code designed to emulate the device even though the DOS extender was not present at boot time.

The IDT is patched at run-time in accordance with the invention by intercepting VCPI far-calls or, in a presently preferred embodiment, by also intercepting the VCPI "Switch to Protected Mode" call. In particular, a new VIVO driver of the invention intercepts Int 67h handler calls from DOS virtual 8086 (real mode) software. Int 67h handler, function de0ch, is the VCPI "Switch to Protected Mode" call which is made by the DOS extender when it is in real mode, running under the system's protected mode context. It is a request from the DOS extender asking the VCPI to switch the DOS extender into protected mode and to apply the DOS extender's protected mode context to the system. The VIVO driver also intercepts VCPI far calls by monitoring Int 67h handler, function de01h, which is the VCPI "Get Protected Mode Interface" call.

In accordance with the presently preferred embodiment of the invention, the DOS extender makes the VCPI "Switch to Protected Mode" and "Get Protected Mode Interface" calls at system startup and many times after that during the normal execution of the protected mode application running under the DOS extender. Because the DOS extender is asking the VCPI to apply a new protected mode context, the DOS extender must tell the VCPI what that context is, and so it passes the VCPI (among others) at least the following: physical address of the Page Directory, linear address and size of the DOS extender's GDT and the DOS extender's IDT, and the like. These arguments tell the VIVO driver of the invention where the DOS extender's GDT and IDT are. By temporarily switching the processor's Page Directory, the VIVO driver can access the DOS extender's IDT and patch it with the appropriate vector to the stored emulation code.

In particular, the VIVO driver of the invention performs the following steps to patch the DOS extender's IDT during run-time. First, the VIVO driver intercepts Int 67h, function de0ch (switch to protected mode). The VIVO driver then switches the processor's page directory to that of the DOS extender, which was specified by the DOS extender in the VCPI call. This allows the VIVO driver to properly access the DOS extender's GDT and IDT at run-time. The VIVO driver then checks to see if its IDT entries have already been made into the DOS extender's IDT. If so, it checks to see if the selector entry in the DOS extender's IDT indicates the appropriate entry in the DOS extender's GDT, where the selector entry includes the GDT entries that get installed into the DOS extender's GDT when the VCPI get protected mode interface is called by the DOS extender. If either the DOS extender's IDT entry does not exist, or the selector entry does not match the DOS extender's GDT entry, the VIVO driver's code searches the DOS extender's GDT to find out what selector value corresponds to the VIVO emulation code and then makes the appropriate DOS extender IDT entry using the selector value. The VIVO driver then switches the processor page directory back to that of the system's protected mode context and jumps to the real VCPI switch call. The patched DOS extender IDT may now be used to emulate the device that caused the interrupt to be generated.

BRIEF DESCRIPTION OF THE FIGURES

The above and other beneficial features and advantages of the invention will become more apparent from the following detailed description of the invention, of which.

DETAILED DESCRIPTION OF THE EXEMPLARY EMBODIMENTS

Overview

As mentioned above in the Background section, device virtualization, in general, is known. Unfortunately, when running in the context of DOS extenders (e.g., Rational Systems' DOS4GW), device drivers cannot take advantage of the I/O trapping mechanism, nor can they take advantage of Advanced Gravis technique mentioned above in the Background section. Because many present day applications use DOS extenders for various reasons, a device virtualization technique should be accessible by applications running under DOS extenders.

Generally, the present invention provides device virtualization, in an MS-DOS based operating environment, by way of an interrupt request (e.g. non-maskable interrupt) for applications running with or without a DOS extender. The present invention dynamically extends its device virtualization capabilities to applications running under DOS extenders by intercepting communications between the DOS extender and the VCPI at run-time. In particular, when an executing application requests the use of a particular device (e.g., requesting a predetermined I/O address), a processor interrupt request is generated. In response to the interrupt request, the device virtualization code for that particular device can be accessed and executed even for applications running under DOS extenders. It is noted that, in the exemplary embodiment, the present invention relies on the presence of a memory manager, or an equivalent thereof, to provide for a primary protected-mode operating environment including the system IDT and system GDT.

Figure 1:
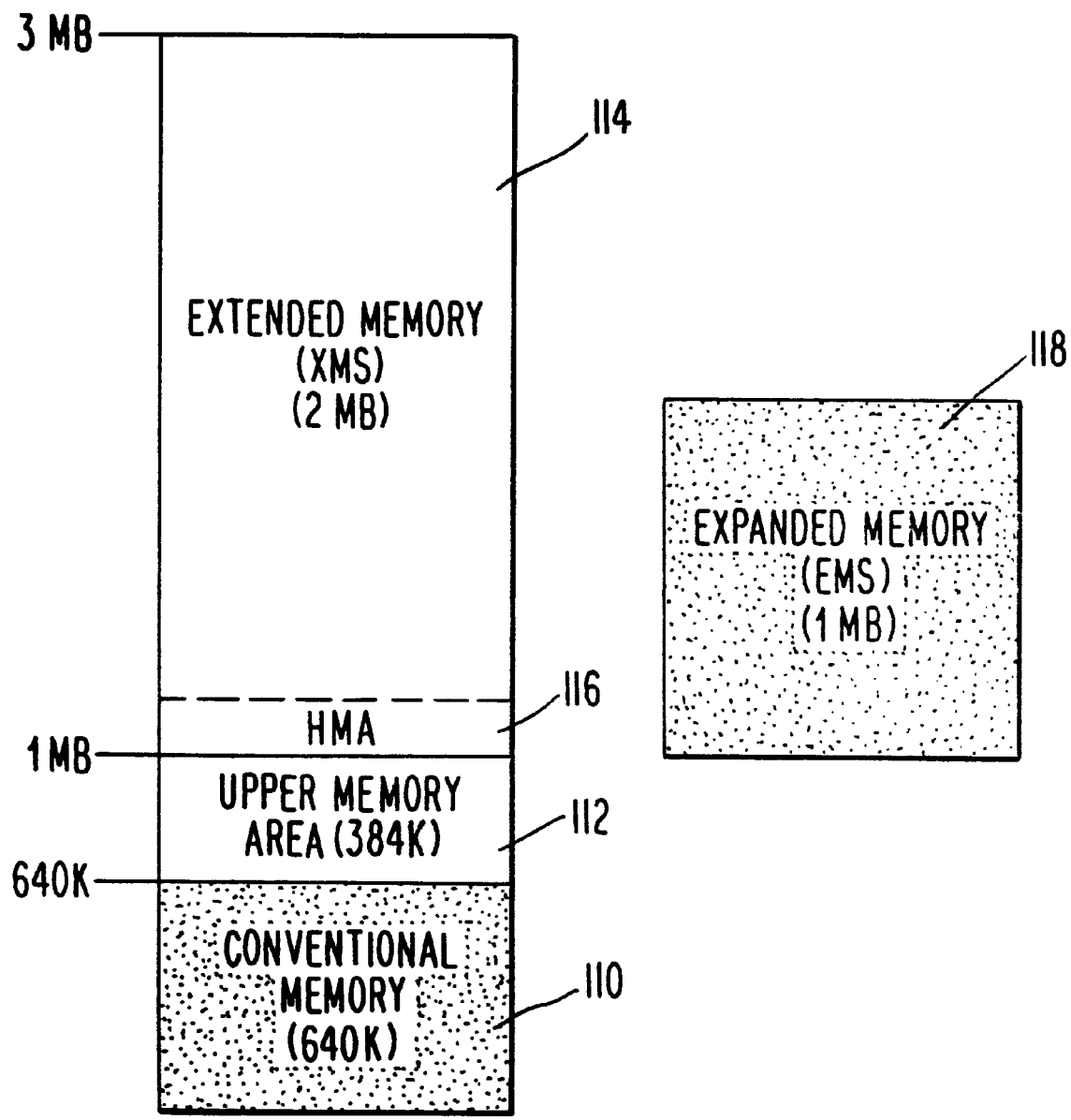
FIG. 1 is a block diagram of a conventional memory configuration of a personal computer.
Figure 2:
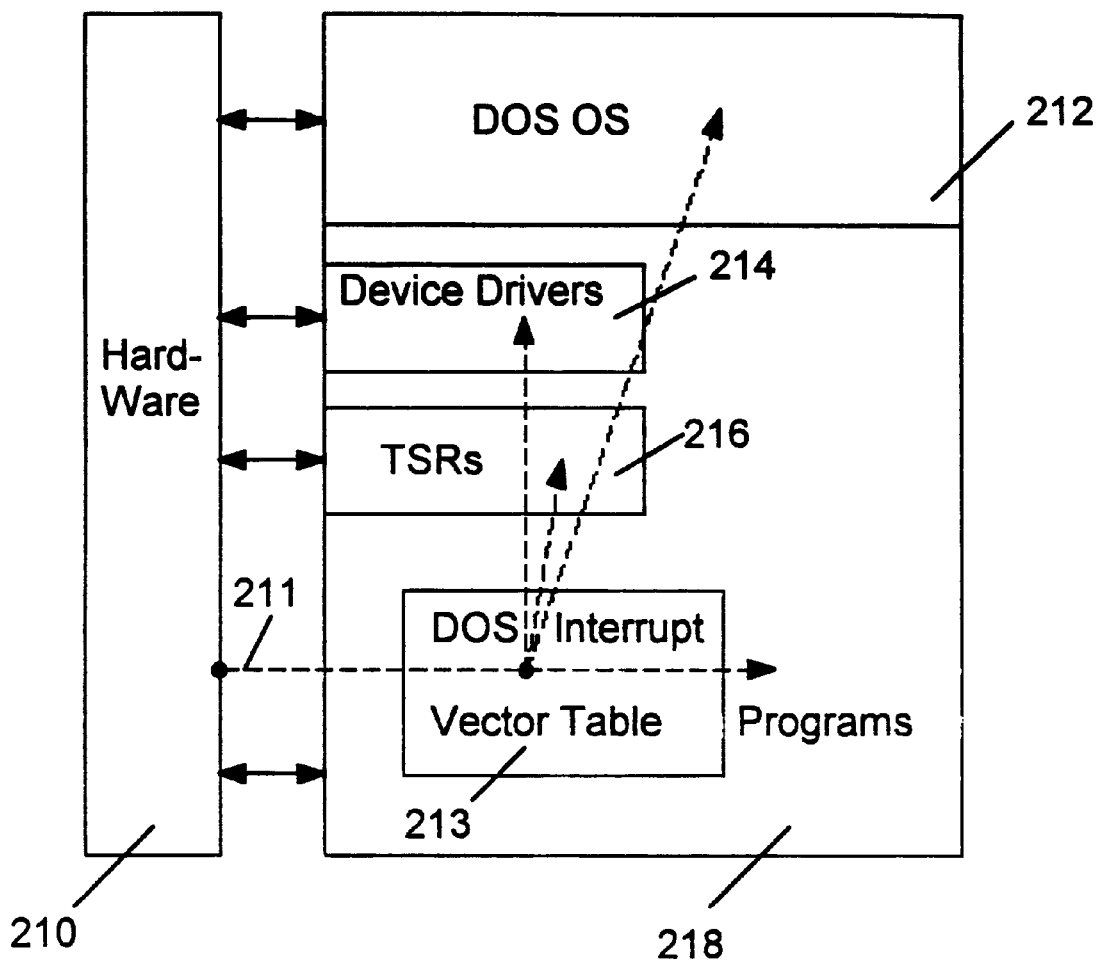
FIG. 2 is a high-level functional block diagram of a conventional DOS operating environment.
Figure 3:
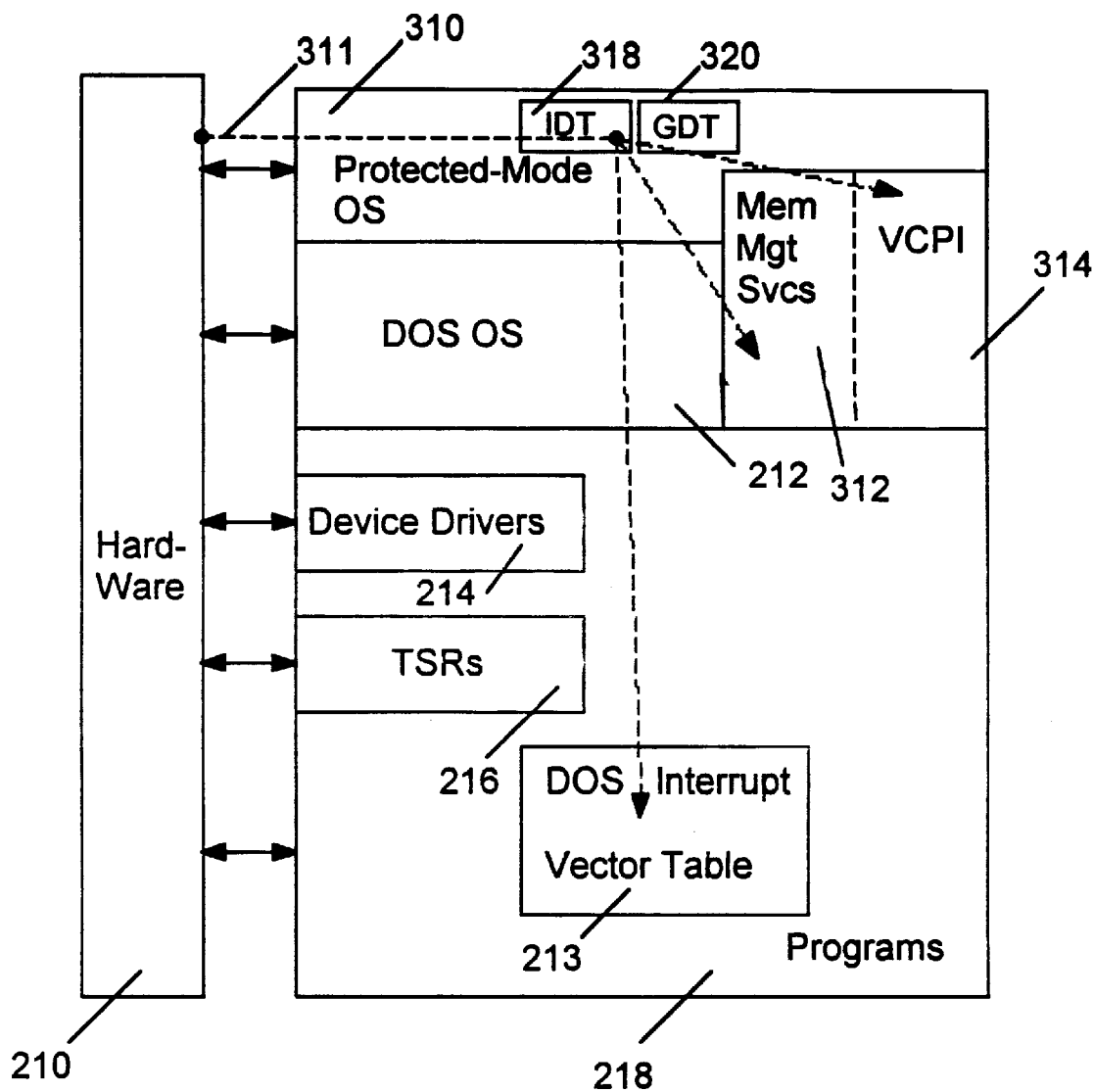
FIG. 3 is a high-level functional block diagram of a conventional DOS operating environment with memory management services installed.
Figure 4:
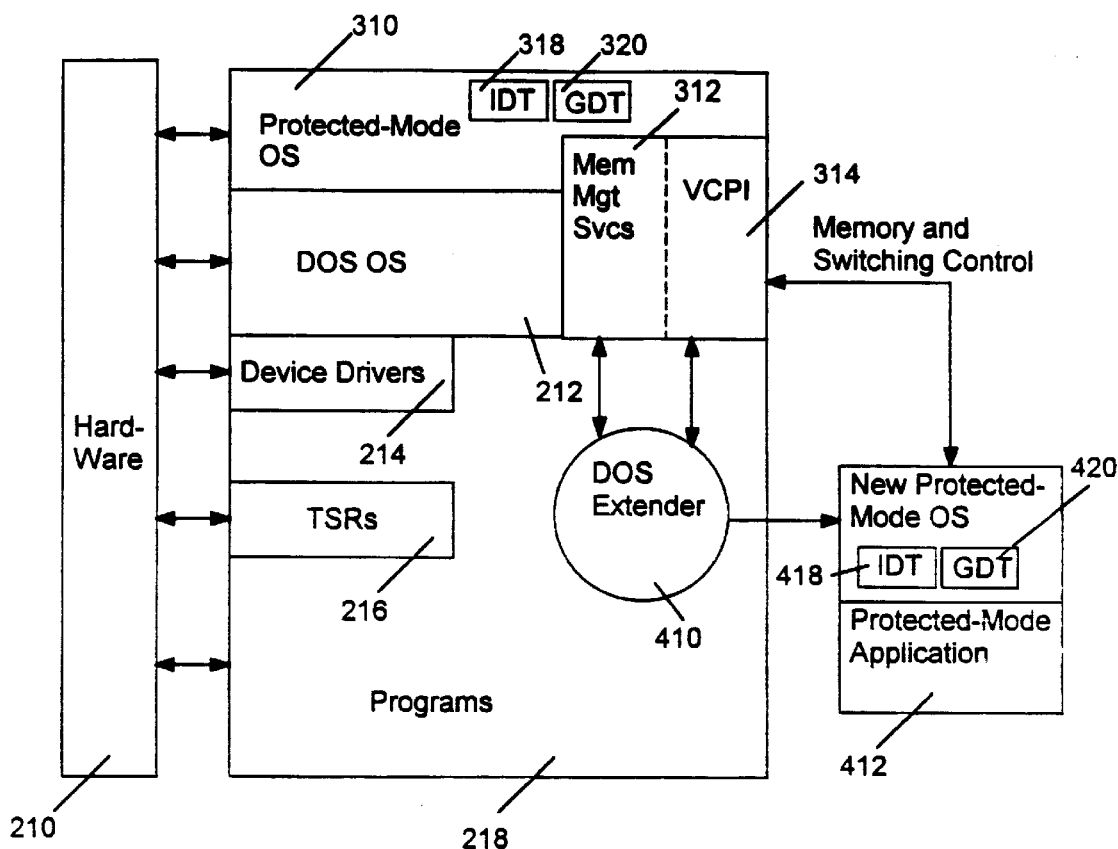
FIG. 4 is a high-level functional block diagram of a conventional DOS operating environment illustrating the functional relationships of DOS with memory management services and DOS extenders.
Figure 5:
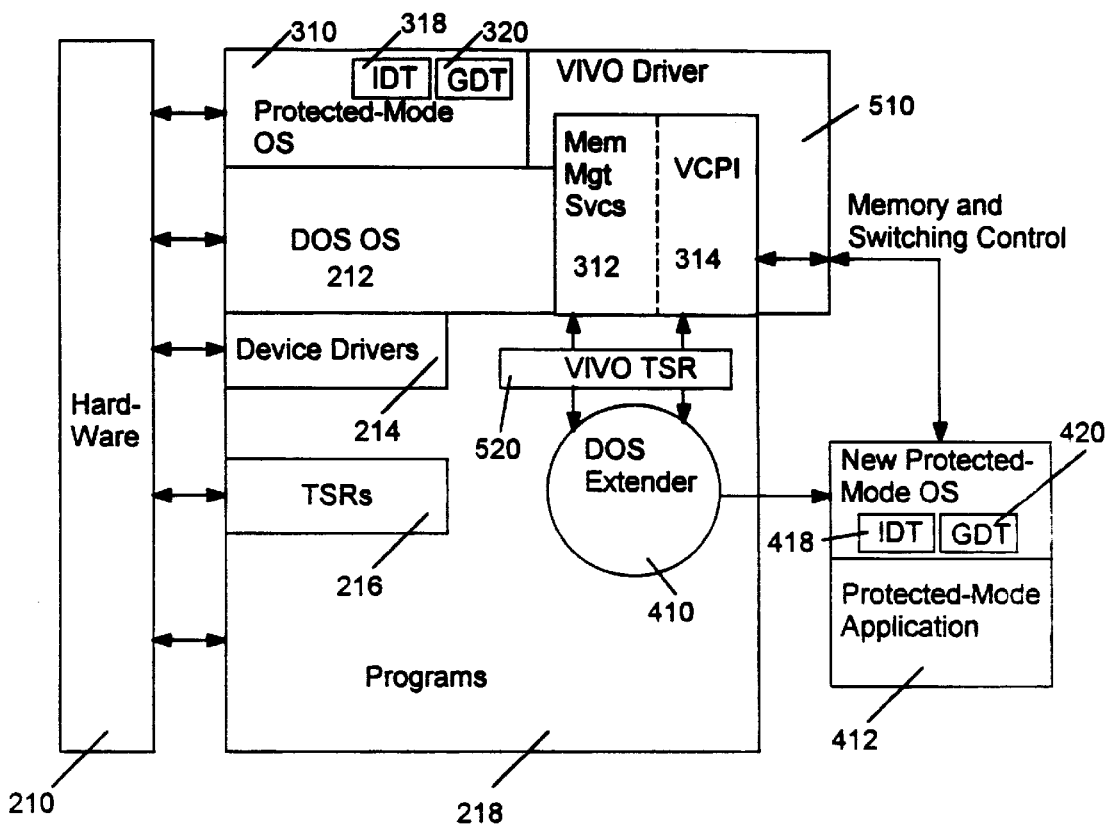
FIG. 5 is a high-level functional block diagram of a DOS operating environment as it relates to an exemplary embodiment of the present invention.

FIG. 5 is a block diagram illustrating the functional relationship between conventional operating system components in a typical MS-DOS environment as described in the Background section with reference to FIGS. 2 through 4 and is an exemplary embodiment of the present invention.

As shown in FIG. 5, the present invention functionally represents a new functional layer working in conjunction with the protected-mode operating system 310. This new layer is referred to, for purposes of this specification, as VIVO driver 510. Essentially, the VIVO driver 510 becomes an extension of the protected-mode operating system that supervises MS-DOS and DOS extenders instead of simply becoming an extension of MS-DOS itself, as is the case with standard device drivers and TSRs. In the exemplary embodiment of the present invention, in addition to VIVO driver 510 which represents a driver designed to provide the device virtualization services, a VIVO TSR 520 is provided to aid in the dynamic extension of the services by the VIVO driver 510 for use with DOS extenders 410.

The present invention includes loading protected-mode executable code, including an interrupt service routine and device virtualization code, into memory, and entering the associated interrupt service vector directly into the protected-mode operating system's interrupt descriptor table (IDT) 318. The use of IDTs is well known and additional details of descriptor addressing are described beginning on page 41 of the Windows '95 reference incorporated herein. Additional teachings on the use of IDTs can be found in *Microprocessors,* Intel (1989), which is also herein incorporated by reference. Briefly, the protected-mode IDT 318 determines interrupt vectoring instead of the DOS Interrupt Vector Table 213 even when the protected-mode operating system 310 is running real-mode code. In many cases, such as MS-DOS operating system calls, the services indicated by the IDT entries in IDT 318 simply pass control to the real-mode services indicated by the DOS interrupt vector table that were installed by MS-DOS. As well as being faster and more efficient than real-mode interrupt handlers, using the protected-mode IDT 318 makes the services of the present invention unconditionally available to the system whether it is running in real- or protected-mode.

The present invention, by way of the VIVO TSR 520, uses the VCPI 'Get Protected-mode Interface' real-mode call (Int 67h, function de01h) or the VCPI 'Switch to Protected Mode' real-mode call (Int 67h, function de0ch) to intercept VCPI calls to patch the DOS extender's IDT. Initially, the strategy was to force all of the DOS extender's 410 subsequent VCPI 314 protected-mode "far calls" to "pass through" the VIVO driver 510, where the "Get Protected-mode Interface" was used by a DOS extender 410 at startup to acquire a protected-mode context. When the VIVO driver 510 intercepted these far calls, it was running under the context of the DOS extender's protected-mode operating system (IDT 418, GDT 420). At this point, the VIVO driver 510 installed its interrupt service vector into the DOS extender's IDT 418 making the VIVO driver's device virtualization service available to the DOS extender 410 (and its applications) until it terminates.

However, in accordance with a presently preferred embodiment of the invention, the strategy for making the actual patch entry into the DOS extender's IDT 418 is changed. Rather than patching the DOS extender's IDT 418 during any VCPI far call intercept, the patch is now performed at the intercept of the VCPI 'Switch to Protected Mode' call (Int 67h, function de0ch). In this fashion, application programs running under DOS extenders are prevented from generating I/O related interrupts after the switch to protected mode but before any VCPI far calls are made.

Although the present invention is designed to operate using most any interrupt request, the exemplary embodiment of the present invention uses the non-maskable interrupt (NMI) as the interrupt request for triggering the device virtualization routine. It is noted that, historically, the NMI has been used by system motherboard logic to notify the operating system of a RAM (memory) parity error, or by I/O devices to notify the operating system of some "unrecoverable" error. Today, however, the RAM parity no longer exists and I/O devices do not implement NMI generation. A typical DOS extender's NMI handler, however, not knowing specifically how to handle such an event, simply re-boots the system rather than "passing-down" the interrupt to the currently installed DOS handler as it would do with a normal interrupt. Therefore, unlike other interrupt services, an NMI interrupt service routine installed under DOS would most likely be ignored by an application running under a DOS extender.

DESCRIPTION OF EXEMPLARY EMBODIMENTS

Although illustrated and described below with reference to certain specific embodiments, the present invention is nevertheless not intended to be limited to the details shown. Rather, various modifications may be made in the details within the scope and range of equivalents of the claims and without departing from the spirit of the invention.

During operation of the embodiment of FIG. 5, when an interrupt request 311 (e.g., NMI) occurs, the protected-mode IDT 318 directs the flow of operation to the appropriate service routine based on the entries therein. If the interrupt is not intended for the VIVO driver 510, then the interrupt is passed on to the normal flow of operation.

However, when the VIVO driver 510 of the present invention is present with a DOS extender 410 running, the interrupt request is not passed directly to the DOS extender 410. Rather, if the interrupt request is intended for the VIVO driver 510, the VIVO driver 510 acts on the request directly. If the request is not for the VIVO driver 510, then control is passed to the DOS extender 410, and the DOS extender 410 handles it in its normal way. It is noted that, in the exemplary embodiment of the present invention, because the NMI is used, the device virtualization can be performed immediately following the "faulting" instruction (i.e., the instruction which caused the NMI).

Turning to the generation and installation of the present invention, after the computer code embodying the present invention is written, it is compiled/assembled and linked, in the exemplary embodiment, as zero address-based, non-relocatable, flat-model, 32-bit protected-mode code. The computer code embodying the present invention is then saved as a standalone binary file. It is noted that, in preparing the computer code embodying the present invention, protected-mode code is required (at least at the NMI service entry point) since the protected mode IDT's vectoring mechanism does not allow vectoring to real-mode (or virtual 8086) code. It is also noted that, although some real-mode code is required, the exemplary embodiment of the present invention is implemented using almost all protected-mode code since it is more efficient for vectoring and execution and can be completely located in extended memory, thereby avoiding memory-hungry DOS real-mode applications.

Basically, the VIVO driver 510 includes the device virtualization code for emulating the particular device and it includes the code necessary to receive, at run time, the re-directed "far calls" and "Switch to Protected Mode" calls from the DOS extender 410, to make the appropriate entries in the IDT 418, and to pass control on to the VCPI 314. It also includes the Int 67h handler which is used to reflect the VCPI "Get Protected-Mode Interface" call return or the VCPI "Switch to Protected Mode" call return into the VIVO TSR 520. An exemplary implementation of a VIVO driver 510 which intercepts a "Switch to Protected Mode" call (Int 67h, function de0ch) and a "Get Protected Mode Interface" call (Int 67h, function de01h) in accordance with a presently preferred embodiment of the present invention is included as Appendix A. An exemplary implementation of a VIVO driver 510 which intercepts only the "Get Protected Mode Interface" call (Int 67h, function de01h) is included as Appendix A to the parent application, U.S. patent application Ser. No. 08/712,363, the contents of which are hereby incorporated by reference.

Figure 6:
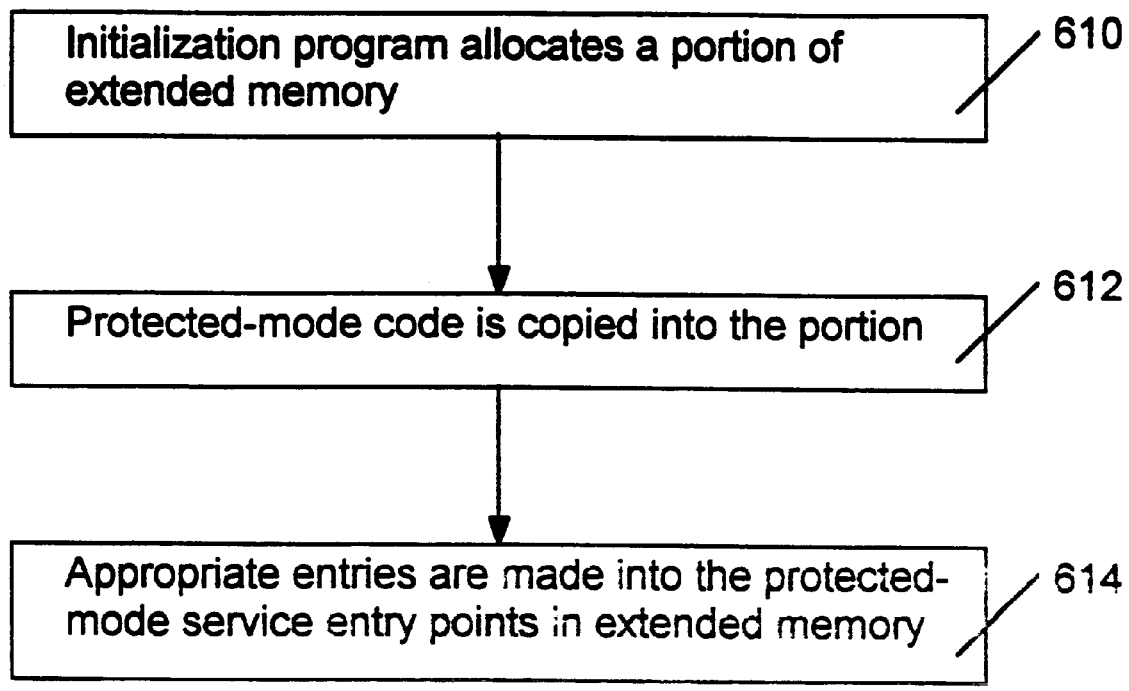
FIG. 6 is a flow diagram of the initialization operation, at boot time, of an exemplary embodiment of the present invention.

The installation and operation of the present invention is described with reference to the flowcharts in FIGS. 6–8. As shown in FIG. 6, at boot-time, in the exemplary embodiment of the present invention, an MS-DOS initialization program (e.g., ssinit.com) allocates a predetermined amount of the extended memory area 114 above the HMA 116 using an extended memory (XMS) interface reference, at step 610. An exemplary implementation of ssinit.com suitable for use with the present invention is included as Appendix B. The predetermined amount of memory, in the exemplary embodiment of the present invention, is the size of the 32-bit protected-mode code file. Additionally, in the exemplary embodiment, the allocated memory is below the 4 Megabyte boundary. Then, the allocated memory, using the XMS interface, is locked and the physical address is saved.

Subsequently, the code embodying the present invention is copied into the allocated portion of extended memory, at step 612. Appropriate entries are made into the protected-mode system IDT 318 and system GDT 320 to allow the associated hardware or software interrupt to vector directly to the 32-bit service entry point(s) in extended memory, at step 614. It is noted that since the interrupt vectoring is done at the protected-mode level, the 32-bit services are always available and can be initiated by the protected-mode operating system 310 without explicitly performing any time-consuming mode switching.

More specifically, steps 612 and 614 are accomplished as follows:

The protected-mode code file embodying the present invention is opened and a 1 k-byte portion of the code is loaded into local memory. In the exemplary embodiment of the present invention, this first portion of the code is loaded because it has variables that need to be initialized at predetermined offsets which can only be determined at this stage of loading the program (e.g., configuration parameters).

Next, the VCPI "Switch to Protected Mode" call (Int 67h handler, function de0ch) and the VCPI "Get Protected Mode Interface" call (Int 67h, function de01h) is invoked. Three selectors and an entry point offset for the "Get Protected Mode Interface" call are returned. The three selectors and the entry point offset are copied into a predetermined offset in the first portion of the protected-mode code. Also, the segment and offset of a portion of the MS-DOS initialization code is copied into a predetermined offset in the first portion of the protected-mode code. This referenced portion of the MS-DOS initialization code remains resident after the MS-DOS initialization code terminates and the protected-mode code, in the exemplary embodiment, will need to know where it is because it is essentially a shared dataspace used by the VIVO TSR 520 and the VIVO driver 510 to communicate.

Next, the first portion of the protected-mode code is copied into the allocated extended memory (e.g., using an XMS interface) and then the rest of the protected-mode code embodying the present invention is copied into extended memory in the same manner.

Next, the linear addresses for the protected-mode system IDT 318 and system GDT 320 and the physical address for the Page Directory (using standard 386 instructions) are obtained and saved. A protected-mode initialization program (e.g., a DOS4GW executable) is spawned and the physical address of the allocated Extended Memory, GDT and IDT linear addresses, as well as the Page Directory physical address, are passed thereto. An exemplary implementation of the DOS4GW executable suitable for use with the present invention is included as Appendix C.

The functions of the protected-mode initialization program, in the exemplary embodiment of loading the present invention, are to:

1) Make three entries at the top of the protected mode operating system's GDT 320. The first entry is a 32-bit code selector with a linear address based at the beginning of the allocated Extended Memory. The second entry is a data selector to alias the first entry. The third entry is a 32-bit data selector that is based at linear address 0 and has a maximum size (or limit).

2) Save the selector base of the entries made in step 1.

3) Make an entry into the protected mode operating system's IDT 318 for vector 02h (the NMI vector). This vector uses the selector base saved above with an offset of zero (in the exemplary embodiment, the NMI entry point in the 32-bit code).

4) Save the original Int 67h handler vector.

5) Make an entry into the protected mode operating system's IDT 318 for vector 67h (the Int 67h vector). This vector uses the selector base saved above with an offset of eight (the Int 67h handler intercept entry point in the 32-bit code).

6) Then, return control to the MS-DOS initialization program (Appendix B).

Finally, the MS-DOS initialization program terminates, leaving a relatively small program in memory—referred to above as the VIVO TSR 520. The general technique of leaving a TSR in memory upon initialization program termination is a well known technique to those of ordinary skill in the art.

By way of the Int 67h handler entry, the VIVO driver 510 is linked into the VCPI service/control chain via the IDT 318 for Interrupt 67h so that the hooks are present for the present invention to extend its functionality to DOS extenders 410 when they initialize. It is noted that Interrupt 67h is a control function interface to the EMS 118 and VCPI 314. This Interrupt 67h handler (VIVO driver 510) and VIVO TSR 520 act upon VCPI functions, and then pass control to the normal Interrupt 67h handler installed by the protected-mode operating system.

At this point, the protected-mode operating system 310 is configured such that hardware virtualization is available to all real-mode programs and drivers. There are also now hooks in place to allow for the extension of the device virtualization service to applications running under DOS extenders. It is noted that, in the exemplary embodiment of the present invention, although the hooks are put in place during boot time, the extension of the device virtualization services to applications running under DOS extenders is completed at run-time. This is an important aspect of the present invention becomes it allows the present invention to avoid many of the drawbacks of the prior art techniques.

It is noted that, although the above-described initialization process is performed using a combination of the MS DOS initialization program and the protected-mode initialization program, in an alternate embodiment, all of the initialization functions performed by the MS DOS initialization program can be performed by the protected-mode initialization program. To do so, the MS DOS initialization program (e.g., Appendix B) needs to pass an extra parameter to the protected-mode initialization program. The extra parameter is the real-mode address of the shared data space within the DOS initialization program.

The way in which the VIVO code of the present invention extends its functionality to DOS extenders via the Interrupt 67h handler is described with reference to the flowcharts of FIGS. 7 and 8.

Figure 7:
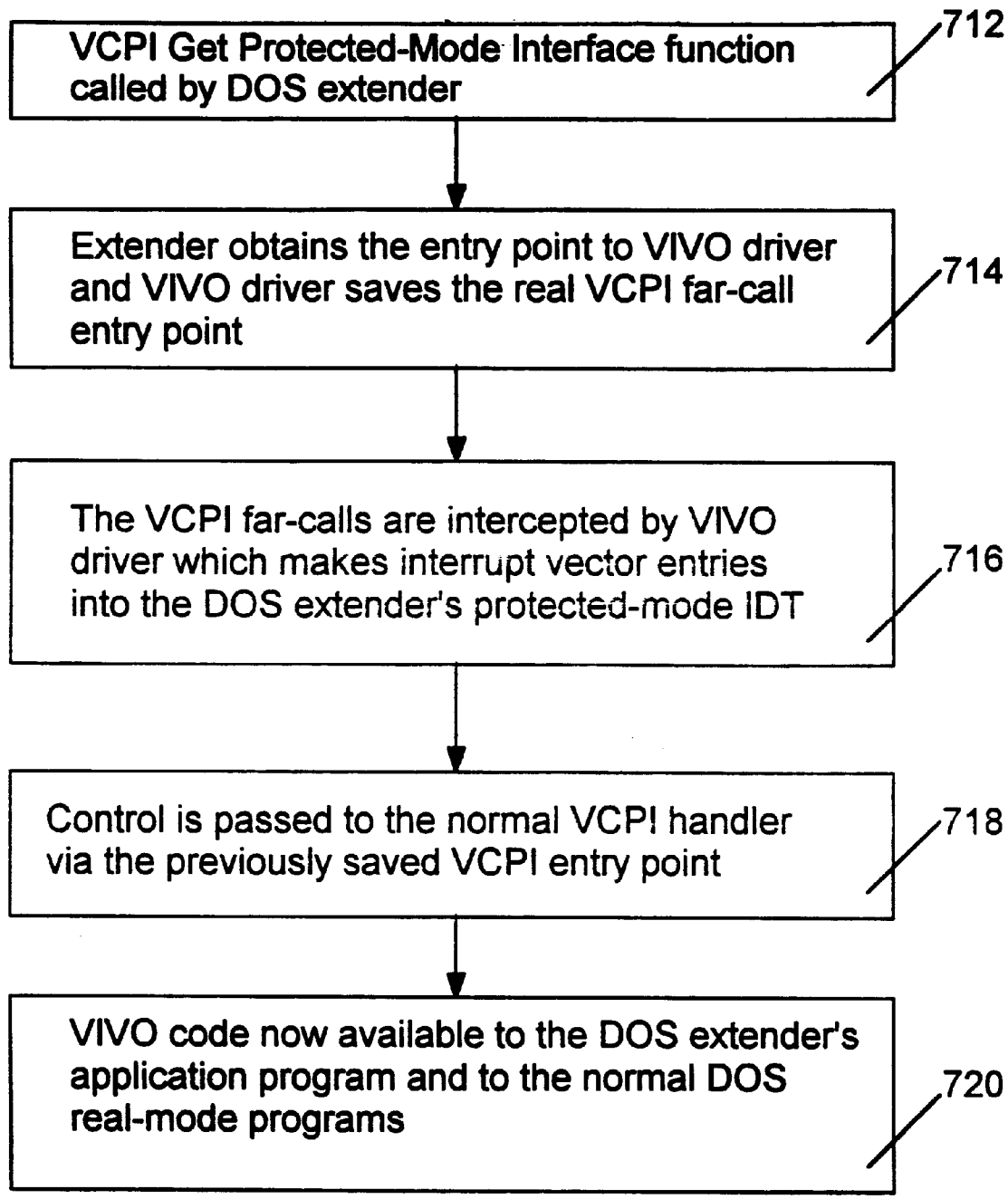
FIG. 7 is a flow diagram of the operation of an exemplary embodiment of the present invention, at run time, to provide compatibility with DOS extenders by intercepting VCPI far calls.

In a first embodiment of the invention, as shown in FIG. 7, after having established the VIVO TSR 520, it is triggered when, at run time, the DOS extender 410 calls the VCPI "Get Protected-Mode Interface" function, at step 712, via Int 67h. At this point, the DOS extender 410, initially in real-mode, expects to acquire the protected-mode far-call entry point to the VCPI 314. This entry point is used by the protected-mode operating system created by the DOS extender 410 to communicate directly with the VCPI 314 without invoking software interrupts and without switching to real mode. However, the VIVO TSR 520 of the present invention, having been passed control indirectly, by the VIVO driver 510, at this point gives the DOS extender 410 an entry point to the VIVO driver 510, at step 714. It is noted that, in this embodiment of the present invention, the VIVO TSR 520 relies on the presence of a VCPI 314, or equivalent thereof, for cooperation with DOS extenders 410.

By providing DOS extender 410 with an entry point into the VIVO driver 510 rather than the actual VCPI entry point, the DOS extender 410 will now pass through the VIVO driver 510 on subsequent "far calls." When the DOS extender 410 makes these VCPI "far calls," the system is in the DOS extender's IDT/GDT protected mode context As such, when the VIVO driver 510 intercepts the VCPI far-calls, it makes its own interrupt vector entries into the DOS extender's protected-mode operating system IDT 418, at step 716, similar to that which was done for the native protected-mode operating system 310. After making the appropriate entries, the VIVO driver 510 then passes control to the actual VCPI 314 via the previously saved VCPI protected-mode far-call entry point, at step 718.

More specifically, steps 714, 716 and 718 are accomplished as follows:

The VIVO driver 510 intercepts the Get Protected-Mode Interface call at the Int 67h entry point (all other Int 67h calls are passed through to the default handler). The VIVO driver 510 saves the real-mode return address for the DOS extender 410 into the shared data space. It then changes the real-mode return address (stored on the processor stack) so that, when the actual VCPI service completes, control will pass to the VIVO TSR 520. So, essentially, all Int 67h calls still get processed by the default handler except a "Get Protected-Mode Interface" call causes the change of the real-mode return address, by the VIVO driver 510, prior to being processed by the default handler.

It is noted that, in an alternate embodiment, the function of intercepting the initial Int 67h call from the DOS extender 410 may be performed by VIVO TSR 520. This may be problematic, however, because when the present invention runs under a memory manager, such as QEMM by Quarterdeck Office Systems, the memory manager does not pass the VCPI Int 67h calls through the DOS Interrupt Vector Table, but rather, fields all VCPI Int 67h calls in protected mode via the IDT 318.

As shown in FIG. 7, in the case of the "Get Protected-Mode Interface" call, control is then passed to the VCPI 314 which performs its service. The VCPI 314 returns control, via the new return address, to the VIVO TSR 520. At this point, a page table context has been setup in the DOS extender's data space. The VIVO TSR 520 then makes additional page entries so that the VIVO driver 510 is valid within the DOS extender's protected-mode context. The VIVO TSR 520 then copies the three selectors being passed back to the DOS extender 410 into the shared data space as well as the VCPI far call entry offset. Next, the VIVO TSR 520 copies its own three selectors (described above) into the DOS extender's return data space. It then alters the VCPI entry offset (in register ebx) to 16, which is the offset into the VIVO driver 510 for the VCPI far can intercept. Finally, it returns control to the original real-mode return address (the DOS extender 410) saved above in the shared data space.

At this point, all VCPI far calls made by the DOS extender 410 now pass control to the VIVO driver 510 within the context of the DOS extender's new protected-mode operating system. These calls include allocating extended memory for the DOS extender application and (temporarily) switching back to real-mode to service DOS interrupts and DOS operating system calls. Whenever a VCPI far call is made, an interrupt entry is made in IDT 418 by VIVO driver 510.

With this completed, device virtualization (e.g., hardware virtualization) services are available to the DOS extender's protected-mode application program as well as to the normal DOS real-mode programs (i.e., VIVO driver 510 is accessible by programs running under DOS extender), at step 720.

In a presently preferred embodiment of the invention, the strategy for making the actual patch entry into the DOS extender's IDT 418 is changed from that just described with respect to FIG. 7. Instead of patching the DOS extender's IDT 418 during any VCPI far call intercepts, the patch is instead performed at the intercept of the VCPI "Switch to Protected Mode" call (Int 67h, function de0ch). In the FIG. 7 embodiment, the VIVO code always intercepts Int 67h calls to monitor VCPI startup activity by intercepting the "Get Protected Mode Interface" call and passing all other calls directly to the default VCPI handler. In accordance with the presently preferred embodiment (FIG. 8), however, the VIVO code also watches for the "Switch to Protected Mode" call. If this call is made, the DOS extender IDT 418 is patched then, and control is passed to the default VCPI handler.

In the FIG. 7 embodiment, the DOS extender's IDT 418 was patched during VCPI far calls since it was known that the DOS extender's protected mode context would be invoked at the time of the call. Unfortunately, the inventor has found that, under some circumstances, the DOS extender's application can execute code after the switch to protected mode but before any VCPI far calls are made. As a result, the DOS extender's application could generate an I/O related interrupt event before the VIVO code makes its dynamic DOS extender IDT patch in accordance with the invention. Accordingly, in accordance with the embodiment of FIG. 8, the VIVO code makes its dynamic DOS extender IDT patch before the first switch to protected mode.

It will be appreciated by those skilled in the art that the DOS extender must make a "Switch to Protected Mode" call at least once before any of the DOS extender's application code runs. When the DOS extender makes this call, it is executing in virtual 8086 mode and under the system's protected mode context (IDT 318, GDT 320). To make the switch to the DOS extender's protected mode, the DOS extender calls the VCPI interface via Int 67h (function de0ch), at step 812, and provides the VCPI interface with a list of parameters that indicate what the DOS extender's protected mode context is to be and where to begin executing protected mode code under the DOS extender's protected mode context, at step 814. More specifically, the DOS extender provides to the VCPI its Page Directory address, GDT and IDT addresses, LDT address, TSS (Task State Segment), and protected mode program execution address. This is all the information that the VIVO Int 67h intercept code needs to be able to successfully patch the DOS extender's IDT 418 at step 816 before it ever gets into protected mode. The real VCPI switch handler is only given control at step 818 after the VIVO Int 67h intercept code is sure that the DOS extender's IDT is properly patched. With this completed, device virtualization (e.g., hardware virtualization) services are available to the DOS extender's protected-mode application program as well as to the normal DOS real-mode programs (i.e., VIVO driver 510 is accessible by programs running under DOS extender), at step 820.

Figure 8:
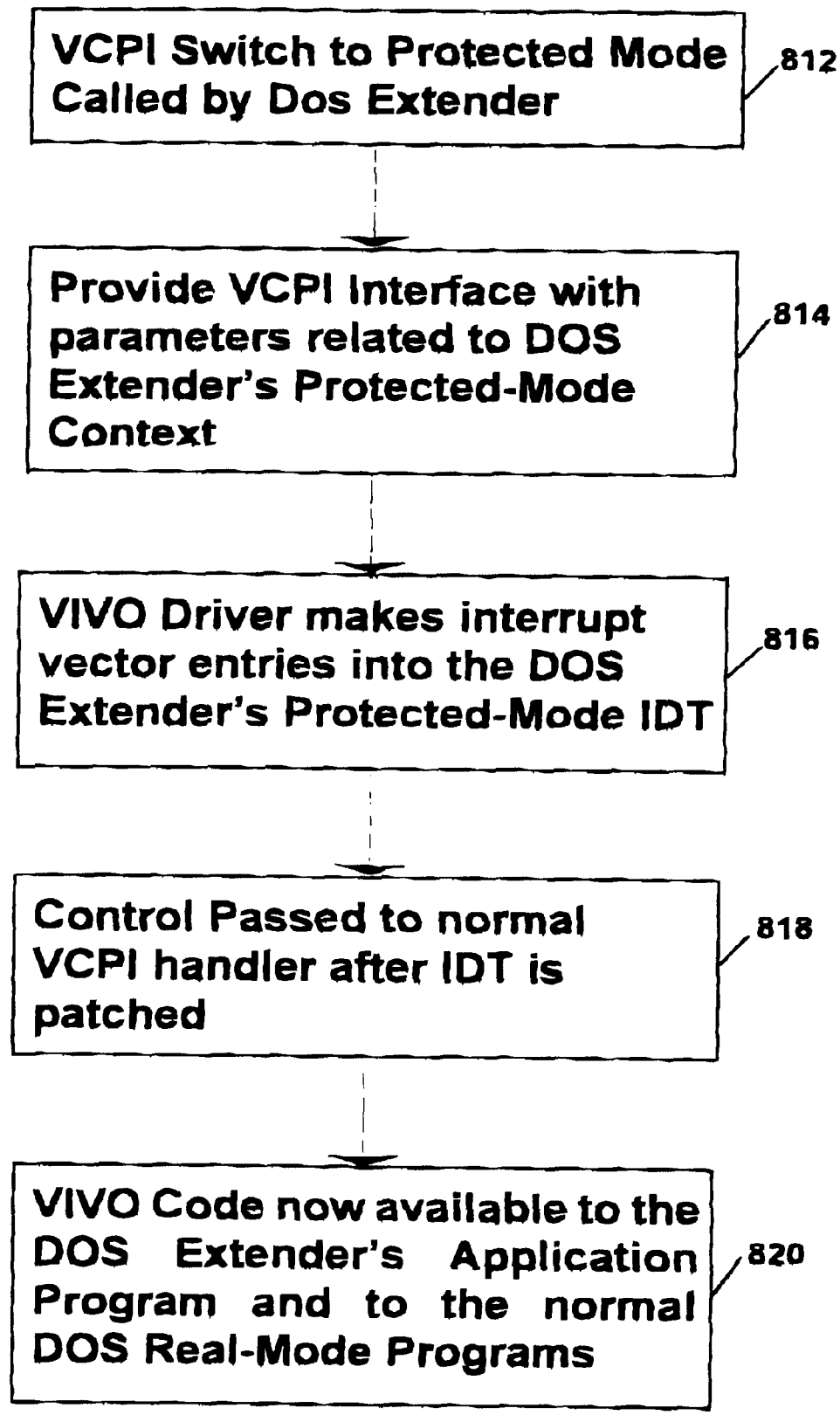
FIG. 8 is a flow diagram of the operation of a presently preferred embodiment of the present invention, at run time, to provide compatibility with DOS extenders by intercepting VCPI "Switch to Protected Mode" calls.

In the embodiment of FIG. 8, because the DOS extender is asking the VCPI to apply a new protected mode context, the DOS extender must tell the VCPI what that context is. Accordingly, it passes the VCPI (among others) at least the following: physical address of the Page Directory, linear address and size of the DOS extender's GDT and the DOS extender's IDT, and the like, at step 814. These arguments tell the VIVO driver of the invention where the DOS extender's GDT and IDT are. By temporarily switching the processor's Page Directory at step 816, the VIVO driver can access the DOS extender's IDT and patch it with the appropriate vector to the stored emulation code.

In particular, the VIVO driver of the FIG. 8 embodiment performs the following steps at step 816 to patch the DOS extender's IDT. Once the VIVO driver intercepts Int 67h, function de0ch (switch to protected mode), the VIVO driver then switches the processor's page directory to that of the DOS extender, which was specified by the DOS extender in the VCPI call. This allows the VIVO driver to properly access the DOS extender's GDT and IDT at run-time. The VIVO driver then checks to see if its IDT entries have already been made into the DOS extender's IDT. If so, it checks to see if the selector entry in the DOS extender's IDT indicates the appropriate entry in the DOS extender's GDT, which is the GDT entry that gets installed into the DOS extender's GDT when the VCPI get protected mode interface is called by the DOS extender. If either the DOS extender's IDT entry does not exist, or the selector does not match the DOS extender's GDT entry, the VIVO driver's code searches the DOS extender's GDT to find out what selector value corresponds to the VIVO emulation code and then makes the appropriate DOS extender IDT entry using the selector value. The VIVO driver then switches the processor page directory back to that of the system's protected mode context and jumps to the real VCPI switch call (step 818). The patched DOS extender IDT may now be used at step 820 to emulate the device that caused the interrupt to be generated.

Thus, in the embodiments of FIGS. 7 and 8, the startup of a DOS extender is dynamically detected by monitoring the VCPI calls and dynamically patching the DOS extender's IDT when such startup is detected.

In accordance with the embodiment of FIG. 8 (Appendix A), the VIVO driver continues to receive the VCPI far calls even though it does not patch the DOS extender's IDT 418 at the time of the far call. This is necessary because the DOS extender gets the selectors (GDT entries) when the DOS extender makes the VCPI "Get Protected Mode Interface" call. A far call is still necessary so that the selectors are guaranteed a "home" in the DOS extender's GDT 420. If the selectors could not be placed in the DOS extender's GDT 420, the DOS extender's application could never vector to the stored device emulation code since these selectors are the protected mode "pointers" to the device emulation code. Since the DOS extender is given these entries during the "Get Protected Mode Interface" call, the DOS extender cannot be prevented from calling the VIVO driver when it thinks it is making VCPI far calls. Hence, in the preferred embodiment, the VIVO TSR 520 monitors both the "Switch to Protected Mode" and "Get Protected-Mode Interface" calls.

The VIVO driver 510 of the present invention, like other device drivers and TSRs, implements software services for hardware interrupt events. However, the VIVO driver 510 in accordance with the present invention is different than standard MS-DOS device drivers and TSRS. For example, the memory-resident, executable code of the VIVO driver 510 of the present invention can permanently reside above the 1 MB memory boundary and above the HMA 116. As such, the VIVO driver 510 does not compete for valuable memory space with standard MS-DOS programs and other device drivers and TSRs. Moreover, the VIVO driver 510 is not limited to the 64K restriction of a typical device driver allowing for applications significantly larger than 64K which is particularly useful when, for example, one desires to emulate hardware with software.

Commercial Embodiment

A commercial embodiment in accordance with the present invention is the Ensoniq® Soundscape™ sound card VIVO drivers. In this commercial embodiment, a VIVO driver is used to perform the function of hardware which previously existed on a sound card. By replacing the hardware with a VIVO driver, the space consumed and cost of the sound card are significantly reduced. In operation, when an application requests access to the sound card, the request is directly processed by the VIVO driver and the functionality of that hardware element is performed in software rather than hardware. This is possible, in part, because present generation microprocessors (e.g., Pentium) are so powerful that they typically have considerable idle time which can be used to execute the VIVO driver, which appears like an application, without a noticeable delay in other necessary processing. This is only one example of how the use of a VIVO driver provides substantial advantages to not only optimizing conventional memory space but also optimizing the size and cost of an auxiliary computer card.

In particular, in the commercial embodiment, if an application attempts to address the sound card in the processor I/O address space, normally 220h through 22fh, an NMI is generated. As a result, the VIVO driver performs functional emulation of various hardware previously residing on the card (e.g., the Sound Blaster) in response to I/O writes and, during certain I/O reads, the handler alters the hardware I/O return value (in the Intel 386, register EAX) in order to emulate or virtualize the presence of the hardware in the system. Since the commercial embodiment of the present invention optionally alters the processor register state, it is necessary that the NMI service routine execute immediately following the faulting I/O instruction.

Although illustrated and described above with reference to certain specific embodiments, the present invention is nevertheless not intended to be limited to the details shown. Rather, various modifications may be made in the details within the scope and range of equivalents of the claims and without departing from the spirit of the invention. For example, the invention may be triggered by hardware or software interrupts.

ENSQ-0153                       28                      PATENT

APPENDIX A                    ©1997 Ensoniq

```
; This module contains the I/O virtualization handlers for both
; DOS and Win environments.
; Define WIN_CODE to build for win/win95 environment.
; Also optionally included in this module are virtual PIC and DMA
; handlers for DOS.

.586p
IFDEF WIN_CODE
    INCLUDE vmm.inc
    INCLUDE debug.inc
    INCLUDE vpicd.inc
    INCLUDE vdmad.inc
    INCLUDE sndscape.inc EXTERN gpSSI:DWORD
    EXTERN HARDWARE_PhysMemWrite: NEAR
    EXTERN DisableBusMaster: NEAR
    EXTERN EnableBusMaster: NEAR PUBLIC ActiveCount
    PUBLIC NMIService
    PUBLIC IRQService
    PUBLIC PicFlags
    PUBLIC DmaFlags
    PUBLIC DacFlags
    PUBLIC SblFlags
    PUBLIC MpuFlags
    PUBLIC SblStereo
    PUBLIC SblTC
ELSE
    .MODEL flat
IFDEF DOS_DEBUG
    PUBLIC DbPut8
    PUBLIC DbPut16
    PUBLIC DbPut32
ENDIF
ENDIF INCLUDE conc.inc
    INCLUDE iohndlrs.inc EXTERN _synth_init: NEAR
    EXTERN _synth_process_MIDI: NEAR
    EXTERN _synth_all_notes_off: NEAR
    EXTERN _synth_set_MT32: NEAR
    EXTERN _fm_process: NEAR
    EXTERN _synth_update: NEAR
    EXTERN _synth_reinit_voices: NEAR
    EXTERN _MT32: BYTE
    EXTERN _num_active_voices: BYTE
    EXTERN _fm_array: BYTE IFNDEF WIN_CODE
_TEXT   SEGMENT
    ASSUME fs:NOTHING ELSE
VxD_LOCKED_CODE_SEG
    ENDIF IFNDEF WIN_CODE
        ; NMI entry point here - jump over the hardware config and stub data.
        ; DO NOT insert any code or data before this, dammit.
        jmp     NMIService ALIGN 4
        ; Int 67h entry point here - skip to its service
        jmp     Int67Service ALIGN 4
        ; VCPI entry point here - skip to its service
        jmp     VcpiService
```

ENSQ-0153                          29                    PATENT

```
        ALIGN   4
        jmp     DebugService

; VCPI and hardware config data here ... all other data at end
        ALIGN   4
        PUBLIC  _programmap_map_ptr
_programmap_map_ptr     DD ?
        PUBLIC  _drummap_map_ptr
_drummap_map_ptr        DD ?
        PUBLIC  _program_map_array_ptr
_program_map_array_ptr  DD ?
        PUBLIC  _drummap_array_ptr
_drummap_array_ptr      DD ?
        PUBLIC  _program_array_ptr
_program_array_ptr      DD ?
        PUBLIC  _ws_array_ptr
_ws_array_ptr           DD ?
        PUBLIC  _category_array_ptr
_category_array_ptr     DD ?
        PUBLIC  _checksum_array_ptr
_checksum_array_ptr     DD ?
        PUBLIC  _wave_desc_index_array_ptr
_wave_desc_index_array_ptr  DD ?
        PUBLIC  _wave_descriptor_array_ptr
_wave_descriptor_array_ptr  DD ?
        PUBLIC  _WaveData_ptr
_WaveData_ptr           DD ?
        ;
DirectAccess    DD ?
PCIIRQVectOff   DD ?
EMMPageDir      DD ?
XMSPaddrLo      DD ?
PT1GPtr         DD ?
ConcGentries    DD 6 DUP(?)
VcpiGentries    DD 6 DUP(?)
pSharedData     DD ?
V86Gpmi         LABEL QWORD
VGoffset        DD ?
VGsegment       DD ?
V86Fix          LABEL QWORD
VFoffset        DD ?
VFsegment       DD ?
Int67Link       DF ?
DebugLink       DF ?
VcpiEntry       LABEL FWORD
VEoffset        DD ?
VEselector      DW ?
;-------------------------------- do not separate these sections ------
HWConfig        HW_CONFIG < OFFSET SynthBuffer, ?, ?, ?, ?, ?, ?, ?, ?, ?, ?, ?, ?, ?, ?, ?
, ? >
;-------------------------------- do not separate these sections ------
WaveIRQMask     DB ?
WaveIRQVector   DB ?
WaveSpecEOI     DB ?
        ENDIF ; the NMI ISR front-end/back-end code ...
NMIService:
        push    ecx                     ; save regs, setup ds and cfg ptr
        push    ds
        mov     ecx,cs
        add     ecx,08h
        mov     ds,ecx
        push    ebx
        push    edx
        push    esi
        mov     ecx,eax
        mov     EaxSave,eax
        mov     esi,gpSSI
SAVE_FRAME      EQU 20
```

ENSQ-0153  30  PATENT

```
; Read the NMI status port. The format of this WORD register is:
; NULL BITS        DEVICE    ADDR OFFSET    W/~R   INT STATUS
; 15 14 13 12 11 10 09 08 07 06 05 04 03 02 01 00
;  1  1  1  1  1 D2 D1 D0 A4 A3 A2 A1 A0  W  0  ~I
; where Dx is the device encode, Ax is address offset,
; W is the write access flag, and ~I is the inverted NMI status flag.
;
        mov     dx,[esi.ssi_wIOAddressConcert]
        add     dl,CONC_wNMISTAT_OFF       ; read the status register
   call DisableBusMaster
        in      ax,dx
   call EnableBusMaster
        test    al,01h                     ; test for our NMI
        jnz     SHORT NMIExit              ; if none, bail
;
        mov     edx,eax                    ; copy status reg
        shr     eax,6                      ; shift-down dev encode bits
        and     edx,0000007fh              ; mask-off non address/w bits
        and     eax,0000001ch              ; mask-off non dev encode bits
        mov     eax,DevTable[eax]          ; get the device table base
        jmp     DWORD PTR [eax+edx]        ; jump to the appropriate service
NMIExit:
        mov     dx,[esi.ssi_wIOAddressConcert]
        add     dl,CONC_wNMISTAT_OFF       ; clear our NMI assertion
        out     dx,al
        ;
        in      al,61h                     ; reset system NMI latch
        and     al,0fh
        or      al,0ch
        out     61h,al
        and     al,03h
        out     61h,al mov     eax,EaxSave                ; restore regs
        pop     esi
        pop     edx
        pop     ebx
        pop     ds
        pop     ecx
        iretd MpuDataR LABEL NEAR mov     al,MpuData
        mov     BYTE PTR EaxSave,al
        btr     MpuFlags,MPU_FLAG_DPEND
        jc      SHORT mdrmo
        or      MpuStat,80h
        jmp     NMIExit
mdrmo:
        mov     al,MpuTemp
        call    MpuPutData
        jmp     NMIExit MpuDataW LABEL NEAR ;mov ah,0dh
 ;mov al,cl
 ;call DbPut16
        bt      MpuFlags,MPU_FLAG_DOUT
        jnc     mdwexit ; parse MIDI data here and accumulate a message
        test    cl,80h
        jnz     mdwstat
        cmp     BYTE PTR MidiMessage,0f0h
        jae     mdwexit xor     edx,edx
        mov     dl,MidiCurrC
        mov     BYTE PTR MidiMessage[edx],cl
```

ENSQ-0153    31    PATENT

```
            cmp     dl,MidiDataC
            jb      SHORT mdwmore
            mov     MidiCurrC,01h ; At this point we have accumulated a full MIDI message ...
    ; put it in eax and pass it to the synth. The format will be:
    ; eax:      d31-d24   d23-d16   d15-d08   d07-d00
    ; MIDI:     ZERO      DATA2     DATA1     STATUS mov     ActiveCount,400
            bts     MpuFlags,MPU_FLAG_SYNTHON
            jc      SHORT midcall
            mov     _num_active_voices,24
            call    SynthOn
midcall:
            mov     ecx,ds
            mov     SSoffset,esp
            mov     SSselector,ss
            mov     esp,OFFSET StackTop
            mov     ss,ecx
            push    es
            mov     es,ecx
            cld
            push    MidiMessage
            call    _synth_process_MIDI
            add     esp,4
            pop     es
            lss     esp,SpSave
            jmp     NMIExit mdwmore:
            inc     dl
            mov     MidiCurrC,dl
            jmp     NMIExit ; got a MIDI status byte ...
mdwstat:
            cmp     cl,0f0h
            jae     SHORT mdwsyst
            mov     BYTE PTR MidiMessage,cl
            mov     MidiCurrC,01h
            mov     al,02h
            mov     dl,cl
            and     dl,0e0h
            cmp     dl,0c0h
            jne     SHORT mdwncfx
            dec     al
mdwncfx:
            mov     MidiDataC,al
            jmp     NMIExit
mdwsyst:
            cmp     cl,0f8h
            jae     SHORT mdwexit
            mov     BYTE PTR MidiMessage,cl
mdwexit:
            jmp     NMIExit MpuStatR LABEL NEAR mov     al,MpuStat
            mov     BYTE PTR EaxSave,al
            jmp     NMIExit MpuCmdW LABEL NEAR ;mov ah,0ch
    ;mov al,cl
    ;call DbPut16
            cmp     cl,0ffh
            jne     SHORT mcwnrs
            or      MpuStat,80h
```

ENSQ-0153                                32                              PATENT

```
            btr     MpuFlags,MPU_FLAG_DPEND
            btr     MpuFlags,MPU_FLAG_DOUT
            btr     MpuFlags,MPU_FLAG_UART
            jc      SHORT mcwnak
            mov     al,0feh
            call    MpuPutData
mcwnak:
            ; do synth shutdown stuff for MPU reset
            mov     ecx,ds
            mov     SSoffset,esp
            mov     SSselector,ss
            mov     esp,OFFSET StackTop
            mov     ss,ecx
            push    es
            mov     es,ecx
            cld
            push    0ffffffffh
            call    _synth_all_notes_off
            add     esp,4
            mov     ActiveCount,0
            btr     MpuFlags,MPU_FLAG_SYNTHON
            call    SynthOff
            call    _synth_reinit_voices
            pop     es
            lss     esp,SpSave
            jmp     NMIExit
mcwnrs:
            bt      MpuFlags,MPU_FLAG_UART
            jnc     SHORT mcwint
            jmp     NMIExit
mcwint:
            ; handle intelligent mode commands here - ack first
            mov     al,0feh
            call    MpuPutData
            cmp     cl,3fh
            jne     SHORT mcwver
            bts     MpuFlags,MPU_FLAG_UART
mcwdoe:
            bts     MpuFlags,MPU_FLAG_DOUT
            bts     MpuFlags,MPU_FLAG_SYNTHON
            jc      NMIExit
            mov     _num_active_voices,20
            mov     ActiveCount,400
            call    SynthOn
            jmp     NMIExit
mcwver:
            cmp     cl,0ach
            jne     SHORT mcwrev
            mov     MpuTemp,15h
            bts     MpuFlags,MPU_FLAG_DPEND
            jmp     NMIExit
mcwrev:
            cmp     cl,0adh
            jne     SHORT mcwdxx
            mov     MpuTemp,01h
            bts     MpuFlags,MPU_FLAG_DPEND
            jmp     NMIExit
mcwdxx:
            and     cl,0f0h
            cmp     cl,0d0h
            je      mcwdoe
            jmp     NMIExit HostStatR LABEL NEAR mov     BYTE PTR EaxSave,02h
            jmp     NMIExit OdAddrR LABEL NEAR mov     al,OdAddr
```

ENSQ-0153                              33                         PATENT

```
            mov     BYTE PTR EaxSave,al
            jmp     NMIExit

OdAddrW LABEL NEAR and     cl,0fh
            mov     OdAddr,cl
            jmp     NMIExit OdDataR LABEL NEAR mov     al,OdAddr
odr03:
            cmp     al,03h
            jne     SHORT odr04
            mov     cl,[esi.ssi_OdieDMA]
            jmp     SHORT odrex
odr04:
            cmp     al,04h
            jne     SHORT odr06
            mov     cl,[esi.ssi_OdieINT]
            jmp     SHORT odrex
odr06:
            cmp     al,06h
            jne     SHORT odrxx
            mov     cl,OdieCDCfg
            jmp     SHORT odrex
odrxx:
            xor     cl,cl
odrex:
            mov     BYTE PTR EaxSave,cl
            jmp     NMIExit OdDataW LABEL NEAR mov     ah,OdAddr
odw03:
            cmp     ah,03h
            jne     SHORT odw04
            mov     [esi.ssi_OdieDMA],cl
            jmp     NMIExit
odw04:
            cmp     ah,04h
            jne     SHORT odw06
            mov     [esi.ssi_OdieINT],cl
            jmp     NMIExit
odw06:
            cmp     ah,06h
            jne     SHORT odwex
            mov     OdieCDCfg,cl
odwex:
            jmp     NMIExit AdAddrR LABEL NEAR mov     al,AdAddr
            mov     BYTE PTR EaxSave,al
            jmp     NMIExit AdAddrW LABEL NEAR and     cl,7fh
            test    cl,40h
            jnz     SHORT aawms aawmc:      ; mode change bit is clear
            test    AdAddr,40h
            mov     AdAddr,cl
```

ENSQ-0153                             34                          PATENT

```
        jz      NMIExit
        ; new mode change clear
        btr     DacFlags,DAC_FLAG_ADPEND
        jnc     NMIExit
        jmp     ADDACStart
aawms:  ; mode change bit is set
        test    AdAddr,40h
        mov     AdAddr,cl
        jnz     NMIExit
        ; new mode change enable
    IFNDEF WIN_CODE
        call    ClearPCIIRQ
    ENDIF
        call    DACStop
        test    AdPinCtl,02h
        jnz     NMIExit
        btr     DacFlags,DAC_FLAG_INTENA
        jmp     NMIExit AdDataR LABEL NEAR mov     al,AdAddr
        and     al,0fh
adr06:
        cmp     al,06h
        jne     SHORT adr07
        mov     cl,AdDACVolL
        jmp     SHORT adrex
adr07:
        cmp     al,07h
        jne     SHORT adr08
        cmp     AdDACVolL,0aah
        jne     SHORT adrrc
        cmp     AdDACVolR,95h
        jne     SHORT adrrc
        bts     DmaFlags,DMA_FLAG_MASK
adrrc:
        mov     cl,AdDACVolR
        jmp     SHORT adrex
adr08:
        cmp     al,08h
        jne     SHORT adr09
        mov     cl,AdFormat
        jmp     SHORT adrex
adr09:
        cmp     al,09h
        jne     SHORT adr0a
        mov     cl,AdConfig
        jmp     SHORT adrex
adr0a:
        cmp     al,0ah
        jne     SHORT adrxx
        mov     cl,AdPinCtl
        jmp     SHORT adrex
adrxx:
        xor     cl,cl
adrex:
        mov     BYTE PTR EaxSave,cl
        jmp     NMIExit AdDataW LABEL NEAR mov     al,AdAddr
        and     al,0fh
adw02:
        cmp     al,02h
        jne     SHORT adw03
        mov     AdCDVolL,cl
        mov     al,cl
        shl     al,2
```

ENSQ-0153                           35                        PATENT

```
                not     al
                and     al,7fh
                call    SetCDVol
                jmp     NMIExit
adw03:
                cmp     al,03h
                jne     SHORT adw06
                mov     AdCDVolR,cl
                jmp     NMIExit
adw06:
                cmp     al,06h
                jne     SHORT adw07
                and     cl,0bfh
                mov     AdDACVolL,cl
                mov     al,cl
                and     al,80h
                shl     cl,1
                not     cl
                and     cl,7fh
                or      al,cl
                call    SetDACVol
                jmp     NMIExit
adw07:
                cmp     al,07h
                jne     SHORT adw08
                and     cl,0bfh
                mov     AdDACVolR,cl
                jmp     NMIExit
adw08:
                cmp     al,08h
                jne     SHORT adw09
                test    AdAddr,40h
                jz      NMIExit
                call    DACStop
                mov     AdFormat,cl
                mov     SblTC,0ffh
                and     [esi.ssi_bSerFmt],0f3h
                test    cl,10h
                jz      SHORT adwfns
                or      [esi.ssi_bSerFmt],04h
adwfns:
                test    cl,40h
                jz      SHORT adwfnb
                or      [esi.ssi_bSerFmt],08h
adwfnb:
                mov     dx,[esi.ssi_wIOAddressConcert]
                add     dl,CONC_bSERFMT_OFF
                mov     al,[esi.ssi_bSerFmt]
                out     dx,al
                ;
                xor     edx,edx
                mov     dl,cl
                and     dl,0fh
                shl     edx,1
                mov     ax,AdFreqTable[edx]
                call    DACSetRate
                jmp     NMIExit
adw09:
                cmp     al,09h
                jne     adw0a
                test    AdAddr,40h
                jnz     adwcm
                ;
                and     AdConfig,0fch
                and     cl,03h
                or      AdConfig,cl
                test    cl,01h
                jnz     SHORT adwcon
                call    DACPause
                jmp     NMIExit
adwcon:
                bt      DacFlags,DAC_FLAG_RUNNING
                jc      NMIExit
```

ENSQ-0153

```
                bt      DacFlags,DAC_FLAG_PAUSE
                jc      SHORT adwcre
ADDACStart:
                bts     DacFlags,DAC_FLAG_AUTO
                xor     eax,eax
                mov     ax,DACCount
                inc     eax
                test    [esi.ssi_bSerFmt],04h
                jz      SHORT adwnos
                shl     eax,1
adwnos:
                test    [esi.ssi_bSerFmt],08h
                jz      SHORT adwnob
                shl     eax,1
adwnob:
                dec     eax
                mov     DACCount,ax
                call    DACStart
                jmp     NMIExit
adwcre:
                call    DACResume
                jmp     NMIExit
adwcm:
                mov     AdConfig,cl
                test    cl,01h
                jz      NMIExit
                bts     DacFlags,DAC_FLAG_ADPEND
        ;
        IFNDEF WIN_CODE
                push    ebx
                mov     bl,01h
                call    DebugCtl
                pop     ebx
        ENDIF
                jmp     NMIExit
adw0a:
                cmp     al,0ah
                jne     SHORT adw0e
                mov     AdPinCtl,cl
                btr     DacFlags,DAC_FLAG_INTENA
                test    cl,02h
                jz      NMIExit
                bts     DacFlags,DAC_FLAG_INTENA
adw0e:
                cmp     al,0eh
                jne     SHORT adw0f
                mov     BYTE PTR DACCount+1,cl
                jmp     NMIExit
adw0f:
                cmp     al,0fh
                jne     NMIExit
                mov     BYTE PTR DACCount,cl
                jmp     NMIExit AdStatusR LABEL NEAR xor     al,al
                bt      PicFlags,PIC_FLAG_VIRQ
                jnc     SHORT asrni
                or      al,01h
asrni:
                mov     BYTE PTR EaxSave,al
                jmp     NMIExit AdStatusW LABEL NEAR IFNDEF WIN_CODE
                call    KillVIRQ
        ELSE
                call    VirtIRQClear
        ENDIF
```

ENSQ-0153                       37                        PATENT

```
        jmp     NMIExit

SblMixAddrW LABEL NEAR mov     SblMixAddr,cl
        jmp     NMIExit

SblMixDataR LABEL NEAR mov     al,SblMixAddr       ; get current mixer address
        cmp     al,30h              ; check for out of bounds
        jae     SHORT smdrx         ; if too high, return NULL value
        shr     eax,1               ; shift out alias bit
        and     eax,0000001fh       ; mask off garbage
        mov     al,SblMixer[eax]    ; get mixer data byte
        mov     BYTE PTR EaxSave,al ; and return it
        jmp     NMIExit
smdrx:
        mov     BYTE PTR EaxSave,0ffh ; return NULL
        jmp     NMIExit SblMixDataW LABEL NEAR ;mov ah,SblMixAddr
;mov al,cl
;call DbPut16
        mov     al,SblMixAddr       ; get current mixer address
        cmp     al,30h              ; check for out of bounds
        jae     NMIExit             ; if too high, do nothing
        shr     eax,1               ; shift-out alias bit
        and     eax,0000001fh       ; mask-off garbage
        or      cl,11h              ; add-in fixed bits
        mov     edx,OFFSET SblMixer ; point to mixer data
        mov     [edx+eax],cl        ; store mixer byte cmp     al,SBL_MIX_RESET
        jne     SHORT smdwse
        mov     al,99h
        mov     [edx+SBL_MIX_MASTER],al
        mov     [edx+SBL_MIX_DAC],al
        mov     [edx+SBL_MIX_MIDI],al
        mov     al,11h
        mov     [edx+SBL_MIX_MIC],al
        mov     [edx+SBL_MIX_SOURCE],al
        mov     [edx+SBL_MIX_CD],al
        mov     [edx+SBL_MIX_LINE],al
        mov     [edx+SBL_MIX_STEREO],al
        call    SblSetFormat
        call    SblSetDACVol
        call    SblSetSynthVol
        call    SblSetCDVol
        jmp     NMIExit
smdwse:
        cmp     al,SBL_MIX_STEREO
        jne     SHORT smdwda
        and     [esi.ssi_bSerFmt],0f3h
        test    SblStereo,02h
        jz      SHORT smste0
        or      [esi.ssi_bSerFmt],04h
smste0:
        mov     dx,[esi.ssi_wIOAddressConcert]
        add     dl,CONC_bSERFMT_OFF
        mov     al,[esi.ssi_bSerFmt]
        out     dx,al
        mov     ax,SblByteRate
        test    SblStereo,02h
        jz      SHORT smste1
        shr     ax,1
smste1:
        call    DACSetRate
```

ENSQ-0153                                38                    PATENT

```
        jmp     NMIExit
smdwda:
        cmp     al,SBL_MIX_DAC
        jne     SHORT smdwsy
        mov     al,cl
        call    SblSetDACVol
        jmp     NMIExit
smdwsy:
        cmp     al,SBL_MIX_MIDI
        jne     SHORT smdwcd
        mov     al,cl
        call    SblSetSynthVol
        jmp     NMIExit
smdwcd:
        cmp     al,SBL_MIX_CD
        jne     NMIExit
        mov     al,cl
        call    SblSetCDVol
        jmp     NMIExit SblSetDACVol PROC mov     al,SblMixer + SBL_MIX_DAC
        shr     al,3
        xor     al,63h
        bt      SblFlags,SBL_FLAG_SPKRON
        jc      SHORT ssdnm
        or      al,80h
ssdnm:
        call    SetDACVol
        ret SblSetDACVol ENDP SblSetSynthVol PROC mov     al,SblMixer + SBL_MIX_MIDI
        shr     al,3
        xor     al,63h
        sub     al,08h
        call    SetSynthVol
        ret SblSetSynthVol ENDP SblSetCDVol PROC mov     al,SblMixer + SBL_MIX_CD
        shr     al,3
        xor     al,63h
        call    SetCDVol
        ret SblSetCDVol ENDP SblSetFormat PROC and     [esi.ssi_bSerFmt],0f3h
        test    SblStereo,02h
        jz      SHORT ssfns0
        or      [esi.ssi_bSerFmt],04h
ssfns0:
        mov     dx,[esi.ssi_wIOAddressConcert]
        add     dl,CONC_bSERFMT_OFF
        mov     al,[esi.ssi_bSerFmt]
        out     dx,al
        mov     ax,SblByteRate
        test    SblStereo,02h
        jz      SHORT ssfns1
```

ENSQ-0153                    39                      PATENT

```
            shr     ax,1
ssfns1:
            call    DACSetRate
            ret
SblSetFormat ENDP SblResetW LABEL NEAR ;mov  ah,06h
    ;mov  al,cl
    ;call DbPut16
            test    cl,01h
            jnz     SHORT sblres1
sblres0:
            mov     al,0aah
            call    SblPutData
            jmp     NMIExit
sblres1:
            btr     SblFlags,SBL_FLAG_HISPEED
            jnc     SHORT sblres
            call    DACStop
            btr     DacFlags,DAC_FLAG_RUNNING
            jmp     NMIExit
sblres:
            mov     SblProc,OFFSET SblParse
            mov     SblFlags,0000h call    SblSetDACVol bts     DmaFlags,DMA_FLAG_MASK
    IFNDEF WIN_CODE
            call    ClearPCIIRQ
            call    KillVIRQ
    ELSE
            call    VirtIRQClear
    ENDIF
            mov     DacFlags,0000h OR (1 SHL DAC_FLAG_INTENA)
            mov     SblTC,0ffh
            mov     SblAccum,0aah
            mov     SblXorPat,96h
            call    DACStop
            mov     dx,[esi.ssi_wIOAddressConcert]
            add     dl,CONC_bSERCTL_OFF
            and     [esi.ssi_bSerCtl],NOT 50h
            or      [esi.ssi_bSerCtl],02h
            mov     al,[esi.ssi_bSerCtl]
            out     dx,al
            add     dl,CONC_bSERFMT_OFF - CONC_bSERCTL_OFF
            and     [esi.ssi_bSerFmt],0f3h
            test    SblStereo,02h
            jz      SHORT sr1nos
            or      [esi.ssi_bSerFmt],04h
sr1nos:
            mov     al,[esi.ssi_bSerFmt]
            out     dx,al IFNDEF WIN_CODE
            push    ebx
            mov     bl,01h
            call    DebugCtl
            pop     ebx
    ENDIF
            jmp     NMIExit SblDataR LABEL NEAR mov     al,SblData
            mov     BYTE PTR EaxSave,al
            btr     SblFlags,SBL_FLAG_DPEND
            jc      SHORT sdrmo
```

ENSQ-0153                                40                              PATENT

```
              and     SblRxr,NOT 80h
              jmp     NMIExit
      sdrmo:
              mov     al,SBL_VER_MINOR
              call    SblPutData
              jmp     NMIExit SblTxrR LABEL NEAR bt      DacFlags,DAC_FLAG_RUNNING
              jc      SHORT strrun
              mov     BYTE PTR EaxSave,7fh
              jmp     NMIExit
      strrun:
              bt      SblFlags,SBL_FLAG_HISPEED
              jc      SHORT strhsp
              mov     al,SblToggle
              or      al,7fh
              add     SblToggle,20h
              mov     BYTE PTR EaxSave,al
              jmp     NMIExit
      strhsp:
              mov     BYTE PTR EaxSave,0ffh
              jmp     NMIExit SblCmdW LABEL NEAR ;mov ah,0ch
      ;mov al,cl
      ;call DbPut16
              ; Jump to the current SB command process. This will be either the
              ; command parser or a handler for a command data byte.
              jmp     SblProc
      SblParse:
      spc00:
              ; First do I/O DAC - gotsta happen fast
              cmp     cl,SBL_CMD_IODAC
              jne     spc01
              mov     SblProc,OFFSET SblGetIO
              bts     DacFlags,DAC_FLAG_IODAC
              jc      NMIExit
          IFNDEF WIN_CODE
              mov     SblIOBuff,80808080h
          ELSE
              mov     edx,[esi.ssi_lpDMABufferLinear]
              mov     DWORD PTR [edx],80808080h
          ENDIF
              mov     ax,44100
              call    DACSetRate
              mov     SblTC,0ffh
              mov     dx,[esi.ssi_wIOAddressConcert]
              add     dl,CONC_bMEMPAGE_OFF
              mov     al,CONC_DACCTL_PAGE
              out     dx,al
              add     dl,CONC_dDACPADDR_OFF - CONC_bMEMPAGE_OFF
          IFNDEF WIN_CODE
              mov     eax,XMSPaddrLo
              add     eax,OFFSET SblIOBuff
          ELSE
              mov     eax,[esi.ssi_lpDMABufferPhys]
          ENDIF
              out     dx,eax
              add     dl,CONC_wDACFC_OFF - CONC_dDACPADDR_OFF
              xor     eax,eax
              out     dx,eax
              add     dl,CONC_wDACIC_OFF - CONC_wDACFC_OFF
              mov     ax,0ffffh
              out     dx,ax
              add     dl,CONC_bSERFMT_OFF - CONC_wDACIC_OFF
              and     [esi.ssi_bSerFmt],0f7h
              mov     al,[esi.ssi_bSerFmt]
```

ENSQ-0153                              41                               PATENT

```
                out     dx,al
                add     dl,CONC_bSERCTL_OFF - CONC_bSERFMT_OFF
                and     [esi.ssi_bSerCtl],NOT 52h
                mov     al,[esi.ssi_bSerCtl]
                out     dx,al
                add     dl,CONC_bDEVCTL_OFF - CONC_bSERCTL_OFF
                or      [esi.ssi_bDevCtl],20h
                mov     al,[esi.ssi_bDevCtl]
                out     dx,al
                jmp     NMIExit
spc01:
                ; Next, check for hi-speed single mode DAC commands
                cmp     cl,SBL_CMD_SDACH
                jne     SHORT spc01a
                bts     SblFlags,SBL_FLAG_HISPEED
                call    SblClearSHH
                jmp     SblSDACH
spc01a:
                cmp     cl,SBL_CMD_SADCH
                jne     SHORT spc02
                bts     DacFlags,DAC_FLAG_ADC
                bts     SblFlags,SBL_FLAG_HISPEED
                call    SblSetSHH
                jmp     SblSDACH
spc02:
                ; Next, check for lo-speed single mode DAC
                cmp     cl,SBL_CMD_SDAC
                jne     SHORT spc02a
                call    SblClearSHH
                mov     SblProc,OFFSET SblGetDacL
                jmp     NMIExit
spc02a:
                cmp     cl,SBL_CMD_SADC
                jne     SHORT spc02b
                call    SblSetSHH
                bts     DacFlags,DAC_FLAG_ADC
                mov     SblProc,OFFSET SblGetDacL
                jmp     NMIExit
spc02b:
                cmp     cl,SBL_CMD_SILENCE
                jne     SHORT spc02c
                btr     DmaFlags,DMA_FLAG_AUTO
                mov     DmaAddr,0000h
                mov     DmaAddrCurr,0000h
                mov     DmaCount,0ffffh
                mov     DmaCountCurr,0ffffh
                btr     DmaFlags,DMA_FLAG_MASK
                call    SblSetSHH
                mov     SblProc,OFFSET SblGetDacL
                jmp     NMIExit
spc02c:
                cmp     cl,SBL_CMD_SADPCM
                jne     SHORT spc02d
                call    SblSetSHH
                mov     SblProc,OFFSET SblGetDacL
                jmp     NMIExit
spc02d:
                cmp     cl,SBL_CMD_SADPCMR
                jne     SHORT spc03
                call    SblSetSHH
                mov     SblProc,OFFSET SblGetDacL
                jmp     NMIExit
spc03:
                ; Next, check for the TConst command
                cmp     cl,SBL_CMD_SETTC
                jne     SHORT spc04
                mov     SblProc,OFFSET SblGetTC
                jmp     NMIExit
spc04:
                ; Next, check for a halt
                cmp     cl,SBL_CMD_HALT
                jne     SHORT spc05
                call    DACPause
```

```
               jmp     NMIExit
spc05:
       ; Next, check for auto stop
               cmp     cl,SBL_CMD_ASTOP
               jne     SHORT spc06
               btr     DacFlags,DAC_FLAG_AUTO
               mov     dx,[esi.ssi_wIOAddressConcert]
               add     dl,CONC_bSERCTL_OFF
               or      [esi.ssi_bSerCtl],40h
               mov     al,[esi.ssi_bSerCtl]
               out     dx,al
               jmp     NMIExit
spc06:
       ; Next, check for a resume
               cmp     cl,SBL_CMD_RESUME
               jne     SHORT spc07
               call    DACResume
               jmp     NMIExit
spc07:
       ; Next, Check for auto block
               cmp     cl,SBL_CMD_SETAC
               jne     SHORT spc08
               mov     SblProc,OFFSET SblGetBlkL
               jmp     NMIExit
spc08:
       ; Next, check for hi-speed/lo-speed auto DAC
               cmp     cl,SBL_CMD_ADACH
               jne     SHORT spc08a
               bts     SblFlags,SBL_FLAG_HISPEED
               call    SblClearSHH
               jmp     SHORT spauto
spc08a:
               cmp     cl,SBL_CMD_ADAC
               jne     SHORT spc08b
               call    SblClearSHH
               jmp     SHORT spauto
spc08b:
               cmp     cl,SBL_CMD_AADPCM
               jne     SHORT spc08c
               call    SblClearSHH
               jmp     SHORT spauto
spc08c:
               cmp     cl,SBL_CMD_AADCH
               jne     SHORT spc08d
               bts     SblFlags,SBL_FLAG_HISPEED
               call    SblSetSHH
               jmp     SHORT spauto
spc08d:
               cmp     cl,SBL_CMD_AADC
               jne     SHORT spc09
               call    SblSetSHH
spauto:
               bts     DacFlags,DAC_FLAG_AUTO
               bts     DacFlags,DAC_FLAG_INTENA
               mov     dx,[esi.ssi_wIOAddressConcert]
               add     dl,CONC_bSERFMT_OFF
               and     [esi.ssi_bSerFmt],NOT 08h
               mov     al,[esi.ssi_bSerFmt]
               out     dx,al
               call    DACStart
               jmp     NMIExit
spc09:
       ; Next, check for forced int command
               cmp     cl,SBL_CMD_FORCEINT
               jne     SHORT spc0a
               bts     DacFlags,DAC_FLAG_INTENA
       IFNDEF WIN_CODE
               call    AssertWaveIRQ
       ELSE
               call    VirtIRQSet
       ENDIF
               jmp     NMIExit
spc0a:
```

ENSQ-0153                              43                                    PATENT

```
        ; Next, check for the scrambler
        cmp     cl,SBL_CMD_SCRAMBLE
        jne     SHORT spc0b
        mov     SblProc,OFFSET SblGetScr
        jmp     NMIExit
spc0b:
        ; After this, the cmd eval order isn't all that important
        cmp     cl,SBL_CMD_DSPVER
        jne     SHORT spc0c
        mov     al,SBL_VER_MAJOR
        call    SblPutData
        bts     SblFlags,SBL_FLAG_DPEND
        jmp     NMIExit
spc0c:
        cmp     cl,SBL_CMD_SETTAG
        jne     SHORT spc0d
        mov     SblProc,OFFSET SblSetTag
        jmp     NMIExit
spc0d:
        cmp     cl,SBL_CMD_GETTAG
        jne     SHORT spc0e
        mov     al,SblTag
        call    SblPutData
        jmp     NMIExit
spc0e:
        cmp     cl,SBL_CMD_INVERT
        jne     SHORT spc0f
        mov     SblProc,OFFSET SblInvert
        jmp     NMIExit
spc0f:
        cmp     cl,SBL_CMD_SPKRON
        jne     SHORT spc10
        bts     SblFlags,SBL_FLAG_SPKRON
        call    SblSetDACVol
        jmp     NMIExit
spc10:
        cmp     cl,SBL_CMD_SPKROFF
        jne     SHORT spc11
        btr     SblFlags,SBL_FLAG_SPKRON
        call    SblSetDACVol
        jmp     NMIExit
spc11:
        cmp     cl,SBL_CMD_GETSPKR
        jne     SHORT spc12
        xor     al,al
        bt      SblFlags,SBL_FLAG_SPKRON
        jnc     SHORT sgsoff
        dec     al
sgsoff:
        call    SblPutData
        jmp     NMIExit
spc12:
        jmp     NMIExit SblGetIO:
        mov     SblProc,OFFSET SblParse
        mov     ch,cl
        mov     eax,ecx
        shl     eax,16
        mov     ax,cx
    IFNDEF WIN_CODE
        mov     SblIOBuff,eax
    ELSE
        mov     edx,[esi.ssi_lpDMABufferLinear]
        mov     [edx],eax
    ENDIF
        jmp     NMIExit SblGetDacL:
        mov     SblProc,OFFSET SblGetDacU
        mov     BYTE PTR DACCount,cl
        jmp     NMIExit
```

ENSQ-0153                                44                              PATENT

```
SblGetDacU:
        mov     SblProc,OFFSET SblParse
        mov     BYTE PTR DACCount+1,cl
SblSDACH:
        btr     DacFlags,DAC_FLAG_AUTO
        bts     DacFlags,DAC_FLAG_INTENA
        btr     DacFlags,DAC_FLAG_ADC
        jnc     SHORT sgdoit
        bt      DmaFlags,DMA_FLAG_MASK
        jc      SHORT sgdoit
        xor     eax,eax
        mov     dx,[esi.ssi_DMAPageReg]
        in      al,dx
        shl     eax,16
        mov     ax,DmaAddrCurr
        mov     edx,eax
        mov     al,80h
        mov     ecx,1
        call    WritePhys
sgdoit:
        mov     dx,[esi.ssi_wIOAddressConcert]
        add     dl,CONC_bSERFMT_OFF
        and     [esi.ssi_bSerFmt],NOT 08h
        mov     al,[esi.ssi_bSerFmt]
        out     dx,al
        call    DACStart
        jmp     NMIExit SblGetTC:
        mov     SblProc,OFFSET SblParse
        cmp     cl,SblTC
        je      NMIExit                 ; if it's already set, get off here mov     SblTC,cl                ; store new time const
        not     cl                      ; derive rate divider
        and     ecx,000000ffh
        inc     ecx
        mov     eax,1000000
        xor     edx,edx
        div     ecx
        mov     SblByteRate,ax
        call    SblSetFormat
        jmp     NMIExit SblGetBlkL:
        mov     SblProc,OFFSET SblGetBlkU
        mov     BYTE PTR DACCount,cl
        jmp     NMIExit SblGetBlkU:
        mov     SblProc,OFFSET SblParse
        mov     BYTE PTR DACCount+1,cl
        jmp     NMIExit SblGetScr:
        mov     SblProc,OFFSET SblParse
        xor     cl,SblXorPat
        add     cl,SblAccum
        mov     SblAccum,cl
        ror     SblXorPat,2
        xor     eax,eax
        mov     dx,[esi.ssi_DMAPageReg]
        in      al,dx
        shl     eax,16
        mov     ax,DmaAddrCurr
        mov     edx,eax
        mov     al,cl
        mov     ecx,1
        call    WritePhys
        inc     DmaAddrCurr
        dec     DmaCountCurr
        mov     al,[esi.ssi_DmaTCMask]   ; set terminal condition
        or      DmaStatus,al
```

ENSQ-0153                    45                    PATENT

```
        jmp     NMIExit

SblSetTag:
        mov     SblProc,OFFSET SblParse
        mov     SblTag,cl
        jmp     NMIExit SblInvert:
        mov     SblProc,OFFSET SblParse
        not     cl
        mov     al,cl
        call    SblPutData
        jmp     NMIExit SblRxrR LABEL NEAR ;bt PicFlags,PIC_FLAG_VISR
  ;jnc SHORT nostat
  ;mov ax,22eh
  ;call DbPut16
nostat:
    IFNDEF WIN_CODE
        call    KillVIRQ
    ELSE
        call    VirtIRQClear
    ENDIF
srrex:
        mov     al,SblRxr
        mov     BYTE PTR EaxSave,al
        jmp     NMIExit IFNDEF WIN_CODE
        ; Master controller data read
MicDataR LABEL NEAR cmp     MicCmd,0ah
        jne     SHORT mdrisr
        bt      PicFlags,PIC_FLAG_VIRR
        jnc     NMIExit
        jmp     SHORT mdrvim
mdrisr:
        bt      PicFlags,PIC_FLAG_VISR
        jnc     NMIExit
mdrvim:
        cmp     [esi.ssi_bIRQ],08h
        jae     SHORT mdrvms
        or      cl,WaveIRQMask
        mov     BYTE PTR EaxSave,cl
        jmp     NMIExit
mdrvms:
        or      cl,04h
        mov     BYTE PTR EaxSave,cl
        jmp     NMIExit ; Master controller command write
MicCmdW LABEL NEAR ; see if we got an EOI of any sort - if so, go to EOI sequence
        mov     al,cl
        and     al,0b8h
        cmp     al,20h
        je      SHORT mcwEOI ; if it's the init command byte, flag mask-write and get out
        test    cl,10h
        jz      mcwcon0
        mov     MicSkip,3
        jmp     NMIExit
mcwcon0:
```

```
            ; check for reg-read commands that we need to store
            mov     al,cl
            and     al,0feh
            cmp     al,0ah
            jne     NMIExit
            mov     MicCmd,cl
            jmp     NMIExit ; here we got an EOI; there are several ways to deal with this ...
mcwEOI:
            ; see if we need to wait for the last EOI
            bt      PicFlags,PIC_FLAG_WAIT
            jnc     mcwcon2

; here we're waiting for the last EOI
            mov     al,0bh                  ; get in-service reg
            out     20h,al
            in      al,21h
            in      al,20h
            mov     ah,al
            mov     al,MicCmd               ; restore last reg-read command
            out     20h,al
            or      ah,ah
            jnz     NMIExit                 ; if any phys in-service, wait for next ; last EOI in the chain - we need to see if it was a real-mode EOI
            btr     PicFlags,PIC_FLAG_WAIT
            mov     eax,ss
            lar     eax,eax
            test    eax,00400000h
            jnz     SHORT mcwsok
            and     esp,0000ffffh
mcwsok:
            test    DWORD PTR [esp+SAVE_FRAME+8],20000h
            jnz     mcwdis
            ; not a v86 EOI - re-assert PCI IRQ to try again ...
            ; apw
            ; mov     eax,0ffffffffh
            ; call    DbPut32
            and     DWORD PTR [esp+SAVE_FRAME+8],NOT 00000200h
            call    ForcePCIIRQ
            jmp     NMIExit
mcwdis:
            ; it was real-mode, whack the v86 return stack to dispatch service
            mov     RegSave,es
            mov     eax,cs
            add     eax,10h
            mov     es,eax mov     eax,[esp+SAVE_FRAME+12]
            and     eax,0000ffffh           ; grow v86 stack by an iret frame
            sub     eax,6
            mov     [esp+SAVE_FRAME+12],eax mov     edx,[esp+SAVE_FRAME+16]
            and     edx,0000ffffh           ; create linear pointer to new stack top
            shl     edx,4
            add     edx,eax mov     eax,[esp+SAVE_FRAME+0]
            mov     es:[edx],ax             ; copy return frame to new stack area
            mov     eax,[esp+SAVE_FRAME+4]
            mov     es:[edx+2],ax
            mov     eax,[esp+SAVE_FRAME+8]
            mov     es:[edx+4],ax xor     eax,eax                 ; mod return frame to IRQ vect
            mov     al,WaveIRQVector
            shl     eax,2
            mov     eax,es:[eax]

mov     [esp+SAVE_FRAME+0],ax
            shr     eax,16
```

```
                mov      [esp+SAVE_FRAME+4],ax mov      al,0ffh
                out      21h,al
                bts      PicFlags,PIC_FLAG_VISR mov      es,RegSave
                jmp      NMIExit
mcwcon2:
                ; this could be the EOI from the dispatched handler
                btr      PicFlags,PIC_FLAG_VISR
                jnc      SHORT mcwcon3
                mov      al,MicMask
                out      21h,al
                call     DisableVirtualPIC
                jmp      NMIExit
mcwcon3:
                ; this could be a spec EOI w/ the IRQ masked - if so kill VIRQ/VIRR
                cmp      [esi.ssi_bIRQ],08h
                jae      NMIExit
                cmp      cl,WaveSpecEOI
                jne      NMIExit
                call     ClearPCIIRQ
                call     KillVIRQ
                jmp      NMIExit ; Master controller mask read
MicMaskR LABEL NEAR bt       PicFlags,PIC_FLAG_VISR
                jnc      NMIExit
                cmp      [esi.ssi_bIRQ],08h
                jae      mmris1
                mov      al,MicMask
                mov      ah,WaveIRQMask
                not      ah
                or       al,ah
                mov      BYTE PTR EaxSave,al
                jmp      NMIExit
mmris1:
                mov      al,0ffh
                mov      BYTE PTR EaxSave,al
                jmp      NMIExit ; Master controller mask write
MicMaskW LABEL NEAR ; if it's an init cmd word, skip it
                cmp      MicSkip,0
                je       SHORT mmwcon0
                dec      MicSkip
                jmp      NMIExit
mmwcon0:
                bt       PicFlags,PIC_FLAG_VISR     ; if unmasking is allowed
                jnc      SHORT mmwnrm               ; skip to normal sequence
                mov      al,0ffh                    ; else, remask master PIC
                out      21h,al
                cmp      [esi.ssi_bIRQ],08h
                jae      NMIExit
                mov      al,WaveIRQMask             ; apply only Wave IRQ mask bit
                not      al
                and      MicMask,al
                and      cl,WaveIRQMask
                or       MicMask,cl
                jmp      NMIExit
mmwnrm:
                mov      MicMask,cl                 ; save mask state
                bt       PicFlags,PIC_FLAG_PEND     ; got a request pending?
                jnc      NMIExit                    ; if not, we're done cmp      [esi.ssi_bIRQ],08h         ; are we on the master PIC?
```

ENSQ-0153                                48                              PATENT

```
        jae     SHORT mmwcas            ; if not, skip to cascade sequence
        test    cl,WaveIRQMask          ; is our IRQ unmasked?
        jnz     NMIExit                 ; if not, we're done
        btr     PicFlags,PIC_FLAG_PEND  ; clear pending status
        call    ForcePCIIRQ             ; force the interrupt
        jmp     NMIExit
mmwcas:
        test    cl,04h                  ; is cascade IRQ unmasked?
        jnz     NMIExit                 ; if not, we're done
        mov     al,SicMask              ; get slave controller mask state
        test    al,WaveIRQMask          ; is our IRQ unmasked?
        jnz     NMIExit                 ; if not, we're done
        btr     PicFlags,PIC_FLAG_PEND  ; clear pending status
        call    ForcePCIIRQ             ; force the interrupt
        jmp     NMIExit ; Slave controller data read
SicDataR LABEL NEAR cmp     [esi.ssi_bIRQ],08h      ; if we're not on slave, don't bother
        jb      NMIExit
        cmp     SicCmd,0ah
        jne     SHORT sdrisr
        bt      PicFlags,PIC_FLAG_VIRR
        jnc     NMIExit
        jmp     SHORT sdrvim
sdrisr:
        bt      PicFlags,PIC_FLAG_VISR
        jnc     NMIExit
sdrvim:
        or      cl,WaveIRQMask
        mov     BYTE PTR EaxSave,cl
        jmp     NMIExit ; Slave controller command write
SicCmdW LABEL NEAR ; if it's the init command byte, flag mask-write and get out
        test    cl,10h
        jz      SHORT scwcon0
        mov     SicSkip,3
        jmp     NMIExit
scwcon0:
        cmp     [esi.ssi_bIRQ],08h      ; if we're not on slave, don't bother
        jb      NMIExit ; check for reg-read commands that we need to store
        mov     al,cl
        and     al,0feh
        cmp     al,0ah
        jne     SHORT scwcon1
        mov     SicCmd,cl
        jmp     NMIExit
scwcon1:
        ; this could be a spec EOI w/ the IRQ masked - if so kill VIRQ/VIRR
        cmp     cl,WaveSpecEOI
        jne     NMIExit
        call    KillVIRQ
        jmp     NMIExit ; Slave controller mask write
SicMaskW LABEL NEAR ; if it's an init cmd word, skip it
        cmp     SicSkip,0
        je      SHORT smwcon0
        dec     SicSkip
        jmp     NMIExit
smwcon0:
        cmp     [esi.ssi_bIRQ],08h      ; if we're not on slave, don't bother
```

ENSQ-0153                         49                            PATENT

```
            jb      NMIExit
            mov     SicMask,cl              ; save mask state
            bt      PicFlags,PIC_FLAG_PEND  ; got a request pending?
            jnc     NMIExit                 ; if not, we're done
            test    cl,WaveIRQMask          ; is our IRQ unmasked?
            jnz     NMIExit                 ; if not, we're done
            test    MicMask,04h             ; is the master PIC cascade unmasked?
            jnz     NMIExit                 ; if not, we're done
            btr     PicFlags,PIC_FLAG_PEND  ; clear pending status
            call    ForcePCIIRQ             ; force the interrupt
            jmp     NMIExit
    ENDIF DmaModeW LABEL NEAR mov     al,cl
            and     al,03h
            cmp     al,[esi.ssi_bDMA]
            jne     NMIExit
            test    cl,10h
            jnz     SHORT dmwaon
            btr     DmaFlags,DMA_FLAG_AUTO
            jmp     NmiExit
dmwaon:
            bts     DmaFlags,DMA_FLAG_AUTO
            jmp     NmiExit DmaMaskW LABEL NEAR mov     al,cl
            and     al,03h
            cmp     al,[esi.ssi_bDMA]
            jne     NMIExit
            test    cl,04h
            jnz     SHORT dmwsm
            btr     DmaFlags,DMA_FLAG_MASK
            jnc     NMIExit
            btr     DmaFlags,DMA_FLAG_DRQ
            jnc     NMIExit
            btr     DacFlags,DAC_FLAG_PEND
            jnc     SHORT dmres
            call    DACGoDammit
            jmp     NMIExit
dmres:
            call    DACResume
            jmp     NMIExit
dmwsm:
            bts     DmaFlags,DMA_FLAG_MASK
            jc      NMIExit
            bt      DacFlags,DAC_FLAG_RUNNING
            jnc     NMIExit
            call    DACPause
            bts     DmaFlags,DMA_FLAG_DRQ
            jmp     NMIExit DmaFlopW LABEL NEAR btr     DmaFlags,DMA_FLAG_FLOP
            jmp     NMIExit Dma0AddrR LABEL NEAR btc     DmaFlags,DMA_FLAG_FLOP
            cmp     [esi.ssi_bDMA],0
            je      DMAAddrR
            jmp     NMIExit
```

ENSQ-0153                                50                         PATENT

```
DmalAddrR LABEL NEAR btc     DmaFlags,DMA_FLAG_FLOP
        cmp     [esi.ssi_bDMA],1
        je      DMAAddrR
        jmp     NMIExit Dma3AddrR LABEL NEAR btc     DmaFlags,DMA_FLAG_FLOP
        cmp     [esi.ssi_bDMA],3
        je      DMAAddrR
        jmp     NMIExit DmaAddrR:
        bt      DmaFlags,DMA_FLAG_FLOP
        jc      SHORT darlow
        mov     cl,BYTE PTR DmaAddrCurr+1
        mov     BYTE PTR EaxSave,cl
        jmp     NMIExit
darlow:
        bt      DacFlags,DAC_FLAG_RUNNING
        jc      SHORT darder
        bt      DacFlags,DAC_FLAG_PAUSE
        jc      SHORT darder
        jmp     SHORT darget
darder:
        mov     cx,DmaAddr
        mov     dx,[esi.ssi_wIOAddressConcert]
        add     dl,CONC_bMEMPAGE_OFF
        mov     al,CONC_DACCTL_PAGE
        out     dx,al
        add     dl,CONC_wDACCFC_OFF - CONC_bMEMPAGE_OFF
        call    DisableBusMaster
        in      ax,dx
        call    EnableBusMaster
        shl     eax,2
        add     cx,ax
        mov     ax,DmaAddr
        add     ax,DmaCount
        cmp     cx,ax
        jbe     SHORT dastor
        mov     cx,ax
dastor:
        mov     DmaAddrCurr,cx
darget:
        mov     ax,DmaAddrCurr
        mov     BYTE PTR EaxSave,al
        jmp     NMIExit Dma0AddrW LABEL NEAR btc     DmaFlags,DMA_FLAG_FLOP
        cmp     [esi.ssi_bDMA],0
        je      DMAAddrW
        jmp     NMIExit DmalAddrW LABEL NEAR btc     DmaFlags,DMA_FLAG_FLOP
        cmp     [esi.ssi_bDMA],1
        je      DMAAddrW
        jmp     NMIExit Dma3AddrW LABEL NEAR btc     DmaFlags,DMA_FLAG_FLOP
        cmp     [esi.ssi_bDMA],3
        je      DMAAddrW
        jmp     NMIExit DMAAddrW:
```

ENSQ-0153                                51                              PATENT

```
        bt      DmaFlags,DMA_FLAG_FLOP
        jnc     SHORT dawupp
        mov     BYTE PTR DmaAddr,cl
        mov     BYTE PTR DmaAddrCurr,cl
        jmp     NMIExit
dawupp:
        mov     BYTE PTR DmaAddr+1,cl
        mov     BYTE PTR DmaAddrCurr+1,cl
        jmp     NMIExit Dma0CountR LABEL NEAR btc     DmaFlags,DMA_FLAG_FLOP
        cmp     [esi.ssi_bDMA],0
        je      DMACountR
        jmp     NMIExit Dma1CountR LABEL NEAR btc     DmaFlags,DMA_FLAG_FLOP
        cmp     [esi.ssi_bDMA],1
        je      DMACountR
        jmp     NMIExit Dma3CountR LABEL NEAR btc     DmaFlags,DMA_FLAG_FLOP
        cmp     [esi.ssi_bDMA],3
        je      DMACountR
        jmp     NMIExit DmaCountR:
        bt      DmaFlags,DMA_FLAG_FLOP
        jc      SHORT dcrlow
        mov     cl,BYTE PTR DmaCountCurr+1
        mov     BYTE PTR EaxSave,cl
        jmp     NMIExit
dcrlow:
        bt      DacFlags,DAC_FLAG_RUNNING
        jc      SHORT dcrder
        bt      DacFlags,DAC_FLAG_PAUSE
        jc      SHORT dcrder
        jmp     SHORT dcrget
dcrder:
        xor     eax,eax
        xor     ecx,ecx
        mov     cx,DmaCount
        mov     dx,[esi.ssi_wIOAddressConcert]
        add     dl,CONC_bMEMPAGE_OFF
        mov     al,CONC_DACCTL_PAGE
        out     dx,al
        add     dl,CONC_wDACCFC_OFF - CONC_bMEMPAGE_OFF
    call DisableBusMaster
        in      ax,dx
    call EnableBusMaster
        shl     eax,2
        sub     ecx,eax
        jnc     SHORT dcrsto
        bt      DmaFlags,DMA_FLAG_AUTO
        jnc     SHORT dcrsing
        add     cx,DmaCount
        jmp     SHORT dcrsto
dcrsing:
        mov     cx,0ffffh
dcrsto:
        mov     DmaCountCurr,cx
dcrget:
        mov     ax,DmaCountCurr
        mov     BYTE PTR EaxSave,al
        jmp     NMIExit
```

ENSQ-0153

```
Dma0CountW LABEL NEAR btc     DmaFlags,DMA_FLAG_FLOP
        cmp     [esi.ssi_bDMA],0
        je      DMACountW
        jmp     NMIExit Dma1CountW LABEL NEAR btc     DmaFlags,DMA_FLAG_FLOP
        cmp     [esi.ssi_bDMA],1
        je      DMACountW
        jmp     NMIExit Dma3CountW LABEL NEAR btc     DmaFlags,DMA_FLAG_FLOP
        cmp     [esi.ssi_bDMA],3
        je      DMACountW
        jmp     NMIExit DMACountW:
        bt      DmaFlags,DMA_FLAG_FLOP
        jnc     SHORT dcwupp
        mov     BYTE PTR DmaCount,cl
        mov     BYTE PTR DmaCountCurr,cl
        jmp     NMIExit
dcwupp:
        mov     BYTE PTR DmaCount+1,cl
        mov     BYTE PTR DmaCountCurr+1,cl
        btr     DmaFlags,DMA_FLAG_SCOUNT
        jmp     NMIExit DmaStatusR LABEL NEAR or      cl,DmaStatus
        bt      DmaFlags,DMA_FLAG_DRQ
        jnc     SHORT dsrnop
        or      cl,[esi.ssi_DmaDRQMask]
dsrnop:
        mov     BYTE PTR EaxSave,cl
        mov     al,[esi.ssi_DmaTCMask]
        not     al
        and     DmaStatus,al
        jmp     NMIExit OplStatR LABEL NEAR mov     al,OplStat
        mov     BYTE PTR EaxSave,al
        btr     MpuFlags,MPU_FLAG_FMDET
        jnc     SHORT osrex
        bts     MpuFlags,MPU_FLAG_SYNTHON
        jc      SHORT osrex
        mov     _num_active_voices,12
        mov     ActiveCount,400
        call    SynthOn
osrex:
        jmp     NMIExit OplAddrW LABEL NEAR mov     OplAddr,cl
        jmp     NMIExit OplDataW LABEL NEAR xor     edx,edx                 ; OPL data reg write
        mov     dl,OplAddr
```

ENSQ-0153                                53                              PATENT

```
                mov     _fm_array[edx],cl       ; fill-in FM data array
                cmp     dl,01h
                je      SHORT oplenq
                mov     dh,dl
                and     dh,0f0h
                cmp     dh,0b0h                 ; need to process FM notes?
                jne     SHORT fmtdet
oplenq:
                mov     ActiveCount,400
                bts     MpuFlags,MPU_FLAG_SYNTHON
                jc      SHORT fmcall
                mov     _num_active_voices,12
                push    edx
                call    SynthOn
                pop     edx
fmcall:
                mov     eax,ds
                mov     SSoffset,esp            ; switch to local stack
                mov     SSselector,ss
                mov     esp,OFFSET StackTop
                mov     ss,eax
                push    es
                mov     es,eax
                cld
                ;
                push    edx
                call    _fm_process
                add     esp,4
                ;
                pop     es
                lss     esp,SpSave
                jmp     NMIExit
fmtdet:
                cmp     OplAddr,4               ; test for timer detection
                jne     NMIExit
fmdt1:
                test    cl,T1_TRIG
                jz      SHORT fmdt2
                or      OplStat,T1_IRQ OR FM_IRQ
                bts     MpuFlags,MPU_FLAG_FMDET
fmdt2:
                test    cl,T2_TRIG
                jz      SHORT fmdm1
                or      OplStat,T2_IRQ OR FM_IRQ
                bts     MpuFlags,MPU_FLAG_FMDET
fmdm1:
                test    cl,T1_MASK
                jz      SHORT fmdm2
                and     OplStat,NOT T1_IRQ
fmdm2:
                test    cl,T2_MASK
                jz      SHORT fmdtr
                and     OplStat,NOT T2_IRQ
fmdtr:
                test    OplStat,T1_IRQ OR T2_IRQ
                jnz     NMIExit
                and     OplStat,NOT FM_IRQ
                jmp     NMIExit IoNull  LABEL NEAR jmp     NMIExit SblSetSHH PROC bt      SblFlags,SBL_FLAG_SPKRON
                jnc     SHORT sssoff
                bts     SblFlags,SBL_FLAG_SHH
                mov     al,DACVol
                or      al,80h
                call    SetDACVol
```

ENSQ-0153                                54                              PATENT

```
sssoff:
        ret

SblSetSHH ENDP

SblClearSHH PROC btr     SblFlags,SBL_FLAG_SHH
        jnc     SHORT scsoff
        bt      SblFlags,SBL_FLAG_SPKRON
        jnc     SHORT scsoff
        mov     al,DACVol
        and     al,7fh
        call    SetDACVol
scsoff:
        ret SblClearSHH ENDP SblPutData PROC mov     SblData,al
        or      SblRxr,80h
        ret SblPutData ENDP MpuPutData PROC mov     MpuData,al
        and     MpuStat,NOT 80h
        ret MpuPutData ENDP IFNDEF WIN_CODE
        ; this process asserts the virtual Wave IRQ
AssertWaveIRQ PROC bt      DacFlags,DAC_FLAG_INTENA
        jc      SHORT awic0
        ret
awic0:
        bts     PicFlags,PIC_FLAG_VIRQ    ; assert virtual IRQ
        jnc     SHORT awic1               ; if already asserted, bail
        ret
awic1:
        call    EnableVirtualPIC
        bts     PicFlags,PIC_FLAG_VIRR    ; assert virtual IRR
        cmp     [esi.ssi_bIRQ],08h        ; are we on the master PIC?
        jae     SHORT awislv              ; if not, skip to slave sequence
        mov     al,MicMask                ; get master PIC mask state
        test    al,WaveIRQMask            ; is our IRQ masked?
        jnz     SHORT awipnd              ; if so, do pend sequence
        jmp     SHORT awifrc              ; else, skip to force PCI IRQ
awislv:
        mov     al,SicMask                ; get slave PIC mask state
        test    al,WaveIRQMask            ; is our IRQ masked?
        jnz     SHORT awipnd              ; if so, do pend sequence
        test    MicMask,04h               ; is the cascade IRQ masked?
        jnz     SHORT awifrc              ; if so, do pend sequence
        jmp     SHORT awifrc              ; esle, force it
awipnd:
        bts     PicFlags,PIC_FLAG_PEND    ; flag irq pending
        ret
awifrc:
        call    ForcePCIIRQ               ; force PCI IRQ
        ret
```

ENSQ-0153               55              PATENT

```
AssertWaveIRQ ENDP

; this process asserts the physical PCI IRQ
ForcePCIIRQ PROC mov     dx,[esi.ssi_wIOAddressConcert]      ; assert PCI IRQ
        add     dl,CONC_bNMICTL_OFF
        or      [esi.ssi_bNMICtl],01h
        mov     al,[esi.ssi_bNMICtl]
        out     dx,al
        ret ForcePCIIRQ ENDP ; this process clears physical PCI IRQ
ClearPCIIRQ PROC mov     dx,[esi.ssi_wIOAddressConcert]      ; assert PCI IRQ
        add     dl,CONC_bNMICTL_OFF
        and     [esi.ssi_bNMICtl],NOT 01h
        mov     al,[esi.ssi_bNMICtl]
        out     dx,al
        ret ClearPCIIRQ ENDP

ELSE

VirtIRQSet PROC bts     PicFlags,PIC_FLAG_VIRQ
        mov     ecx,ds
        mov     SSoffset,esp
        mov     SSselector,ss
        mov     esp,OFFSET StackTop
        mov     ss,ecx
        push    es
        mov     es,ecx
        cld
        ;
        mov     eax,[esi.ssi_dwIRQHandle]
        mov     ebx,[esi.ssi_dwCODECOwnerCur]
        VxDCall VPICD_Set_Int_Request
        ;
        pop     es
        lss     esp,SpSave
        ret VirtIRQSet ENDP VirtIRQClear PROC btr     PicFlags,PIC_FLAG_VIRQ
        mov     ecx,ds
        mov     SSoffset,esp
        mov     SSselector,ss
        mov     esp,OFFSET StackTop
        mov     ss,ecx
        push    es
        mov     es,ecx
        cld
        ;
        mov     eax,[esi.ssi_dwIRQHandle]
        mov     ebx,[esi.ssi_dwCODECOwnerCur]
        VxDCall VPICD_Clear_Int_Request
        ;
        pop     es
        lss     esp,SpSave
        ret
```

ENSQ-0153                                    56                              PATENT

```
VirtIRQClear ENDP
    ENDIF

WritePhys PROC

IFNDEF  WIN_CODE
        push    es
        mov     ebx,cs
        add     ebx,10h
        mov     es,ebx
wphylp:
        mov     es:[edx],al
        inc     edx
        loop    wphylp
        pop     es
        ELSE
        mov     ebx,ds
        mov     SSoffset,esp
        mov     SSselector,ss
        mov     esp,OFFSET StackTop
        mov     ss,ebx
        push    es
        mov     es,ebx
        cld
        call    HARDWARE_PhysMemWrite
        pop     es
        lss     esp,SpSave
        ENDIF
        ret WritePhys ENDP DACSetRate PROC xor     ecx,ecx
        mov     cx,ax
        mov     eax,22579200/8
        xor     edx,edx
        div     ecx
        shr     eax,1
        jnc     SHORT cradj
        inc     eax
cradj:
        sub     eax,2
        mov     dx,[esi.ssi_wIOAddressConcert]
        add     dl,CONC_wDACRATE_OFF
        and     [esi.ssi_wDACRate],0e000h
        or      [esi.ssi_wDACRate],ax
        mov     ax,[esi.ssi_wDACRate]
        out     dx,ax
        ret DACSetRate ENDP SynthOn PROC xor     eax,eax
        mov     edx,[esi.ssi_lpDMABufferLinear3]
        mov     ecx,512
soclr:
        mov     [edx],eax
        add     edx,4
        loop    soclr mov     dx,[esi.ssi_wIOAddressConcert]
        add     dl,CONC_bMEMPAGE_OFF
        mov     al,CONC_SYNCTL_PAGE
        out     dx,al
        add     dl,CONC_dSYNPADDR_OFF - CONC_bMEMPAGE_OFF
        mov     eax,[esi.ssi_lpDMABufferPhys3]
```

ENSQ-0153

```
        out     dx,eax
        add     dl,CONC_wSYNFC_OFF - CONC_dSYNPADDR_OFF
        mov     eax,511
        out     dx,eax
        add     dl,CONC_wSYNIC_OFF - CONC_wSYNFC_OFF
        mov     ax,255
        out     dx,ax add     dl,CONC_bSERFMT_OFF - CONC_wSYNIC_OFF
        or      [esi.ssi_bSerFmt],03h
        mov     al,[esi.ssi_bSerFmt]
        out     dx,al
        add     dl,CONC_bSERCTL_OFF - CONC_bSERFMT_OFF
        and     [esi.ssi_bSerCtl],NOT 28h
        or      [esi.ssi_bSerCtl],01h
        mov     al,[esi.ssi_bSerCtl]
        out     dx,al
        add     dl,CONC_bDEVCTL_OFF - CONC_bSERCTL_OFF
        or      [esi.ssi_bDevCtl],40h
        mov     al,[esi.ssi_bDevCtl]
        out     dx,al IFNDEF WIN_CODE
        push    ebx
        mov     bl,01h
        call    DebugCtl
        pop     ebx
    ENDIF
        ret SynthOn ENDP ; kill the synth machine
SynthOff PROC mov     dx,[esi.ssi_wIOAddressConcert]
        add     dl,CONC_bDEVCTL_OFF
        and     [esi.ssi_bDevCtl],NOT 40h
        mov     al,[esi.ssi_bDevCtl]
        out     dx,al
        ret SynthOff ENDP ; startup the DAC (or defer startup if the vDMAC is masked).
DACStart PROC ; this is a new DAC startup ... need to kill DAC ?
        test    DacFlags,(1 SHL DAC_FLAG_PAUSE) OR (1 SHL DAC_FLAG_IODAC)
        jz      SHORT dsnokill
        and     DacFlags,NOT ((1 SHL DAC_FLAG_PAUSE) OR (1 SHL DAC_FLAG_IODAC))
        mov     dx,[esi.ssi_wIOAddressConcert]
        add     dl,CONC_bDEVCTL_OFF
        and     [esi.ssi_bDevCtl],NOT 20h
        mov     al,[esi.ssi_bDevCtl]
        out     dx,al
dsnokill:
        bt      DmaFlags,DMA_FLAG_MASK
        jc      SHORT dsdefer
        call    DACGoDammit
        ret
dsdefer:
        bts     DmaFlags,DMA_FLAG_DRQ
        bts     DacFlags,DAC_FLAG_PEND
        ret DACStart ENDP DACGoDammit PROC
```

ENSQ-0153                           58                              PATENT

```
        ; clear pending flags
        btr     DacFlags,DAC_FLAG_PEND
        btr     DmaFlags,DMA_FLAG_DRQ ; derive the skip counts
        mov     al,08h
        test    [esi.ssi_bSerFmt],08h
        jz      SHORT dgnot16
        shl     eax,1
dgnot16:
        mov     NormalSkip,al
        mov     al,BYTE PTR DmaAddr
        and     al,03h
        mov     StartSkip,al
        mov     al,03h
        sub     al,StartSkip
        sub     al,BYTE PTR DmaCount
        and     al,03h
        add     al,StartSkip
        mov     ExtraBytes,al
        shl     eax,3
        add     al,NormalSkip
        mov     EndSkip,al ; derive some other count varibales
        xor     eax,eax
        xor     ecx,ecx
        xor     edx,edx
        mov     ax,DmaCount
        mov     cx,DACCount
        mov     dl,ExtraBytes
        inc     eax
        inc     ecx
        add     edx,eax
        test    [esi.ssi_bSerFmt],04h
        jz      SHORT dgnots
        shr     eax,1
        shr     ecx,1
dgnots:
        test    [esi.ssi_bSerFmt],08h
        jz      SHORT dgnotw
        shr     eax,1
        shr     ecx,1
dgnotw:
        or      eax,eax
        jz      SHORT dgnod0
        dec     eax
dgnod0:
        mov     DMACountSamples,ax
        or      ecx,ecx
        jz      SHORT dgnod1
        dec     ecx
dgnod1:
        mov     DACCountSamples,cx
        shr     edx,2
        or      edx,edx
        jz      SHORT dgnod2
        dec     edx
dgnod2:
        mov     DMACountDWords,dx ; Now, see if we have to stop an already-running DAC
        bt      DacFlags,DAC_FLAG_RUNNING
        jnc     SHORT dgdostart
        mov     dx,[esi.ssi_wIOAddressConcert]
        add     dl,CONC_bDEVCTL_OFF
        and     [esi.ssi_bDevCtl],NOT 20h
        mov     al,[esi.ssi_bDevCtl]
        out     dx,al ; test for special case - was running, got new DAC count of ZERO
        cmp     DACCountSamples,0000h
        jne     SHORT dgdostart
```

ENSQ-0153                                    59                            PATENT

```
        btr     DacFlags,DAC_FLAG_RUNNING
IFNDEF WIN_CODE
        call    AssertWaveIRQ
ELSE
        call    VirtIRQSet
ENDIF
        ret dgdostart:
        ; Finally we're starting this thing - first flag it
        bts     DacFlags,DAC_FLAG_RUNNING ; setup the upper portion of the 32-bit host address
        xor     eax,eax
        mov     dx,[esi.ssi_DMAPageReg]
        in      al,dx
        shl     eax,16

; get our I/O address, pause, and write DMA addr
        mov     dx,[esi.ssi_wIOAddressConcert]
        mov     ecx,400
        call    DisableBusMaster
dgwait:
        in      al,dx
        loop    dgwait
        call    EnableBusMaster
        add     dl,CONC_bMEMPAGE_OFF
        mov     al,CONC_DACCTL_PAGE
        out     dx,al
        add     dl,CONC_dDACPADDR_OFF - CONC_bMEMPAGE_OFF
        mov     ax,DmaAddr
        out     dx,eax ; program DMA count (if necessary)
        add     dl,CONC_wDACFC_OFF - CONC_dDACPADDR_OFF
        btr     DmaFlags,DMA_FLAG_SCOUNT
        jc      SHORT dgdcw
        xor     eax,eax
        mov     ax,DMACountDWords
        out     dx,eax
dgdcw:
        ; now test the DAC mode and go to the proper startup sequence
        bt      DacFlags,DAC_FLAG_AUTO
        jc      DGAuto
        bt      DmaFlags,DMA_FLAG_AUTO
        jc      DGSimAuto ; This is a real single-mode startup - single DAC, single DMA
DGSingle:
        mov     IperBuff,0ffffh
        xor     eax,eax
        xor     ecx,ecx
        mov     ax,DmaCountCurr
        mov     cx,DACCount
        inc     ecx
        sub     eax,ecx
        jnc     SHORT dgsm00
        mov     IperBuff,0000h
        cmp     ax,0ffffh
        je      SHORT dgsm00
        mov     ax,0ffffh
        btr     DacFlags,DAC_FLAG_INTENA
dgsm00:
        mov     DmaTermCount,ax
        mov     cx,DmaCountCurr
        sub     ecx,eax
        add     cx,DmaAddrCurr
        mov     DmaTermAddr,cx add     dl,CONC_wDACIC_OFF - CONC_wDACFC_OFF
        mov     ax,DACCountSamples
        out     dx,ax
dgrips:
```

ENSQ-0153

```
            ; single mode - let it rip
            mov     dx,[esi.ssi_wIOAddressConcert]
            add     dl,CONC_bSKIPC_OFF
            mov     al,StartSkip
            out     dx,al
            add     dl,CONC_bSERCTL_OFF - CONC_bSKIPC_OFF
            and     [esi.ssi_bSerCtl],NOT 10h
            or      [esi.ssi_bSerCtl],42h
            mov     al,[esi.ssi_bSerCtl]
            out     dx,al
            add     dl,CONC_bDEVCTL_OFF - CONC_bSERCTL_OFF
            or      [esi.ssi_bDevCtl],20h
            mov     al,[esi.ssi_bDevCtl]
            out     dx,al
            ret ; This is simulated auto-mode startup - single DAC, auto DMA
DGSimAuto:
            mov     ax,DACCount
            cmp     ax,DmaCount
            ja      dgsa02
dgsa00:
            ; this would be the "normal" sim-auto case - DAC is <= DMA count
            bts     DmaFlags,DMA_FLAG_SCOUNT
            mov     IPerDisp,0
            mov     IPerDispCurr,0
            mov     IPerBuff,0ffffh
            xor     eax,eax
            xor     ecx,ecx
            mov     ax,DmaCountCurr
            mov     cx,DACCount
            inc     ecx
            sub     eax,ecx
            jnc     SHORT dgsa01
            mov     IperBuff,0
            add     ax,DmaCount
            inc     eax
dgsa01:
            mov     DmaTermCount,ax
            mov     cx,DmaCountCurr
            sub     ecx,eax
            add     cx,DmaAddrCurr
            mov     DmaTermAddr,cx add     dl,CONC_wDACIC_OFF - CONC_wDACFC_OFF
            mov     ax,DACCountSamples
            out     dx,ax
            jmp     dgrips ; sim-auto, big DAC
dgsa02:
            mov     ax,DmaCount
            mov     DmaTermCount,ax
            mov     ax,DmaAddr
            mov     DmaTermAddr,ax
            cmp     ExtraBytes,0
            jne     dgsa03

; sim-auto, big DAC, aligned
            mov     IPerDisp,0
            mov     IPerDispCurr,0
            mov     IPerBuff,0
            ;
            add     dl,CONC_wDACIC_OFF - CONC_wDACFC_OFF
            mov     ax,DACCountSamples
            out     dx,ax
            jmp     dgrips
dgsa03:
            ; sim-auto, big DAC, unaligned
            xor     eax,eax
            xor     edx,edx
            xor     ecx,ecx
            mov     ax,DACCount
```

ENSQ-0153                                61                              PATENT

```
        inc     eax
        mov     cx,DmaCount
        inc     ecx
        div     ecx
        dec     eax
        mov     IperDisp,ax
        mov     IperDispCurr,ax
        mov     IPerBuff,0 mov     dx,[esi.ssi_wIOAddressConcert]
        add     dl,CONC_wDACIC_OFF
        mov     ax,DMACountSamples
        out     dx,ax
        jmp     dgripa DGAuto: ; This is real auto-mode startup - auto DAC, auto DMA
        ; two sub-cases arise here ... DACCount <= DmaCount or >.
        ; if > is the case, weird alignment will need special treatment
        mov     ax,DACCount
        cmp     ax,DmaCount
        jbe     dgam01

; Auto Big DAC case here

; check for weird alignment
        cmp     ExtraBytes,00h
        jne     SHORT dgam00

; this is the Auto Big DAC, normal case
        mov     IperBuff,0
        mov     IperBuffCurr,0
        mov     IperDisp,0
        mov     IperDispCurr,0
        ;
        add     dl,CONC_wDACIC_OFF - CONC_wDACFC_OFF
        mov     ax,DACCountSamples
        out     dx,ax
dgam00:
        ; this is the big DAC, unaligned case - must int per DMA buff
        mov     IperBuff,0
        mov     IperBuffCurr,0
        xor     eax,eax
        xor     ecx,ecx
        xor     edx,edx
        mov     ax,DACCount
        inc     eax
        mov     cx,DmaCount
        inc     ecx
        div     ecx
        dec     eax
        mov     IperDisp,ax
        mov     IperDispCurr,ax
        ;
        mov     dx,[esi.ssi_wIOAddressConcert]
        add     dl,CONC_wDACIC_OFF
        mov     ax,DMACountSamples
        out     dx,ax
        jmp     SHORT dgripa
dgam01:
        ; small DAC ... derive ints per buff
        xor     eax,eax
        xor     ecx,ecx
        xor     edx,edx
        mov     ax,DmaCount
        inc     eax
        mov     cx,DACCount
        inc     ecx
        div     ecx
        dec     eax
        mov     IperBuff,ax
        mov     IperBuffCurr,ax
        ;
```

```
                mov     IperDisp,0
                mov     IperDispCurr,0
                ;
                ; program the interrupt count
                mov     dx,[esi.ssi_wIOAddressConcert]
                add     dl,CONC_wDACIC_OFF
                mov     ax,DACCountSamples
                out     dx,ax
dgripa:
                ; auto mode - let it rip
                mov     dx,[esi.ssi_wIOAddressConcert]
                add     dl,CONC_bSKIPC_OFF
                mov     al,NormalSkip
                cmp     IperBuff,0
                jne     SHORT dgnoes
                mov     al,EndSkip
dgnoes:
                or      al,StartSkip
                out     dx,al
                add     dl,CONC_bSERCTL_OFF - CONC_bSKIPC_OFF
                and     [esi.ssi_bSerCtl],NOT 50h
                or      [esi.ssi_bSerCtl],02h
                mov     al,[esi.ssi_bSerCtl]
                out     dx,al
                add     dl,CONC_bDEVCTL_OFF - CONC_bSERCTL_OFF
                or      [esi.ssi_bDevCtl],20h
                mov     al,[esi.ssi_bDevCtl]
                out     dx,al
                ret DACGoDammit ENDP DACStop PROC mov     DacFlags,0000h OR (1 SHL DAC_FLAG_INTENA)
                mov     dx,[esi.ssi_wIOAddressConcert]
                add     dl,CONC_bSERFMT_OFF
                and     [esi.ssi_bSerFmt],NOT 40h
                mov     al,[esi.ssi_bSerFmt]
                out     dx,al
                add     dl,CONC_bDEVCTL_OFF - CONC_bSERFMT_OFF
                and     [esi.ssi_bDevCtl],NOT 20h
                mov     al,[esi.ssi_bDevCtl]
                out     dx,al
                ret DACStop ENDP DACPause PROC btr     DmaFlags,DMA_FLAG_DRQ
                btr     DacFlags,DAC_FLAG_PEND
                bt      DacFlags,DAC_FLAG_RUNNING
                jnc     SHORT dpexit
                bt      DacFlags,DAC_FLAG_PAUSE
                jc      SHORT dpexit
                ;
                mov     dx,[esi.ssi_wIOAddressConcert]
                add     dl,CONC_wDACCIC_OFF
        call DisableBusMaster
                in      ax,dx
        call EnableBusMaster
                cmp     ax,0001h
                ja      SHORT dpdoit
                ;
                mov     ecx,1000h
        call DisableBusMaster
dpwz:
                in      ax,dx
                or      ax,ax
                loopnz  SHORT dpwz
```

ENSO-0153                              63                              PATENT

```
        call    EnableBusMaster
        ;
        mov     ecx,1000h
        call    DisableBusMaster
dpwnz:
        in      ax,dx
        or      ax,ax
        loopz   SHORT dpwnz
        call    EnableBusMaster
        ;
        bt      DacFlags,DAC_FLAG_AUTO
        jnc     SHORT dpexit
dpdoit:
        btr     DacFlags,DAC_FLAG_RUNNING
        bts     DacFlags,DAC_FLAG_PAUSE
        add     dl,CONC_bSERCTL_OFF - CONC_wDACCIC_OFF
        or      [esi.ssi_bSerCtl],10h
        mov     al,[esi.ssi_bSerCtl]
        out     dx,al
dpexit:
        ret DACPause ENDP DACResume PROC bt      DacFlags,DAC_FLAG_PAUSE
        jnc     SHORT drexit
        bt      DmaFlags,DMA_FLAG_MASK
        jnc     SHORT drdoit
        bts     DmaFlags,DMA_FLAG_DRQ
        ret
drdoit:
        btr     DmaFlags,DMA_FLAG_DRQ
        btr     DacFlags,DAC_FLAG_PAUSE
        bts     DacFlags,DAC_FLAG_RUNNING
        mov     dx,[esi.ssi_wIOAddressConcert]
        add     dl,CONC_bSERCTL_OFF
        and     [esi.ssi_bSerCtl],NOT 10h
        or      [esi.ssi_bSerCtl],02h
        mov     al,[esi.ssi_bSerCtl]
        out     dx,al
drexit:
        ret DACResume ENDP SetDACVol PROC mov     DACVol,al
        mov     ah,al
        and     ah,80h
        and     al,7fh
        shr     al,2
        cmp     al,06h
        jb      SHORT sdvok
        sub     al,06h
sdvok:
        not     al
        and     al,1fh
        or      al,ah
        mov     ah,02h
        call    CODECWrite
        mov     ah,03h
        call    CODECWrite
        ret SetDACVol ENDP SetMasterVol PROC
```

ENSQ-0153                                64                              PATENT

```
        mov     MasterVol,al
        mov     ah,al
        and     ah,80h
        and     al,7fh
        shr     al,2
        not     al
        and     al,1fh
        or      al,ah
        mov     ah,00h
        call    CODECWrite
        mov     ah,01h
        call    CODECWrite
        ret SetMasterVol ENDP SetSynthVol PROC and     al,7fh
        mov     SynthVol,al
        shr     al,2
        cmp     al,06h
        jb      SHORT ssvok
        sub     al,06h
ssvok:
        not     al
        and     al,1fh
        mov     ah,04h
        call    CODECWrite
        mov     ah,05h
        call    CODECWrite
        ret SetSynthVol ENDP SetCDVol PROC and     al,7fh
        mov     CDVol,al
        shr     al,2
        cmp     al,05h
        jb      SHORT scvok
        sub     al,05h
scvok:
        not     al
        and     al,1fh
        mov     ah,06h
        call    CODECWrite
        mov     ah,07h
        call    CODECWrite
        ret SetCDVol ENDP CODECWrite PROC mov     dx,[esi.ssi_wIOAddressConcert]
        add     dl,CONC_bCODECSTAT_OFF
        push    eax
        mov     ecx,100h
    call DisableBusMaster
cwrlp:
        in      al,dx
        test    al,01h
        loopnz  cwrlp
    call EnableBusMaster
        pop     eax
        add     dl,CONC_wCODECCTL_OFF - CONC_bCODECSTAT_OFF
        out     dx,ax
```

```
ENSO-0153                          65                       PATENT ret
CODECWrite ENDP

IFNDEF WIN_CODE

ISRAssertWaveIRQ PROC bt      DacFlags,DAC_FLAG_INTENA
        jc      SHORT iawc0
        ret
iawc0:
        bts     PicFlags,PIC_FLAG_VIRQ  ; assert virtual IRQ
        jnc     SHORT iawc1             ; if already asserted, skip
        ret
iawc1:
        call    EnableVirtualPIC
        bts     PicFlags,PIC_FLAG_VIRR  ; assert virtual IRR
        cmp     [esi.ssi_bIRQ],08h      ; are we on the master PIC?
        jae     SHORT iawslv            ; if not, skip to slave sequence
        mov     al,MicMask              ; get master PIC mask state
        test    al,WaveIRQMask          ; is our IRQ masked?
        jnz     SHORT iawpnd            ; if so, re-assert pend
        jmp     SHORT iawdis            ; else, skip to dispatch
iawslv:
        mov     al,SicMask              ; get slave PIC mask state
        test    al,WaveIRQMask          ; is our IRQ masked?
        jnz     SHORT iawpnd            ; if so, re-assert pend
        test    MicMask,04h             ; is the cascade IRQ masked?
        jnz     SHORT iawpnd            ; if so, re-assert pend
        jmp     SHORT iawdis            ; else, do it
iawpnd:
        bts     PicFlags,PIC_FLAG_PEND  ; flag irq pending
        ret
iawdis:
        bts     PicFlags,PIC_FLAG_WAIT  ; flag virtual service sequence
        ret ISRAssertWaveIRQ ENDP

ENDIF

IRQService PROC test    bl,80h                  ; forced int?
        jz      SHORT iswave
    IFNDEF WIN_CODE
        bts     PicFlags,PIC_FLAG_WAIT
    ELSE
        bts     PicFlags,PIC_FLAG_VIRQ  ; assert virtual IRQ
        mov     eax, [esi.ssi_dwIRQHandle]
        mov     ebx, [esi.ssi_dwCODECOwnerCur]
        VxDCall VPICD_Set_Int_Request
    ENDIF
        ret
iswave:
        test    bl,02h                  ; wave int?
        jz      issynt                  ; if not, test synth int ; here we go - wave IRQ, case it out ...
        bt      DacFlags,DAC_FLAG_AUTO
        jc      ISAuto
        bt      DmaFlags,DMA_FLAG_AUTO
        jc      ISSimAuto
ISSingle:
        btr     DacFlags,DAC_FLAG_RUNNING
        btr     SblFlags,SBL_FLAG_HISPEED
        mov     dx,[esi.ssi_wIOAddressConcert]
        add     dl,CONC_bSERFMT_OFF
        or      [esi.ssi_bSerFmt],40h
        mov     al,[esi.ssi_bSerFmt]
        out     dx,al
```

ENSQ-0153                              66                              PATENT

```
              add    dl,CONC_bDEVCTL_OFF - CONC_bSERFMT_OFF
              and    [esi.ssi_bDevCtl],NOT 20h
              mov    al,[esi.ssi_bDevCtl]
              out    dx,al
              add    dl,CONC_bSERCTL_OFF - CONC_bDEVCTL_OFF
              and    [esi.ssi_bSerCtl],NOT 02h
              mov    al,[esi.ssi_bSerCtl]
              out    dx,al
              or     [esi.ssi_bSerCtl],02h
              mov    al,[esi.ssi_bSerCtl]
              out    dx,al
              mov    ax,DmaTermAddr
              mov    DmaAddrCurr,ax
              mov    ax,DmaTermCount
              mov    DmaCountCurr,ax
              cmp    IperBuff,0000h
              jne    SHORT issm00
              mov    al,[esi.ssi_DmaTCMask]
              or     DmaStatus,al
issm00:
              jmp    ISDisp ISSimAuto:
              mov    ax,DACCount
              cmp    ax,DmaCount
              jbe    ISSingle
              cmp    ExtraBytes,00h
              je     ISSingle ; sim-auto, big DAC, unaligned ...
              mov    dx,[esi.ssi_wIOAddressConcert]
              add    dl,CONC_bSERCTL_OFF
              sub    IPerDispCurr,1
              jc     SHORT issa01
              jnz    SHORT issa00
              or     [esi.ssi_bSerCtl],40h
issa00:
              and    [esi.ssi_bSerCtl],NOT 02h
              mov    al,[esi.ssi_bSerCtl]
              out    dx,al
              or     [esi.ssi_bSerCtl],02h
              mov    al,[esi.ssi_bSerCtl]
              out    dx,al
              ret
issa01:
              btr    DacFlags,DAC_FLAG_RUNNING
              btr    SblFlags,SBL_FLAG_HISPEED
              add    dl,CONC_bSERFMT_OFF - CONC_bSERCTL_OFF
              or     [esi.ssi_bSerFmt],40h
              mov    al,[esi.ssi_bSerFmt]
              out    dx,al
              add    dl,CONC_bDEVCTL_OFF - CONC_bSERFMT_OFF
              and    [esi.ssi_bDevCtl],NOT 20h
              mov    al,[esi.ssi_bDevCtl]
              out    dx,al
              add    dl,CONC_bSERCTL_OFF - CONC_bDEVCTL_OFF
              and    [esi.ssi_bSerCtl],NOT 02h
              mov    al,[esi.ssi_bSerCtl]
              out    dx,al
              or     [esi.ssi_bSerCtl],02h
              mov    al,[esi.ssi_bSerCtl]
              out    dx,al
              mov    ax,DmaTermAddr
              mov    DmaAddrCurr,ax
              mov    ax,DmaTermCount
              mov    DmaCountCurr,ax
              mov    al,[esi.ssi_DmaTCMask]
              or     DmaStatus,al
              jmp    ISDisp
ISAuto:
              mov    dx,[esi.ssi_wIOAddressConcert]
              add    dl,CONC_bSERCTL_OFF
              and    [esi.ssi_bSerCtl],NOT 02h
```

ENSQ-0153

```
            mov     al,[esi.ssi_bSerCtl]
            out     dx,al
            or      [esi.ssi_bSerCtl],02h
            mov     al,[esi.ssi_bSerCtl]
            out     dx,al
            ;
            cmp     IperBuff,0
            je      SHORT isam01
            ; adjust buffer count
            sub     IperBuffCurr,1
            jc      SHORT isam00
            jnz     SHORT isam02
            ; setup end skip
            add     dl,CONC_bSKIPC_OFF - CONC_bSERCTL_OFF
            mov     al,EndSkip
            out     dx,al
            jmp     SHORT isam02
isam00:     ; restore end skip
            mov     ax,IperBuff
            mov     IperBuffCurr,ax
            add     dl,CONC_bSKIPC_OFF - CONC_bSERCTL_OFF
            mov     al,NormalSkip
            out     dx,al
isam01:     ; setup DMA TC status
            mov     al,[esi.ssi_DmaTCMask]
            or      DmaStatus,al
isam02:     ; evaluate int dispatch
            cmp     IperDisp,0
            je      ISDisp
            sub     IperDispCurr,1
            jnc     isam03
            mov     ax,IperDisp
            mov     IperDispCurr,ax
            jmp     ISDisp
isam03:     ; we're outta here ...
            ret
ISDisp:
            bt      DacFlags,DAC_FLAG_INTENA
            jnc     SHORT isnodis
    IFNDEF WIN_CODE
            call    ISRAssertWaveIRQ
    ELSE
            bts     PicFlags,PIC_FLAG_VIRQ  ; assert virtual IRQ
            mov     eax, [esi.ssi_dwIRQHandle]
            mov     ebx, [esi.ssi_dwCODECOwnerCur]
            VxDCall VPICD_Set_Int_Request
    ENDIF
isnodis:
            ret btr     SblFlags,SBL_FLAG_HISPEED
            bt      DmaFlags,DMA_FLAG_AUTO   ; if DMA in auto, skip
            jc      SHORT isdmaa
            bts     DmaFlags,DMA_FLAG_MASK   ; auto-mask controller
isdmaa:
            mov     DmaCountCurr,0ffffh      ; expire DMA count
            mov     al,[esi.ssi_DmaTCMask]   ; set terminal condition
            or      DmaStatus,al
            btr     DacFlags,DAC_FLAG_RUNNING
            mov     dx,[esi.ssi_wIOAddressConcert]
            add     dl,CONC_bSERFMT_OFF
            or      [esi.ssi_bSerFmt],40h    ; no zeros!!!
            mov     al,[esi.ssi_bSerFmt]
            out     dx,al
            add     dl,CONC_bDEVCTL_OFF - CONC_bSERFMT_OFF
            and     [esi.ssi_bDevCtl],NOT 20h
            mov     al,[esi.ssi_bDevCtl]     ; turn DAC off
            out     dx,al mov     dx,[esi.ssi_wIOAddressConcert]     ; re-arm int
            add     dl,CONC_bSERCTL_OFF
            and     [esi.ssi_bSerCtl],NOT 02h
            mov     al,[esi.ssi_bSerCtl]
```

ENSQ-0153                          68                          PATENT

```
                out     dx,al
                or      [esi.ssi_bSerCtl],02h
                mov     al,[esi.ssi_bSerCtl]
                out     dx,al
isfdis:
                bt      DacFlags,DAC_FLAG_INTENA
                jnc     SHORT issynt
        IFNDEF WIN_CODE
                call    ISRAssertWaveIRQ
        ELSE
                bts     PicFlags,PIC_FLAG_VIRQ    ; assert virtual IRQ
                mov     eax, [esi.ssi_dwIRQHandle]
                mov     ebx, [esi.ssi_dwCODECOwnerCur]
                VxDCall VPICD_Set_Int_Request
        ENDIF
issynt:
                test    bl,04h                    ; got a synth int?
                jz      SHORT isexit              ; if not, we're outta here
                ;
                mov     dx,[esi.ssi_wIOAddressConcert]
                add     dl,CONC_bSERCTL_OFF       ; reset synth DAC count
                and     [esi.ssi_bSerCtl],NOT 01h
                mov     al,[esi.ssi_bSerCtl]      ; re-arm int
                out     dx,al
                or      [esi.ssi_bSerCtl],01h
                mov     al,[esi.ssi_bSerCtl]
                out     dx,al
                ;
                add     dl,CONC_bMEMPAGE_OFF - CONC_bSERCTL_OFF
                mov     al,CONC_SYNCTL_PAGE
                out     dx,al
                add     dl,CONC_wSYNCFC_OFF - CONC_bMEMPAGE_OFF
        call DisableBusMaster
                in      ax,dx
        call EnableBusMaster
                mov     edx,[esi.ssi_lpDMABufferLinear3]
                cmp     ax,256
                jae     SHORT isdoup
                add     edx,4*256
isdoup:
                cmp     ActiveCount,0
                je      SHORT iskill
                dec     ActiveCount
                push    edx
                call    _synth_update
                add     esp,4
isexit:
                ret
iskill:
                push    0ffffffffh
                call    _synth_all_notes_off
                add     esp,4
                mov     ActiveCount,0
                btr     MpuFlags,MPU_FLAG_SYNTHON
                call    SynthOff
                call    _synth_reinit_voices
                ret IRQService ENDP IFNDEF WIN_CODE
VcpiService:
                cmp     ax,0de0ch                 ; handle goto v86 mode separately
                je      VSGoV86
                ;
                ; The following sequence handles all protected mode VCPI far-calls
                ; with the exception of the switch-to-v86-mode call.
                ; Here we have intercepted the far call and must translate it to the
                ; real EMS VCPI handler whose selectors were stored at init time.
                ; - Do NOT trash the eax or edx register entry values.
                ; - Restore ALL registers before returning.
                ;
```

ENSQ-0153

```
             pushfd
             cli                              ; no ints!
             push    ecx                      ; save minimum regs
             mov     ecx,cs
             add     ecx,08h
             push    ds
             mov     ds,ecx
             mov     SSoffset,esp
             mov     esp,OFFSET StackTop      ; switch to local stack
             mov     SSselector,ss
             mov     ss,ecx
             push    es                       ; setup global data selector
             add     ecx,08h
             mov     es,ecx
             push    ebx                      ; save some working regs mov     ecx,0008h                ; find a GDT patch entry
             mov     ebx,cs
             cmp     ebx,0020h
             jae     SHORT csok
             mov     ecx,ebx
             add     ecx,0018h
csok:
             mov     VEselector,cx            ; note GDT entry for call
             sgdt    ClientTab
             mov     ebx,CTladdr              ; point into client table
             add     ebx,ecx mov     ecx,es:[ebx+00h]         ; save current entries
             mov     SaveGentries+00h,ecx
             mov     ecx,es:[ebx+04h]
             mov     SaveGentries+04h,ecx
             mov     ecx,es:[ebx+08h]
             mov     SaveGentries+08h,ecx
             mov     ecx,es:[ebx+0ch]
             mov     SaveGentries+0ch,ecx
             mov     ecx,es:[ebx+10h]
             mov     SaveGentries+10h,ecx
             mov     ecx,es:[ebx+14h]
             mov     SaveGentries+14h,ecx mov     ecx,VcpiGentries+00h     ; patch w/ saved VCPI entries
             mov     es:[ebx+00h],ecx
             mov     ecx,VcpiGentries+04h
             mov     es:[ebx+04h],ecx
             mov     ecx,VcpiGentries+08h
             mov     es:[ebx+08h],ecx
             mov     ecx,VcpiGentries+0ch
             mov     es:[ebx+0ch],ecx
             mov     ecx,VcpiGentries+10h
             mov     es:[ebx+10h],ecx
             mov     ecx,VcpiGentries+14h
             mov     es:[ebx+14h],ecx
             ;
             call    VcpiEntry                ; make the real VCPI call
             ;
             mov     ecx,SaveGentries+00h     ; restore original client entries
             mov     es:[ebx+00h],ecx
             mov     ecx,SaveGentries+04h
             mov     es:[ebx+04h],ecx
             mov     ecx,SaveGentries+08h
             mov     es:[ebx+08h],ecx
             mov     ecx,SaveGentries+0ch
             mov     es:[ebx+0ch],ecx
             mov     ecx,SaveGentries+10h
             mov     es:[ebx+10h],ecx
             mov     ecx,SaveGentries+14h
             mov     es:[ebx+14h],ecx pop     ebx                      ; restore working regs
             pop     es                       ; restore global selector
             lss     esp,SpSave               ; restore stack
             pop     ds
```

ENSQ-0153                              70                           PATENT

```
        pop     ecx
        popfd                           ; restore other stuff
        retf ; This is the intercept of the VCPI Client's protected-mode
        ; (USE32) far call to the switch-to-v86-mode function.
VSGoV86:
        ; We can use eax here as long as we explicitly resore it to
        ; xxxxde0ch when we're done (or just save/resore it). In any case,
        ; it's probably not save to grow the client stack for this call,
        ; i. e., don't push anything.
        ; We can completely trash first 8 bytes of the stack for temp
        ; storage since neither we nor the real VCPI Server will be
        ; performing a USE32 far return to the VCPI Client.
        ; All segment registers can be trashed except ds.
        ;
        mov     [esp],ebx               ; save some regs
        mov     [esp+4],ds
        mov     eax,cs                  ; setup seg registers
        add     eax,08h
        mov     ds,eax                  ; ds is for our data
        add     eax,08h
        mov     es,eax                  ; es is for the full linear space ; Here we need to tell the VCPI mode switch call to return
        ; to our v86 code instead of the client's. Save the client's
        ; v86 return address in the shared memory space so our v86
        ; code can eventually return to it.
        ;
        mov     eax,[esp+10]            ; save client v86 destination
        mov     ax,[esp+8]
        mov     ebx,pSharedData
        mov     es:[ebx+4],eax
        ;
        mov     eax,VFoffset            ; setup our v86 destination
        mov     [esp+8],eax
        mov     eax,VFsegment
        mov     [esp+12],eax
        mov     eax,cs
        mov     VEselector,ax           ; note selector for far call
        sgdt    ClientTab
        mov     ebx,CTladdr             ; point to client GDT patch entry
        add     ebx,eax
        ;
        mov     CTladdr,ebx             ; save GDT entry laddr for later fixup
        mov     eax,cr3                 ; save client's cr3
        mov     ClientCr3,eax
        ;
        mov     eax,VcpiGentries+00h    ; copy-in the real VCPI GDT entries
        mov     es:[ebx+00h],eax
        mov     eax,VcpiGentries+04h
        mov     es:[ebx+04h],eax
        mov     eax,VcpiGentries+08h
        mov     es:[ebx+08h],eax
        mov     eax,VcpiGentries+0ch
        mov     es:[ebx+0ch],eax
        mov     eax,VcpiGentries+10h
        mov     es:[ebx+10h],eax
        mov     eax,VcpiGentries+14h
        mov     es:[ebx+14h],eax
        ;
        mov     ds,[esp+4]
        mov     ebx,[esp]               ; restore regs
        mov     eax,0000de0ch
        jmp     cs:VcpiEntry            ; go to the real VCPI switch handler DebugService:
        push    ecx
        mov     ecx,cs
        add     ecx,08h
        push    ds
```

ENSQ-0153                           71                    PATENT

```
            mov     ds,ecx
            mov     ecx,dr6
            test    ecx,08h
            jz      dsexit
            push    eax
            push    edx
            push    esi
            mov     esi,gpSSI
            and     ecx,NOT 08h
            mov     dr6,ecx
            cmp     KBLastByte,0e0h
            mov     KBLastByte,al
            jne     SHORT dskbex
            cmp     al,30h
            je      SHORT dsvup
            cmp     al,2eh
            je      SHORT dsvdn
            cmp     al,20h
            je      SHORT dsvmu
            jmp     SHORT dskbex
dsvup:
            mov     al,MasterVol
            and     al,7fh
            cmp     al,127-4
            ja      SHORT dskdo0
            add     al,4
            call    SetMasterVol
            jmp     SHORT dskdo0
dsvdn:
            mov     al,MasterVol
            and     al,7fh
            cmp     al,4
            jb      SHORT dskdo0
            sub     al,4
            call    SetMasterVol
            jmp     SHORT dskdo0
dsvmu:
            mov     al,MasterVol
            xor     al,80h
            call    SetMasterVol
            ; jmp      SHORT dskdo0
dskdo0:
            mov     eax,ss
            lar     eax,eax
            test    eax,400000h
            jnz     SHORT dsspok
            and     esp,0ffffh
dsspok:
            mov     BYTE PTR [esp+8],0
dskbex:
            pop     esi
            pop     edx
            pop     eax
            pop     ds
            pop     ecx
            iretd
dsexit:
            mov     ecx,cr3
            and     ecx,0ffff000h
            cmp     ecx,EMMPageDir
            pop     ds
            pop     ecx
            je      SHORT dsisemm
            iretd
dsisemm:
            jmp     cs:DebugLink Int67Service:
            ; Switch to protected mode call - make sure we're properly
            ; patched before linking to the VCPI Server's handler.
            ;
            cmp     ax,0de0ch               ; switch call ?
```

ENSQ-0153                        72                        PATENT

```
        jne     i67tfix
;
; This is the switch to proteted mode by the DOS extender.
; Since it's telling us all of it's protected mode context,
; patch its IDT now.
;
        mov     eax,cs
        push    ebx
        add     eax,08h
        push    ecx
        mov     ds,eax
        add     eax,08h
        mov     es,eax
        test    PatchFlags,0001h
        jz      i67prs
        mov     eax,cr3
        mov     CR3Save,eax
        and     eax,0fffh
        or      eax,es:[esi]
        mov     cr3,eax              ; use extender's page tables xor     eax,eax
        mov     ebx,es:[esi+8]       ; IDT big enough?
        cmp     WORD PTR es:[ebx],02h*8+7
        jb      SHORT i67prx
        mov     ebx,es:[ebx+2]
        or      ebx,ebx              ; does IDT exist?
        jz      SHORT i67prx
        cmp     DWORD PTR es:[ebx+02h*8+4],00008e1eh
        jne     SHORT i67psg         ; is it already patched?
        mov     ax,es:[ebx+02h*8+2]
        add     eax,8+8+7
        mov     ebx,es:[esi+4]       ; make sure out selectors are
        cmp     ax,es:[ebx]          ; where we thing they are
        ja      SHORT i67psg
        mov     ebx,es:[ebx+2]
        cmp     DWORD PTR es:[ebx+eax+1-4],00de9300h
        jne     SHORT i67psg
i67pex:
        mov     ebx,es:[esi+8]       ; set int 6e == our PCI IRQ
        cmp     WORD PTR es:[ebx],77h*8+7
        jb      SHORT i67prx
        mov     ebx,es:[ebx+2]
        mov     eax,es:[ebx+6eh*8]
        mov     ecx,es:[ebx+6eh*8+4]
        add     ebx,PCIIRQVectOff
        mov     es:[ebx],eax
        mov     es:[ebx+4],ecx
i67prx:
        mov     eax,CR3Save
        mov     cr3,eax
i67prs:
        pop     ecx
        pop     ebx
        mov     eax,0de0ch
        jmp     cs:Int67Link
i67psg:
        xor     ecx,ecx              ; find out GDT entries
        mov     ebx,es:[esi+4]
        mov     cx,es:[ebx]
        sub     ecx,-1+03h*8
        shr     ecx,3
        mov     eax,01h*8
        mov     ebx,es:[ebx+2]
i67psl:
        cmp     DWORD PTR es:[ebx+eax+02h*8+4],00de9300h
        je      SHORT i67ppi
        add     eax,8
        loop    i67psl
        jmp     SHORT i67pex
i67ppi:
        shl     eax,16               ; now patch the IDT
        mov     ebx,es:[esi+8]
```

ENSQ-0153

```
            mov     cx,es:[ebx]
            mov     ebx,es:[ebx+2]
            mov     es:[ebx+02h*8],eax
            add     eax,18h
            mov     es:[ebx+01h*8],eax
            mov     es:[ebx+02h*8+4],00008e1eh
            mov     es:[ebx+01h*8+4],00008e1eh
            jmp     i67pex ; This is a call from the v86 code to restore the VCPI client's
            ; GDT entries after a switch-to-v86-mode VCPI far call.
i67tfix:
            cmp     ax,0dee0h
            jne     SHORT i67tgp
            ;
            push    eax                     ; save regs
            push    esi
            mov     eax,cs
            add     eax,08h
            mov     ds,eax
            add     eax,08h
            mov     es,eax
            mov     eax,cr3
            mov     RegSave,eax
            mov     eax,ClientCr3           ; need client's page context
            mov     cr3,eax                 ; don't use stack until restored
            ;
            mov     esi,CTladdr
            ;
            mov     eax,ConcGentries+00h    ; restore client GDT entries
            mov     es:[esi+00h],eax
            mov     eax,ConcGentries+04h
            mov     es:[esi+04h],eax
            mov     eax,ConcGentries+08h
            mov     es:[esi+08h],eax
            mov     eax,ConcGentries+0ch
            mov     es:[esi+0ch],eax
            mov     eax,ConcGentries+10h
            mov     es:[esi+10h],eax
            mov     eax,ConcGentries+14h
            mov     es:[esi+14h],eax
            ;
            mov     eax,RegSave
            mov     cr3,eax
            pop     esi
            pop     eax
            iretd ; This is us intercepting the VCPI v86 get-protected-mode-interface
            ; call. We will make the VCPI hanlder return to our v86 code
            ; for return value mods. Our v86 handler will then return
            ; control to the original v86 return destination.
i67tgp:
            cmp     ax,0de01h               ; VCPI GetPMI call?
            jne     SHORT i67tcmd
            ;
            push    eax
            mov     eax,cs
            add     eax,08h
            mov     ds,eax
            add     eax,08h
            mov     es,eax
            mov     eax,ss
            lar     eax,eax                 ; validate stack pointer
            test    eax,00400000h
            jnz     SHORT i67s32
            and     esp,0000ffffh
i67s32:
            mov     ebx,pSharedData         ; setup es:[ebx] for shared data
            mov     es:[ebx+12],di          ; save init di to shared space
            mov     eax,[esp+6]             ; save v86 return to shared space
            mov     ax,[esp+4]
            mov     es:[ebx+8],eax
```

ENSQ-0153                              74                              PATENT

```
        mov     eax,VGoffset
        mov     [esp+4],eax              ; force v86 ret to vivo gpmi code
        mov     eax,VGsegment
        mov     [esp+8],eax
        ;
        or      PatchFlags,0001h
        pop     eax
        jmp     Int67Link                ; link to normal PM handler
i67tcmd:
        cmp     ax,0dee1h
        je      SHORT i67cmdh
        jmp     cs:Int67Link
i67cmdh:
        ; proprietary command handler - no regs saved yet ...
        ; this hadler is invoked only from v86 mode with
        ; int 67, ax=dee1, bh=cmd, bl=arg/return.
        push    ecx
        push    ds
        mov     ecx,cs
        add     ecx,08h
        mov     ds,ecx
        mov     SSoffset,esp
        mov     SSselector,ss
        mov     esp,OFFSET StackTop
        mov     ss,ecx
        push    es
        mov     es,ecx
        push    eax
        push    edx
        push    esi
        mov     esi,gpSSI
        cld
i67c00:
        cmp     bh,00h
        jne     SHORT i67c01
        push    ebx
        call    IRQService pop     ebx
        jmp     i67cex
i67c01:
        cmp     bh,01h
        jne     SHORT i67c04
        ;
        call    LoadShadowRegs
        mov     Sb1TC,0ffh
        mov     AdFormat,08h
        ;
        mov     eax,XMSPaddrLo
        add     eax,OFFSET SynthBuffer
        mov     [esi.ssi_lpDMABufferPhys3],eax
        ;
        mov     ActiveCount,0
        call    _synth_init
        ;
    IFNDEF WIN_CODE
        push    ebx
        mov     bl,01h
        call    DebugCtl
        pop     ebx
    ENDIF
        ;
        jmp     i67cex
i67c04:
        cmp     bh,04h
        jne     SHORT i67c05
        and     bl,7fh
        mov     MT32Enable,bl
        push    ebx
        call    _synth_set_MT32
        add     esp,4
        jmp     i67cex
```

```
i67c05:
        cmp     bh,05h
        jne     SHORT i67c06
        mov     bl,MT32Enable
        jmp     i67cex
i67c06:
        cmp     bh,06h
        jne     SHORT i67c07
        mov     al,bl
        call    SetSynthVol
        jmp     i67cex
i67c07:
        cmp     bh,07h
        jne     SHORT i67c08
        mov     bl,SynthVol
        jmp     i67cex
i67c08:
        cmp     bh,08h
        jne     SHORT i67c09
        mov     al,bl
        and     al,7fh
        call    SetDACVol
        jmp     i67cex
i67c09:
        cmp     bh,09h
        jne     SHORT i67c0a
        mov     bl,DACVol
        test    bl,80h
        jz      SHORT i67nom
        xor     bl,bl
i67nom:
        jmp     i67cex
i67c0a:
        cmp     bh,0ah
        jne     SHORT i67c0b
        mov     al,bl
        call    SetCDVol
        jmp     i67cex
i67c0b:
        cmp     bh,0bh
        jne     SHORT i67c0c
        mov     bl,CDVol
        jmp     i67cex
i67c0c:
        cmp     bh,0ch
        jne     SHORT i67c0d
        not     bl
        jmp     i67cex
i67c0d:
        cmp     bh,0dh
        jne     SHORT i67c0e call    LoadShadowRegs
        mov     SblTC,0ffh
        mov     AdFormat,08h mov     eax,cs
        add     eax,0010h
        mov     es,eax
        mov     esi,pSharedData mov     eax,es:[esi]        ; Get Wave Phys
        and     eax,0fffff000h      ; Align
        mov     al,67h              ; and add page table attribs
        mov     edx,PT1GPtr
        mov     ecx,3*0400h
i67mwv:
        mov     [edx],eax
        add     edx,4
        add     eax,1000h
        loop    i67mwv
        ;
        mov     eax,cr3             ; Flush TLB
```

ENSQ-0153

```
        mov     cr3,eax
        ;
        mov     eax,es:[esi]        ; Get Wave Phys
        and     eax,00000fffh       ; extract page hangover
        add     eax,40000000h       ; Add to Linear address (1G)
        sub     eax,XMSPaddrLo      ; Derive logical pointer
        mov     _WaveData_ptr,eax   ; and save
        jmp     i67cex
i67c0e:
        cmp     bh,0eh
        jne     SHORT i67c0f
        mov     PicFlags,0000h
        call    DisableVirtualPIC
        jmp     i67cex
i67c0f:
        cmp     bh,0fh
        jne     SHORT i67c10
        call    DebugCtl
        jmp     i67cex
i67c10:
        cmp     bh,10h
        jne     SHORT i67c11
        mov     al,bl
        call    SetMasterVol
        jmp     i67cex
i67c11:
        cmp     bh,11h
        jne     SHORT i67cex
        mov     bl,MasterVol
        and     bl,7fh
i67cex:
        pop     esi
        pop     edx
        pop     eax
        pop     es
        lss     esp,SpSave
        pop     ds
        pop     ecx
        iretd DebugCtl PROC
        or      bl,bl
        jnz     SHORT dcon
        mov     eax,dr7
        and     eax,NOT 80h
        mov     dr7,eax
        ret
dcon:
        mov     eax,cr4
        or      eax,08h
        mov     cr4,eax
        mov     eax,dr7
        and     eax,NOT 0c0h
        mov     dr7,eax
        mov     eax,60h
        mov     dr3,eax
        xor     eax,eax
        mov     dr6,eax
        mov     eax,dr7
        and     eax,NOT 0f0000080h
        or      eax,20000280h
        mov     dr7,eax
        mov     KBLastByte,00h
        ret
DebugCtl ENDP ; this funct loads the shadow registers from the IC
        ;
LoadShadowRegs PROC
```

76

PATENT

```
            mov     dx,[esi.ssi_wIOAddressConcert]
            add     dl,CONC_bDEVCTL_OFF
            in      al,dx
            mov     [esi.ssi_bDevCtl],al
            add     dl,CONC_wDACRATE_OFF - CONC_bDEVCTL_OFF
            in      ax,dx
            mov     [esi.ssi_wDACRate],ax
            add     dl,CONC_bNMICTL_OFF - CONC_wDACRATE_OFF
            in      al,dx
            or      al,40h      ; save mr. hand
            mov     [esi.ssi_bNMICtl],al
            add     dl,CONC_bSERFMT_OFF - CONC_bNMICTL_OFF
            mov     al,03h
            out     dx,al
            mov     [esi.ssi_bSerFmt],al
            add     dl,CONC_bSERCTL_OFF - CONC_bSERFMT_OFF
            in      al,dx
            mov     [esi.ssi_bSerCtl],al
            ret LoadShadowRegs  ENDP ; kill the virtual interrupt request
KillVIRQ PROC btr     PicFlags,PIC_FLAG_VIRQ
            jnc     SHORT kvqc1
            mov     al,MicMask
            cmp     [esi.ssi_bIRQ],08h
            jb      SHORT kvqc0
            mov     al,SicMask
kvqc0:
            test    al,WaveIRQMask
            jz      SHORT kvqc1
            bt      PicFlags,PIC_FLAG_VISR
            jc      SHORT kvqc1
            call    DisableVirtualPIC
kvqc1:
            btr     PicFlags,PIC_FLAG_VIRR
            btr     PicFlags,PIC_FLAG_PEND
            ret KillVIRQ ENDP ; enable PIC I/O trapping
EnableVirtualPIC PROC in      al,21h
            mov     MicMask,al
            in      al,0a1h
            mov     SicMask,al
            mov     dx,[esi.ssi_wIOAddressConcert]
            add     dl,CONC_bNMIENA_OFF
            mov     al,7fh
            out     dx,al
            ret EnableVirtualPIC ENDP IFNDEF WIN_CODE
            ; disable PIC I/O trapping
DisableVirtualPIC PROC mov     dx,[esi.ssi_wIOAddressConcert]
            add     dl,CONC_bNMIENA_OFF
            mov     al,2fh
            out     dx,al
            ret
```

ENSQ-0153    78    PATENT

```
DisableVirtualPIC ENDP
    ENDIF

; disable bus mastering in PCI config space
DisableBusMaster PROC cmp     DirectAccess,0
        jne     SHORT dbmok
        ret
dbmok:
        push    eax
        push    edx
        mov     dx,0cf8h
        mov     eax,DirectAccess
        out     dx,eax
        add     dl,4
        mov     ax,0101h
        out     dx,ax
        pop     edx
        pop     eax
        ret DisableBusMaster ENDP ; enable bus mastering in PCI config space
EnableBusMaster PROC cmp     DirectAccess,0
        jne     SHORT ebmok
        ret
ebmok:
        push    eax
        push    edx
        mov     dx,0cf8h
        mov     eax,DirectAccess
        out     dx,eax
        add     dl,4
        mov     ax,0105h
        out     dx,ax
        pop     edx
        pop     eax
        ret EnableBusMaster ENDP

ENDIF

IFNDEF WIN_CODE
    IFDEF DOS_DEBUG
        PUBLIC DbPut8
DbPut8   PROC push    ebx
        push    ecx
        push    edx
        push    ds
        push    es
        mov     ecx,cs
        add     ecx,08h
        mov     ds,ecx
        add     ecx,08h
        mov     es,ecx mov     ebx,DebugPtr
        mov     ecx,2
d81:
        rol     al,4
        mov     edx,eax
        and     edx,0fh
```

```
            cmp     edx,0ah
            jae     SHORT d82
            add     edx,'0'
            jmp     SHORT d83
d82:
            add     edx,'A' - 0ah
d83:
            mov     es:[ebx],dl
            add     ebx,2
            cmp     ebx,DEBUG_END
            jb      d8nw1
            mov     ebx,DEBUG_START
d8nw1:
            loop    SHORT d81 mov     BYTE PTR es:[ebx],' '
            add     ebx,2
            cmp     ebx,DEBUG_END
            jb      d8nw2
            mov     ebx,DEBUG_START
d8nw2:
            mov     BYTE PTR es:[ebx],'*'
            mov     DebugPtr,ebx pop     es
            pop     ds
            pop     edx
            pop     ecx
            pop     ebx
            ret
DbPut8      ENDP PUBLIC  DbPut16
DbPut16     PROC
            push    ebx
            push    ecx
            push    edx
            push    ds
            push    es
            mov     ecx,cs
            add     ecx,08h
            mov     ds,ecx
            add     ecx,08h
            mov     es,ecx mov     ebx,DebugPtr
            mov     ecx,4
d161:
            rol     ax,4
            mov     edx,eax
            and     edx,0fh
            cmp     edx,0ah
            jae     d162
            add     edx,'0'
            jmp     SHORT d163
d162:
            add     edx,'A' - 0ah
d163:
            mov     es:[ebx],dl
            add     ebx,2
            cmp     ebx,DEBUG_END
            jb      d16nw1
            mov     ebx,DEBUG_START
d16nw1:
            loop    d161 mov     BYTE PTR es:[ebx],' '
            add     ebx,2
            cmp     ebx,DEBUG_END
            jb      d16nw2
```

ENSQ-0153

```
           mov    ebx,DEBUG_START
d16nw2:
           mov    BYTE PTR es:[ebx],'*'
           mov    DebugPtr,ebx pop    es
           pop    ds
           pop    edx
           pop    ecx
           pop    ebx
           ret DbPut16 ENDP PUBLIC DbPut32
DbPut32 PROC push   ebx
           push   ecx
           push   edx
           push   ds
           push   es
           mov    ecx,cs
           add    ecx,08h
           mov    ds,ecx
           add    ecx,08h
           mov    es,ecx mov    ebx,DebugPtr
           mov    ecx,8
dp32lp:
           rol    eax,4
           mov    edx,eax
           and    edx,0fh
           cmp    edx,0ah
           jae    SHORT dp32hx
           add    edx,'0'
           jmp    SHORT dp32wr
dp32hx:
           add    edx,('A' - 0ah)
dp32wr:
           mov    es:[ebx],dl
           add    ebx,2
           cmp    ebx,DEBUG_END
           jb     SHORT dp32na
           mov    ebx,DEBUG_START
dp32na:
           loop   dp32lp mov    BYTE PTR es:[ebx],' '
           add    ebx,2
           cmp    ebx,DEBUG_END
           jb     dp32nb
           mov    ebx,DEBUG_START
dp32nb:
           mov    BYTE PTR es:[ebx],'*'
           mov    DebugPtr,ebx pop    es
           pop    ds
           pop    edx
           pop    ecx
           pop    ebx
           ret DbPut32 ENDP
    ENDIF
    ELSE
    IFDEF DEBUG
        PUBLIC DbPut32
DbPut32 PROC
```

```
ENSO-0153                          81                              PATENT push    ecx
        mov     ecx,ds
        mov     SSoffset,esp
        mov     SSselector,ss
        mov     esp,OFFSET StackTop
        mov     ss,ecx
        push    es
        mov     es,ecx Trace_Out "IOHNDLRS: #EAX"

pop     es
        lss     esp,SpSave
        pop     ecx
        ret
DbPut32 ENDP

ENDIF
    ENDIF

IFDEF WIN_CODE
VXD_LOCKED_CODE_ENDS

VXD_LOCKED_DATA_SEG
    ENDIF

ALIGN 4

IFNDEF WIN_CODE

DevTable    LABEL DWORD
            DD  MpuTable,    WssTable,       SblTable,       MpuTable
            DD  MicTable,    MdcTable,       SicTable

ELSE

DevTable    LABEL DWORD
            DD  MpuTable,    WssTable,       SblTable,       MpuTable
            DD  0,           MdcTable

ENDIF

MpuTable    LABEL DWORD
            DD  MpuDataR,    MpuDataW,       MpuStatR,       MpuCmdW
            DD  HostStatR,   IoNull,         IoNull,         IoNull
            DD  OdAddrR,     OdAddrW,        OdDataR,        OdDataW
            DD  IoNull,      IoNull,         IoNull,         IoNull
            DD  OplStatR,    OplAddrW,       IoNull,         OplDataW
            DD  IoNull,      IoNull,         IoNull,         IoNull
WssTable    LABEL DWORD
            DD  IoNull,      IoNull,         IoNull,         IoNull
            DD  IoNull,      IoNull,         IoNull,         IoNull
            DD  AdAddrR,     AdAddrW,        AdDataR,        AdDataW
            DD  AdStatusR,   AdStatusW,      IoNull,         IoNull
SblTable    LABEL DWORD
            DD  OplStatR,    OplAddrW,       IoNull,         OplDataW
            DD  OplStatR,    OplAddrW,       IoNull,         OplDataW
            DD  IoNull,      SblMixAddrW,    SblMixDataR,    SblMixDataW
            DD  IoNull,      SblResetW,      IoNull,         SblResetW
            DD  OplStatR,    OplAddrW,       IoNull,         OplDataW
            DD  SblDataR,    IoNull,         SblDataR,       IoNull
            DD  SblTxrR,     SblCmdW,        SblTxrR,        SblCmdW
            DD  SblRxrR,     IoNull,         SblRxrR,        IoNull
    IFNDEF WIN_CODE
MicTable    LABEL DWORD
            DD  MicDataR,    MicCmdW,        MicMaskR,       MicMaskW
    ENDIF
```

ENSQ-0153

```
MdcTable        LABEL DWORD
                DD  Dma0AddrR,      Dma0AddrW,      Dma0CountR,     Dma0CountW
                DD  Dma1AddrR,      Dma1AddrW,      Dma1CountR,     Dma1CountW
                DD  IoNull,         IoNull,         IoNull,         IoNull
                DD  Dma3AddrR,      Dma3AddrW,      Dma3CountR,     Dma3CountW
                DD  DmaStatusR,     IoNull,         IoNull,         IoNull
                DD  IoNull,         DmaMaskW,       IoNull,         DmaModeW
                DD  IoNull,         DmaFlopW,       IoNull,         IoNull
                DD  IoNull,         IoNull,         IoNull,         IoNull
        IFNDEF WIN_CODE
SicTable        LABEL DWORD
                DD  SicDataR,       SicCmdW,        IoNull,         SicMaskW
        ENDIF pWaveBuffer     DD  ?
pWaveData       DD  ?

SblIOBuff       DD  80808080h

DB  1024 DUP(0eeh)
StackTop        LABEL NEAR

SynthBuffer     DD  512 DUP(0)

IFNDEF WIN_CODE
        IFDEF DOS_DEBUG
DebugPtr        DD  DEBUG_START
        ENDIF
gpSSI           DD  OFFSET HwConfig
        ENDIF ClientCr3       DD  ?
ClientTab       LABEL FWORD
CTlimit         DW  ?
CTladdr         DD  ?

EaxSave         DD  ?
RegSave         DD  ?
CR3Save         DD  ?

SaveGentries    DD  6 DUP(?)

SblProc         DD  OFFSET SblParse

MidiMessage     DD  000000ffh

ADFreqTable     LABEL WORD
                DW  8000,           5513,           16000,          11025
                DW  27429,          18900,          32000,          22050
                DW  22050,          37800,          37800,          44100
                DW  48000,          33075,          9600,           6615

SpSave          LABEL FWORD
SSoffset        DD  ?
SSselector      DW  2 DUP(?)

SblByteRate     DW  22222

MpuFlags        DW  0000h
SblFlags        DW  0000h
DacFlags        DW  0000h OR (1 SHL DAC_FLAG_INTENA)
PicFlags        DW  0000h
DmaFlags        DW  0000h OR (1 SHL DMA_FLAG_MASK)
PatchFlags      DW  8000h SbSrate         DW  11025
DACCount        DW  ?
DACCountSamples DW  ?
DMACountSamples DW  ?
DMACountDwords  DW  ?
```

ENSQ-0153 83 PATENT

```
DmaAddr         DW  ?
DmaAddrCurr     DW  ?
DmaTermAddr     DW  ?
DmaCount        DW  ?
DmaCountCurr    DW  ?
DmaTermCount    DW  ?
IperBuff        DW  ?
IperBuffCurr    DW  ?
IperDisp        DW  ?
IperDispCurr    DW  ?
StartSkip       DB  ?
NormalSkip      DB  ?
EndSkip         DB  ?
ExtraBytes      DB  ?

MidiDataC       DB  2
MidiCurrC       DB  1

MpuData         DB  0feh
MpuStat         DB  10111111b
MpuTemp         DB  ?
OdAddr          DB  ?
OdieCDCfg       DB  80h
AdAddr          DB  ?
AdDACVolL       DB  ?
AdDACVolR       DB  ?
AdCDVolL        DB  ?
AdCDVolR        DB  ?
AdFormat        DB  08h
AdConfig        DB  0ch
AdPinCtl        DB  00h SblData         DB  0aah
SblRxr          DB  01111111b
SblTxr          DB  01111111b
SblTag          DB  ?
SblToggle       DB  ?

DmaStatus       DB  00h
MicCmd          DB  ?
MicMask         DB  ?
MicSkip         DB  00h
SicCmd          DB  ?
SicMask         DB  ?
SicSkip         DB  00h TagByte         DB  80h
Toggle          DB  0
SpkrStat        DB  00h
SblAccum        DB  0aah
SblXorPat       DB  96h SblTC           DB  0d3h
SblMixAddr      DB  40h OplAddr         DB  01h
OplStat         DB  06h
CdAddr          DB  40h KBLastByte      DB  00h
MT32Enable      DB  00h
MasterVol       DB  ?
SynthVol        DB  ?
DACVol          DB  ?
DACVolPhys      DB  ?
CDVol           DB  ?

SblMixer        DB  11h,  11h,   99h,  11h   ; 00h - 07h
                DB  11h,  11h,   11h         ; 08h - 0dh
SblStereo       DB  11h                      ; 0eh - 0fh STE
                DB  11h,  11h,   11h,  11h   ; 10h - 17h
                DB  11h,  11h,   11h,  11h   ; 18h - 1fh
                DB  11h,  99h,   11h,  99h   ; 20h - 27h
```

ENSQ-0153                                84                        PATENT

```
          DB  11h,    11h,      11h,     11h    ; 28h - 2fh
ActiveCount   DW  ?

IFNDEF WIN_CODE
_TEXT    ENDS
    ELSE
VxD_LOCKED_DATA_ENDS
    ENDIF

END
```

ENSQ-0153

APPENDIX B

©1997 Ensoniq

```
        .386p

INCLUDE vivo.inc
NUM_CODEPAGES   EQU 25

NMI_INT         EQU 02h
TIMER_INT       EQU 08h

DOS_SETVECT     EQU 25h
DOS_TSR         EQU 31h
DOS_GETVECT     EQU 35h
DOS_FREE        EQU 49h
DOS_MODIFY      EQU 4ah

PARMBLK STRUCT
        envseg  WORD ?
        cmdoff  WORD ?
        cmdseg  WORD ?
        fcb1off WORD ?
        fcb1seg WORD ?
        fcb2off WORD ?
        fcb2seg WORD ?
PARMBLK ENDS

_TEXT   SEGMENT DWORD PUBLIC USE16 'CODE'

ASSUME cs:_TEXT, ds:_TEXT

ORG 0100h

Start:
    jmp Entry

; Resident Data (non-discardable) starts here
        ALIGN 2
FromScope       LABEL NEAR
VivoGentries    DD 6 DUP(?)
XmsPaddr        LABEL DWORD
XPlower         DW ?
XPupper         DW ?
NumCodePages    DW 0000h HwConfig        LABEL NEAR
BasePort        DW 0000h
WavePort        DW ?
OttoPort        DW ?
WaveIrq         DB ?
MidiIrq         DB ?
DmaChan         DB ?
ExtMidi         DB ?
SbEnable        DB ?
SynthVol        DB ?
WaveVol         DB ?
CdAuxVol        DB ?
BoardType       DB ?

ALIGN 2
SharedData      LABEL NEAR
Int67Return     LABEL DWORD
I67Roffset      DW ?
I67Rsegment     DW ?
V86Return       LABEL DWORD
V86Roffset      DW ?
V86Rsegment     DW ?
GetPmiDi        DW ?
```

ENSQ-0153                           86                              PATENT

```
        DosLink      LABEL DWORD
        DLoffset     DW ?
        DLsegment    DW ?

MuxLink      LABEL DWORD
        MLoffset     DW ?
        MLsegment    DW ?

TimerLink    LABEL DWORD
        TLoffset     DW ?
        TLsegment    DW ?

Flags        DW 0
        FLAG_WIN     EQU 0

MidiPic      DW 0021h
        MidiVect     DB 08h
        MidiUnmask   DB ?

IFDEF DOS_DEBUG
        DebugPtr     DW 2*(80*0 + 0)
            ENDIF

; Resident Code (non-discardable) starts here

IFDEF DOS_DEBUG
        DbPutCh PROC push    es
            push    di mov     di,0b000h   ; apw
            mov     es,di
            mov     di,cs:DebugPtr
            mov     es:[di],al
            add     cs:DebugPtr,4 pop     di
            pop     es
            ret

DbPutCh ENDP

DbPutByte PROC push    cx
            push    dx
            push    di
            push    es mov     di,cs:DebugPtr
            mov     dx,0b000h
            mov     es,dx
            mov     cx,2
        @@1:
            rol     al,4
            mov     dl,al
            and     dl,0fh
            cmp     dl,0ah
            jb      @@2
            add     dl,'A' - 0ah
            jmp     SHORT @@3
        @@2:
            add     dl,'0'
        @@3:
            mov     es:[di],dl
            add     di,2
            cmp     di,2*80*24
            jb      nba
            xor     di,di
        nba:
```

ENSO-0153                              87                          PATENT

```
            loop    @@1
            mov     BYTE PTR es:[di],' '
            add     di,2
            cmp     di,2*80*24
            jb      nbb
            xor     di,di
    nbb:
            mov     BYTE PTR es:[di],'*'
            mov     cs:DebugPtr,di pop     es
            pop     di
            pop     dx
            pop     cx
            ret DbPutByte ENDP DbPutWord PROC push    cx
            push    dx
            push    di
            push    es mov     di,cs:DebugPtr
            mov     dx,0b000h
            mov     es,dx
            mov     cx,4
    @@1:
            rol     ax,4
            mov     dl,al
            and     dl,0fh
            cmp     dl,0ah
            jb      @@2
            add     dl,'A' - 0ah
            jmp     SHORT @@3
    @@2:
            add     dl,'0'
    @@3:
            mov     es:[di],dl
            add     di,2
            cmp     di,2*80*24
            jb      nwa
            xor     di,di
    nwa:
            loop    @@1 mov     BYTE PTR es:[di],' '
            add     di,2
            cmp     di,2*80*24
            jb      nwb
            xor     di,di
    nwb:
            mov     BYTE PTR es:[di],'*'
            mov     cs:DebugPtr,di pop     es
            pop     di
            pop     dx
            pop     cx
            ret DbPutWord ENDP
            ENDIF NmiIsr  PROC FAR push    ax
            push    dx
```

```
                mov     dx,cs:BasePort
                add     dl,NMISTAT_OFF
                in      al,dx
                in      al,61h
                and     al,0fh
                or      al,08h
                out     61h,al
                and     al,07h
                out     61h,al
                pop     dx
                pop     ax
                iret NmiIsr  ENDP MidiIsr PROC FAR bt      cs:Flags,FLAG_WIN
                jnc     midoit
                iret
midoit:
                push    ax
                push    bx
                mov     ax,0dee1h
                mov     bh,00h
                int     67h
                pop     bx
                pop     ax
miexit:
                iret MidiIsr ENDP DosIsr  PROC FAR bt      cs:Flags,FLAG_WIN
                jnc     didoit
                jmp     cs:DosLink
didoit:
                cmp     ah,DOS_SETVECT
                je      disvect
                jmp     cs:DosLink
disvect:
                cmp     al,02h
                je      diskip
                cmp     al,cs:Midivect
                je      diskip
                jmp     cs:DosLink
diskip:
                iret DosIsr  ENDP MuxIsr  PROC FAR pushf
                cmp     ax,1605h
                je      wstrt
                cmp     ax,1606h
                je      wstop
milink:
                popf
                jmp     cs:MuxLink
wstrt:
                bts     cs:Flags,FLAG_WIN
                push    ax
                push    dx
                mov     dx,cs:BasePort
                add     dl,CONTROL_OFF
                xor     al,al
```

ENSQ-0153                               89                          PATENT

```
            out     dx,al
            add     dl,NMICTL_OFF-CONTROL_OFF
            out     dx,al
            pop     dx
            pop     ax
            jmp     milink
    wstop:
            btr     cs:Flags,FLAG_WIN
            push    ax
            push    dx
            ;
            mov     dx,cs:WavePort
            mov     al,40h OR CD_CONFIG
            out     dx,al
            inc     dl
            mov     al,04h
            out     dx,al
            dec     dl
            mov     al,CD_ADLVOL
            out     dx,al
            inc     dl
            mov     al,8ch
            dec     dl
            mov     al,CD_ADRVOL
            out     dx,al
            inc     dl
            mov     al,8ch
            ;
            mov     dx,cs:BasePort
            add     dl,CONTROL_OFF
            mov     al,08h
            out     dx,al
            add     dl,NMICTL_OFF-CONTROL_OFF
            mov     al,0a0h
            cmp     cs:SbEnable,00h
            je      wnosb
            or      al,40h
    wnosb:
            out     dx,al
            ;
            pop     dx
            pop     ax
            jmp     milink
    MuxIsr  ENDP TimerIsr PROC FAR
            bt      cs:Flags,FLAG_WIN
            jnc     tidoit
            jmp     cs:TimerLink
    tidoit:
            push    ax
            push    dx
            mov     dx,cs:MidiPic
            in      al,dx
            and     al,cs:MidiUnmask
            out     dx,al
            ;
            in      al,61h
            and     al,07h
            out     61h,al
            ;
            xor     al,al
            out     70h,al
            pop     dx
            pop     ax
            jmp     cs:TimerLink
    TimerIsr ENDP
```

ENSQ-0153                                90                              PATENT

```
        GetPmi:
                push    eax
                push    cx
                ;
                mov     eax,cs:XmsPaddr
                shr     eax,10
                and     al,0fch
                add     ax,cs:GetPmiDi
        i67p1a:
                mov     DWORD PTR es:[di],0fffff067h
                add     di,4
                cmp     di,ax
                jb      i67p1a
                ;
                mov     eax,cs:XmsPaddr
                mov     al,67h
                mov     cx,cs:NumCodePages
        i67p1b:
                mov     es:[di],eax
                add     di,4
                add     eax,1000h
                loop    i67p1b
                ;
                mov     bx,OFFSET VivoGentries
                mov     cx,6
        i67glp:
                mov     eax,cs:[bx]
                add     bx,4
                mov     [si],eax
                add     si,4
                loop    i67glp
                sub     si,24
                ;
                mov     ebx,14h
                pop     cx
                pop     eax
                jmp     cs:Int67Return Fixup:
                mov     ax,0dee0h
                int     67h
                jmp     cs:v86Return TsrEnd  LABEL NEAR ; Init Data (discardable) starts here ALIGN 2
        XmsEntry        LABEL DWORD         ; XMS far-call entry point
        XEoffset        DW ?
        XEsegment       DW ?
        XmsHandle       DW ?                ; our XMS chunk handle ToScope         LABEL NEAR          ; discardable data sent to SCOPE.EXE
        EmmCr3          DD ?
        EmmGdt          DF ?
        EmmIdt          DF ?
                        DW OFFSET FromScope
                        DW OFFSET HwConfig
                        DW OFFSET GetPmi
                        DW OFFSET Fixup
                        DW OFFSET SharedData ; param struct for .EXE spawning
        ParamBlock      PARMBLK < ?, OFFSET Param, ?, 5ch, ?, 6ch, ? >

FileHandle      DW 0
        SsPath          DB 65 DUP(?)
        Vscape32        DB '\VSCAPE32.BIN',0
        SsConfig        DB '\SSCONFIG.EXE',0
        Scope           DB '\SCOPE.EXE',0
        Dos4Gw          DB '\DOS4GW.EXE',0
```

ENSQ-0153                         91                        PATENT

```
Quiet       DB  'DOS4G=QUIET',0
Param       DB  1   DUP(' ')
TmpBuff     DB  128 DUP(?)

; Init Code (discardable) starts here
        IFDEF DOS_DEBUG
PrintChar PROC push    ax
        push    dx
        mov     dl,al
        mov     ah,02h
        int     21h
        pop     dx
        pop     ax
        ret PrintChar ENDP Printword PROC push    ax
        push    cx
        push    dx mov     cx,4
@@1:
        rol     ax,4
        mov     dl,al
        and     dl,0fh
        cmp     dl,0ah
        jb      @@2
        add     dl,'A' - 0ah
        jmp     SHORT @@3
@@2:
        add     dl,'0'
@@3:
        push    ax
        mov     al,dl
        call    PrintChar
        pop     ax
        loop    @@1
        rol     ax,4 pop     dx
        pop     cx
        pop     ax
        ret

Printword ENDP

PrintRet PROC push    ax
        push    dx mov     ah,02h
        mov     dl,0dh
        int     21h
        mov     dl,0ah
        int     21h pop     dx
        pop     ax
        ret PrintRet ENDP
```

```
PrintStr PROC -
        push    ax
        push    dx
        push    di
        mov     ah,02h
@@1:
        mov     dl,es:[di]
        inc     di
        or      dl,dl
        jz      @@2
        int     21h
        jmp     SHORT @@1
@@2:
        pop     di
        pop     dx
        pop     ax
        ret PrintStr ENDP
        ENDIF PrintMsg PROC
        push    bp
        mov     bp,sp
        push    ax
        push    dx
        push    si mov     si,[bp+2]
        mov     ah,02h
@@1:
        mov     dl,[si]
        inc     si
        or      dl,dl
        jz      @@2
        int     21h
        jmp     SHORT @@1
@@2:
        mov     [bp+2],si pop     si
        pop     dx
        pop     ax
        pop     bp
        ret PrintMsg ENDP WordToStr PROC push    cx
        push    dx mov     cx,4
@@1:
        rol     ax,4
        mov     dl,al
        and     dl,0fh
        cmp     dl,0ah
        jb      @@2
        add     dl,'A' - 0ah
        jmp     SHORT @@3
@@2:
        add     dl,'0'
@@3:
        mov     es:[di],dl
        inc     di
        loop    @@1
```

ENSQ-0153                              93                          PATENT

```
            mov     BYTE PTR es:[di],0
            inc     di pop     dx
            pop     cx
            ret WordToStr ENDP ; StrCpy
;
; Inputs: ds:si - source string
;         es:di - destination string
; Return: Nothing. All regs are left unaffected except ...
;         di - this will point to the byte immediately following the last
;              destination byte that was copied to.
;
StrCpy  PROC push    ax
            push    si                      ; save regs
@@1:
            mov     al,[si]
            mov     es:[di],al              ; copy the string
            inc     si
            inc     di
            cmp     al,0
            jne     @@1 pop     si                      ; restore regs and exit
            pop     ax
            ret StrCpy  ENDP Entry:
            ; string ops forward always
            cld ; print a hello dorks message
            call    PrintMsg
            DB      0dh,0ah,' SoundscapeVIVO(TM) Initialization Driver, Version 3.22.',0dh,0ah
            DB      ' Copyright(c) 1995-1996, ENSONIQ Corp., All Rights Reserved.',0dh,0ah,0

; if we need to, free all but our 64k so we can spawn later
            mov     ax,sp
            cmp     ax,0fffeh
            jne     csizok
            mov     bx,cs
            mov     es,bx
            mov     bx,1000h
            mov     ah,DOS_MODIFY
            int     21h
csizok:
            ; see if loader is command shell - if not, assume .com and resize
            mov     ax,cs:[0016h]
            mov     es,ax
            mov     bx,es:[0016h]
            cmp     ax,bx
            je      psizok
            mov     es,ax
            mov     bx,1000h
            mov     ah,DOS_MODIFY
            int     21h
psizok:
            ; get the int 67 vector, make sure we got a memory manager
            mov     ax,(DOS_GETVECT SHL 8) OR 67h
            int     21h
            mov     ax,es
            or      ax,ax
            jnz     emvok
```

ENSQ-0153 94 PATENT

```
                call    PrintMsg
                DB      0dh,0ah,07h,'Error: Memory Manager not detected.',0dh,0ah
                DB      '            SoundscapeVIVO requires EMM386 or similar.',0dh,0ah,0
                jmp     exit
emvok:
                ; see if we're already loaded
                mov     ax,0dee1h
                mov     bx,0b55h
                int     67h
                cmp     bl,0aah
                jne     ssnpres
                call    PrintMsg
                DB      0dh,0ah,' ... SoundscapeVIVO driver is currently loaded ...',0dh,0ah,0
                jmp     exit
ssnpres:
                ; locate our path and save it
                xor     di,di
                mov     es,cs:[002ch]
                mov     cx,0ffffh
                xor     al,al
envlp:
                repne   scasb
                cmp     al,es:[di]
                jne     SHORT envlp
                mov     bx,di
                add     di,3 push    ds
                mov     si,di
                mov     ax,es
                mov     ds,ax
                mov     di,OFFSET SsPath
                mov     ax,cs
                mov     es,ax
                call    StrCpy
                pop     ds
                ;
                mov     di,OFFSET SsPath
                xor     al,al
                repne   scasb
                pushf
                std
                mov     al,'\'
                repne   scasb
                popf
                inc     di
                mov     BYTE PTR [di],0

; set the local quiet environment var for 4GW spawn
                mov     di,bx
                mov     es,cs:[002ch]
                mov     si,OFFSET Quiet
                call    StrCpy
                mov     BYTE PTR es:[di],0

; build the parameter line for config spawn
                mov     di,OFFSET Param+2
                mov     ax,ds
                mov     es,ax
                mov     ax,OFFSET HwConfig
                call    WordToStr               ; setup config offset arg
                mov     BYTE PTR [di-1],' '
                mov     ax,ds
                call    WordToStr               ; setup segment arg
                mov     BYTE PTR [di-1],0dh
                sub     di,OFFSET Param+2       ; add length
                mov     ax,di
                mov     Param,al ; build the filename for the config code
                mov     si,OFFSET SsPath
                mov     di,OFFSET TmpBuff
                mov     dx,ds
```

ENSQ-0153                                95                              PATENT

```
            mov     es,d·                   ; first copy path
            call    StrCpy
            dec     di
            mov     si,OFFSET SsConfig
            call    StrCpy                  ; append filename mov     bx,OFFSET ParamBlock    ; setup param block
            mov     ax,cs:[002ch]
            mov     (PARMBLK PTR [bx]).envseg,ax
            mov     (PARMBLK PTR [bx]).cmdseg,ds
            mov     (PARMBLK PTR [bx]).fcb1seg,ds
            mov     (PARMBLK PTR [bx]).fcb2seg,ds
            mov     dx,OFFSET TmpBuff
            mov     ax,ds
            mov     es,ax
            mov     ax,4b00h                ; and spawn the .exe
            int     21h
            jnc     cfgran
            call    PrintMsg
            DB 0dh,0ah,07h,' error: Could not execute SSCONFIG.EXE.',0dh,0ah,0
            jmp     exit
cfgran:
            cmp     BasePort,0
            jne     cfgok
            jmp     exit
cfgok:
            ; see if we have to bail now ...
            mov     di,0080h
            xor     cx,cx
            mov     cl,[di]                 ; look for /N cmd line arg
            or      cl,cl
            jz      nokill
            dec     cx
            inc     di
            mov     ax,ds
            mov     es,ax
            mov     al,'/'
            repne   scasb
            jnz     nokill
            mov     al,[di]
            and     al,0dfh
            cmp     al,'N'
            jne     nokill
            call    PrintMsg
            DB 0dh,0ah,' Initialization Complete, DOS drivers NOT loaded.',0dh,0ah,0dh,0ah,0
            jmp     exit
nokill:
            ; setup some HW-dependent vars
            mov     cl,MidiIrq
            cmp     cl,08h
            jb      mvrset
            mov     MidiPic,00a1h
            mov     MidiVect,70h
mvrset:
            and     cl,07h
            add     MidiVect,cl
            mov     al,1
            shl     al,cl
            not     al
            mov     MidiUnmask,al ; see if we have an XMS driver
            mov     ax,4300h
            int     2fh
            cmp     al,80h
            je      xmspr
            call    PrintMsg
            DB 0dh,0ah,07h,' error: XMS services were not detected.',0dh,0ah,0
            jmp     exit
xmspr:
            ; get the XMS control function entry point
            mov     ax,4310h
            int     2fh
```

ENSQ-0153

```
        mov     XEof  t,bx
        mov     XEse   nt,es

; get enough XMS for our 32-bit code
        mov     dx,(4 * NUM_CODEPAGES)
        mov     ah,09h
        call    XmsEntry
        or      ax,ax
        jnz     xmsok
        call    PrintMsg
        DB      0dh,0ah,07h,' error: Could not allocate required Extended Memory.',0dh,0ah,0
        jmp     exit
xmsok:
; lock the XMS block (handle in dx), save phys addr
        mov     ah,0Ch
        call    XmsEntry
        or      ax,ax
        jnz     xmlok
        call    PrintMsg
        DB      0dh,0ah,07h,' error: Could not lock Extended Memory.',0dh,0ah,0
        jmp     xfexit
xmlok:
        mov     XPlower,bx
        mov     XPupper,dx ; make sure we're below 4M
        mov     eax,XmsPaddr
        add     eax,((NUM_CODEPAGES SHL 12) - 1)
        cmp     eax,400000h
        jb      xm4ok
        call    PrintMsg
        DB      0dh,0ah,07h,' error: Could not allocate Extended Memory below 4 Mbyte boundar
,0dh,0ah
        DB      '       Try loading SSINIT.COM before SMARTDRV.EXE',0dh,0ah,0
fxexit:
        jmp     xuexit
xm4ok:
; get the EMM386 environment and data for scope.exe
        mov     eax,cr3
        mov     EmmCr3,eax
        sgdt    EmmGdt
        sidt    EmmIdt ; build the parameter line for scope spawn
        mov     di,OFFSET Param+2
        mov     ax,ds
        mov     es,ax
        mov     si,OFFSET SsPath        ; setup fpath and fname for DOS4GW
        call    StrCpy
        dec     di
        mov     si,OFFSET Scope
        call    StrCpy
        mov     BYTE PTR [di-1],' '
        mov     BYTE PTR [di],0
        mov     ax,OFFSET ToScope
        call    wordToStr               ; setup data-out offset arg
        mov     BYTE PTR [di-1],' '
        mov     ax,ds
        call    wordToStr               ; setup segment arg
        mov     BYTE PTR [di-1],0dh
        sub     di,OFFSET Param+2       ; add length
        mov     ax,di
        mov     Param,al ; build the filename for the scope (DOS4GW) code
        mov     si,OFFSET SsPath
        mov     di,OFFSET TmpBuff
        mov     dx,ds
        mov     es,dx                   ; first copy path
        call    StrCpy
        dec     di
        mov     si,OFFSET Dos4Gw        ; append filename
        call    StrCpy
```

ENSQ-0153                        97                              PATENT

```
            mov     bx,OFFSET ParamBlock    ; setup param block
            mov     dx,OFFSET TmpBuff
            mov     ax,ds
            mov     es,ax
            mov     ax,4b00h
            int     21h                     ; and spawn the .exe
            jnc     scpran
            call    PrintMsg
            DB      0dh,0ah,07h,' error: Could not execute SCOPE.EXE.',0dh,0ah,0
            jmp     fxexit
    scpran:
            cmp     NumCodePages,0
            jne     scpok
            jmp     fxexit
    scpok:
            mov     dx,OFFSET NmiIsr        ; install NMI service
            mov     ax,(DOS_SETVECT SHL 8) OR 02h
            int     21h
            mov     dx,OFFSET MidiIsr       ; install MIDI IRQ service
            mov     al,MidiVect
            int     21h mov     ax,(DOS_GETVECT SHL 8) OR 21h
            int     21h                     ; save DOS vector
            mov     DLoffset,bx
            mov     DLsegment,es
            mov     dx,OFFSET DosIsr        ; install our DOS service
            mov     ah,DOS_SETVECT
            int     21h mov     ax,(DOS_GETVECT SHL 8) OR 2fh
            int     21h                     ; save Mux vector
            mov     MLoffset,bx
            mov     MLsegment,es
            mov     dx,OFFSET MuxIsr        ; install our Mux service
            mov     ah,DOS_SETVECT
            int     21h mov     ax,(DOS_GETVECT SHL 8) OR TIMER_INT
            int     21h                     ; save timer vector
            mov     TLoffset,bx
            mov     TLsegment,es
            mov     dx,OFFSET TimerIsr      ; install our timer service
            mov     ah,DOS_SETVECT
            int     21h ; call synth-init and enable otto ints
            mov     ax,0dee1h
            mov     bh,01h
            int     67h
            mov     dx,BasePort
            add     dl,CONTROL_OFF
            mov     al,08h
            out     dx,al ; wait, then un-mute the synth
            mov     dx,BasePort
            add     dl,ODADDR_OFF
            mov     cx,000fh
    umwtlpo:
            push    cx
            mov     cx,0ffffh
    umwtlpi:
            in      al,dx
            loop    umwtlpi
            pop     cx
            loop    umwtlpo
            ;
            cmp     BoardType,00h
            jne     unmvcr mov     dx,cs:WavePort
```

ENSQ-0153                           98                            PATENT

```
            mov     al,CD_PINCTL
            out     dx,al
            inc     dx
            in      al,dx
            or      al,40h
            out     dx,al
            jmp     unmdone
unmvcr:
            mov     dx,cs:WavePort
            mov     ah,SynthVol
            xor     ah,7Fh
            shr     ah,2
            mov     al,CD_LINELVOL
            out     dx,al
            inc     dx
            mov     al,ah
            out     dx,al
            dec     dx
            mov     al,CD_LINERVOL
            out     dx,al
            inc     dx
            mov     al,ah
            out     dx,al
unmdone:
            ; enable system NMI, then VIVO NMI
            in      al,61h
            and     al,03h
            or      al,04h
            out     61h,al
            xor     al,al
            out     70h,al
            mov     dx,BasePort
            add     dl,NMICTL_OFF
            mov     al,0a0h
            cmp     SbEnable,0
            je      sbldon
            or      al,40h
sbldon:
            out     dx,al
TandSR:
            call    PrintMsg
            DB 0dh,0ah,' Initialization Complete.',0dh,0ah,0dh,0ah,0 mov es,cs:[002ch]               ; free our local environment seg
            mov ah,DOS_FREE
            int 21h mov dx,(OFFSET TsrEnd + 000fh)  ; terminate / stay resident
            shr dx,4
            mov ax,(DOS_TSR SHL 8)
            int 21h xuexit:     ; unlock XMS memory block
            mov     dx,XmsHandle
            mov     ah,0dh
            call    XmsEntry
xfexit:     ; free XMS memory block
            mov     dx,XmsHandle
            mov     ah,0ah
            call    XmsEntry
exit:       ; get outta here
            ret

_TEXT       ENDS

END Start
```

ENSQ-0153                           99                          PATENT

APPENDIX C                            ©1997 Ensoniq

```c
#include <stdio.h>
#include <stdlib.h>
include <i86.h> define NUM_CODEPAGES  25      /* number of 4k pages occupied by V32 code */
//#define DEBUG /* Some standard typedefs ... */
typedef unsigned char   BYTE;
typedef unsigned short  WORD;
typedef unsigned long   DWORD;

/* The following structure is the data passed in from SSINIT */
typedef struct {
    DWORD   CR3;                /* EMM's CR3 */
    WORD    GdtLimit;           /* EMM's GDT limit, linear address */
    DWORD   GdtLaddr;
    WORD    IdtLimit;           /* EMM's IDT limit, linear address */
    DWORD   IdtLaddr;
    WORD    DoOffset;           /* output data offset */
    WORD    HwOffset;           /* HW config data offset */
    WORD    GetPmiOff;          /* offset of v86 get PMI return handler */
    WORD    FixupOff;           /* offset of v86 switch return handler */
    WORD    SharedOff;          /* offset to v86/V32 shared data area */
} DATA_IN;

/* The following structure points to SSINIT's resident data area */
typedef struct {
    DWORD   VivoGentries[6];    /* VIVO GDT entries for VCPI get PMI */
    DWORD   XmsPaddr;           /* phys addr of Extended Mem */
    WORD    NumCodePages;       /* number of 4k V32 code pages */
} DATA_RES;

/* The following structure is SSINIT's HW config data */
typedef struct {
    WORD    BasePort;           /* Gate Array base port */
    WORD    WavePort;           /* CoDec base port */
    WORD    SynthPort;          /* Otto base port */
    BYTE    WaveIrq;            /* CoDec/SB IRQ */
    BYTE    MidiIrq;            /* Synth IRQ */
    BYTE    DmaChan;            /* CoDec/SB DMA channel */
    BYTE    ExtMidi;            /* External MIDI enable */
    BYTE    SbEnable;           /* SB emulation enable */
    BYTE    SynthVol;           /* Synth volume */
    BYTE    WaveVol;            /* Wave volume */
    BYTE    CdAuxVol;           /* CD/Aux volume */
    BYTE    BoardType;          /* Vivo rev number */
} HW_CONFIG;

/* The following structure is the config data at the top of the V32 code */
typedef struct {
    BYTE    JumpTable[0x1c];    /* jump instr's for multiple entry pts */
    DWORD   VivoGentries[6];    /* the VIVO VCPI Get PMI GDT entries */
    DWORD   VcpiGentries[6];    /* the real VCPI Get PMI GDT entries */
    DWORD   SharedDataP;        /* linear addr of v86/V32 shared data */
    DWORD   MidiVectOff;        /* IDT MIDI vect offset from NMI */
    DWORD   GetPmiOff;          /* QWORD far ptr to v86 Get PMI handler */
    DWORD   GetPmiSeg;
    DWORD   FixupOff;           /* QWORD far ptr to v86 switch fixup handler */
    DWORD   FixupSeg;
    DWORD   I67LinkOff;         /* PM link to the real Int 67 handler */
    WORD    I67LinkSel;
    DWORD   VcpiEntryOff;       /* PM entry point to the real VCPI handler */
    WORD    VcpiEntrySel;
    WORD    HardwareOptions;    /* bit field for board type */
    WORD    BasePort;           /* duplication of hardware config for V32 */
    WORD    WavePort;
    WORD    SynthPort;
    BYTE    WaveIrq;
    BYTE    MidiIrq;
    BYTE    DmaChan;
    BYTE    ExtMidi;
```

```
        BYTE        SynthvolL;
        BYTE        SynthvolR;
} V32_CONFIG;

/* The following structure is the DOS mem used in the VCPI Get PMI call */
typedef struct {
        DWORD       PageTable[0x0400];
        DWORD       VcpiGentries[6];
        BYTE        DosStack[0x0400 - 4*6];
} DOS_MEM;

DWORD       DosMalloc(DWORD size);
void        DosFree(WORD selector);
DWORD       GetGDT();
DWORD       GetVcpi(WORD dmseg);

DWORD       GetCR3();          /* This function returns the 386 CR3 value */
#pragma aux GetCR3 = \
        "mov    eax,cr3" \
        value   [eax];

void        FlushTLB(void);    /* This function flushes the page table TLB */
#pragma aux FlushTLB = \
        "mov    eax,cr3" \
        "mov    cr3,eax" \
        modify  [eax];

void        SetI(void);        /* This function disables interrupts */
#pragma aux SetI = \
        "sti";

void        ClrI(void);        /* This function enables interrupts */
#pragma aux ClrI = \
        "cli";

void main(int argc, char *argv[]) { ifdef DEBUG
        FILE            *fd;
#endif
        FILE            *fp = 0;
        DATA_IN         *pdi;
        DATA_RES        *pdr;
        HW_CONFIG       *phw;
        V32_CONFIG      *pv32;
        DOS_MEM far     *pdm;
        DWORD           *pd4g0, *pxms, *pgdt, *pidt, *ppdir;
        DWORD volatile  *pptab;
        DWORD           tmp;
        WORD            dioffset, dooffset, dsegment;
        WORD            i, j, dmseg, dmsel = 0;
        BYTE            midivect;
        char            *pc;
        static char     fname[128];
        static DWORD    TmpBuff[1024];

#ifdef DEBUG
        fd = fopen("SCOPE.DBG", "w");
#endif

/* make sure we got the right arg count, make pointers and midivect */
        if( argc < 3 )
                return;
        dioffset = (WORD) strtoul(argv[1], NULL, 16);
        dsegment = (WORD) strtoul(argv[2], NULL, 16);
        pdi = (DATA_IN *) (((DWORD) dsegment << 4) + dioffset);
        pdr = (DATA_RES *) (((DWORD) dsegment << 4) + pdi->DoOffset);
        phw = (HW_CONFIG *) (((DWORD) dsegment << 4) + pdi->HwOffset);

midivect = (phw->MidiIrq < 8 ? 0x08 : 0x68) + phw->MidiIrq;
#ifdef DEBUG
```

ENSQ-0153                                101                          PATENT

```
        fprintf(fd, "\npointers ...\n");
        fprintf(fd, "P v86 non-res %08lx\n", pdi);
        fprintf(fd, "P v86 res %08lx\n", pdr);
        fprintf(fd, "P v86 HW %08lx\n", phw);
        fprintf(fd, "\nEMM context ...\n");
        fprintf(fd, "CR3 %08lx\n", pdi->CR3);
        fprintf(fd, "GDT %08lx %04x\n", pdi->GdtLaddr, pdi->GdtLimit);
        fprintf(fd, "IDT %08lx %04x\n", pdi->IdtLaddr, pdi->IdtLimit);
endif /* setup the DOS4GW page table-zero-pointer */
    pd4g0 = (DWORD *) (GetCR3() & 0xfffff000UL);
    pd4g0 = (DWORD *) (*pd4g0 & 0xfffff000UL);

/* setup laddr 0x180000 for EMM page dir, 0x181000 for var page tab ptr */
    *(pd4g0 + 0x0180) = (pdi->CR3 & 0xfffff000UL) | 0x67U;
    ppdir = (DWORD *) 0x180000UL;
    pptab = (DWORD volatile *) 0x181000UL;

/* point pptab at EMM's page table for the GDT, create a ptr */
    *(pd4g0 + 0x0181) = *(ppdir + (pdi->GdtLaddr >> 22));
    FlushTLB();
    /* setup page table and pointer for EMM's GDT */
    *(pd4g0 + 0x0182) = *(pptab + ((pdi->GdtLaddr >> 12) & 0x000003ffUL)) | 0x67U;
    *(pd4g0 + 0x0183) = *(pd4g0 + 0x0182) + 0x1000U;
    pgdt = (DWORD *) (0x182000UL | (pdi->GdtLaddr & 0x00000fffUL));

/* point pptab at EMM's page table for the IDT, create a ptr */
    *(pd4g0 + 0x0181) = *(ppdir + (pdi->IdtLaddr >> 22));
    FlushTLB();
    /* setup page table and pointer for EMM's IDT */
    *(pd4g0 + 0x0184) = *(pptab + ((pdi->IdtLaddr >> 12) & 0x000003ffUL)) | 0x67U;
    *(pd4g0 + 0x0185) = *(pd4g0 + 0x0184) + 0x1000U;
    pidt = (DWORD *) (0x184000UL | (pdi->IdtLaddr & 0x00000fffUL));

/* open the code file in current .exe's directory */
    strcpy(fname, argv[0]);
    pc = fname;
    while( *pc++ ) ;
    while( *--pc != '\\' ) ;
    *++pc = '\0';
    strcat(fname, "VSCAPE32.BIN");
    if( !(fp = fopen(fname, "rb")) ) {
        printf("\007 error: could not open file \"%s\".\n", fname);
        goto exit;
    }

/* get the DOS memory for the GetPMI call, setup far ptr */
    if( !(tmp = DosMalloc(5*1024UL)) ) {
        printf("\007 error: could not alocate DOS memory.\n");
        goto exit;
    }
    dmsel = (WORD) (tmp >> 16);
    dmseg = (WORD) tmp;
    * (DWORD *) &pdm = 0UL;
    * ((WORD *) &pdm + 2) = dmsel;

/* get the first chunk of our file */
    fread(TmpBuff, 1, 1024, fp);

/* setup V32 config data pointer */
    pv32 = (V32_CONFIG *) &TmpBuff;

/* make the Get PMI call, copy VCPI data into V32 config */
    pv32->VcpiEntryOff = GetVcpi(dmseg);
    for( i = 0; i < 6; ++i )
        pv32->VcpiGentries[i] = pdm->VcpiGentries[i];

/* setup the VIVO GDT entries in V32 and data-out mem */
    pv32->VivoGentries[0] = pdr->VivoGentries[0] = pv32->VivoGentries[2] =
        pdr->VivoGentries[2] = (pdr->XmsPaddr << 16) | 0xffffU;
    tmp = (pdr->XmsPaddr & 0xff000000UL) |
        ((pdr->XmsPaddr >> 16) & 0x000000ffUL) | 0x004f9300UL;
```

```
        pv32->VivoGentries[1] = pdr->VivoGentries[1] = tmp    1x00000800UL;
        pv32->VivoGentries[3] = pdr->VivoGentries[3] = tmp;
        pv32->VivoGentries[4] = pdr->VivoGentries[4] = 0x0000ffffUL;
        pv32->VivoGentries[5] = pdr->VivoGentries[5] = 0x00cf9300UL;

/* fill out the rest of the V32 config memory */
        pv32->SharedDataP = ((DWORD) dsegment << 4) + pdi->SharedOff;
        pv32->MidivectOff = (DWORD) (midivect - 2) << 3;
        pv32->GetPmiOff = (DWORD) pdi->GetPmiOff;
        pv32->FixupOff = (DWORD) pdi->FixupOff;
        pv32->GetPmiSeg = pv32->FixupSeg = (DWORD) dsegment;
        pv32->I67LinkOff = (*(pidt + (0x67U << 1) + 1) & 0xffff0000UL) |
            (*(pidt + (0x67U << 1)) & 0x0000ffffUL);
        pv32->I67LinkSel = (WORD) (*(pidt + (0x67U << 1)) >> 16);
        pv32->HardwareOptions = 1 << phw->BoardType;
        pv32->BasePort = phw->BasePort;
        pv32->WavePort = phw->WavePort;
        pv32->SynthPort = phw->SynthPort;
        pv32->WaveIrq = phw->WaveIrq;
        pv32->MidiIrq = phw->MidiIrq;
        pv32->DmaChan = phw->DmaChan;
        pv32->ExtMidi = phw->ExtMidi & 0x7f;
        if( phw->BoardType == 0x00 )
            pv32->SynthVolL = pv32->SynthVolR = phw->SynthVol & 0x7f;
        else
            pv32->SynthVolL = pv32->SynthVolR = 0x7f;
#ifdef DEBUG
        fprintf(fd, "\nv32 Data ...\n");
        fprintf(fd, "VIVO GDT 0 %08lx %08lx\n", pv32->VivoGentries[0], pv32->VivoGentries[1]);
        fprintf(fd, "VIVO GDT 1 %08lx %08lx\n", pv32->VivoGentries[2], pv32->VivoGentries[3]);
        fprintf(fd, "VIVO GDT 2 %08lx %08lx\n", pv32->VivoGentries[4], pv32->VivoGentries[5]);
        fprintf(fd, "VCPI GDT 0 %08lx %08lx\n", pv32->VcpiGentries[0], pv32->VcpiGentries[1]);
        fprintf(fd, "VCPI GDT 1 %08lx %08lx\n", pv32->VcpiGentries[2], pv32->VcpiGentries[3]);
        fprintf(fd, "VCPI GDT 2 %08lx %08lx\n", pv32->VcpiGentries[4], pv32->VcpiGentries[5]);
        fprintf(fd, "SharedDataP %08lx\n", pv32->SharedDataP);
        fprintf(fd, "MidivectOff %08lx\n", pv32->MidivectOff);
        fprintf(fd, "v86GetPMI %08lx %08lx\n", pv32->GetPmiSeg, pv32->GetPmiOff);
        fprintf(fd, "v86Fixup %08lx %08lx\n", pv32->FixupSeg, pv32->FixupOff);
        fprintf(fd, "INT67 Link %04x %08lx\n", pv32->I67LinkSel, pv32->I67LinkOff);
        fprintf(fd, "VCPI Entry %04x %08lx\n", pv32->VcpiEntrySel, pv32->VcpiEntryOff);
        fprintf(fd, "Hardware Opts %04x\n", pv32->HardwareOptions);
        fprintf(fd, "Ports %04x %04x %04x\n", pv32->BasePort, pv32->WavePort, pv32->SynthPort);
        fprintf(fd, "IRQS %02x %02x\n", pv32->WaveIrq, pv32->MidiIrq);
        fprintf(fd, "DMA %02x\n", pv32->DmaChan);
endif /* make entries in page table at 0x200000+ for our code, make pointer */
        for( i = 0, tmp = (pdr->XmsPaddr & 0xffff000UL) | 0x67;
            i < NUM_CODEPAGES + 1; ++i, tmp += 0x1000U )
            *(pd4g0 + 0x0200 + i) = tmp;
        pxms = (DWORD *) (0x200000UL | (pdr->XmsPaddr & 0x00000fffUL));

/* copy first file chunk up to Extended Memory */
        for( i = 0; i < 256; ++i )
            *pxms++ = TmpBuff[i];

/* now copy the rest of the code file up */
        while( !feof(fp) ) {
            j = (fread(TmpBuff, 1, 1024, fp) + 3) >> 2;
            for( i = 0; i < j; ++i )
                *pxms++ = TmpBuff[i];
        }

/* The next section will fill-in unused entries in the DOS4GW */
        /* page table at lin-addr 0x180000+ and setup some pointers to allow */
        /* us to access the page table, GDT, and IDT of the EMM. */

/* fill in the EMM's page-table-zero with our XMS entries */
        *(pd4g0 + 0x0181) = *ppdir;
        FlushTLB();
        for( i = (WORD) (pdr->XmsPaddr >> 12), tmp = pdr->XmsPaddr | 0x67U;
            i < (WORD) (pdr->XmsPaddr >> 12) + 25; ++i, tmp += 0x1000U )
            *(pptab + i) = tmp;
```

ENSQ-0153    103    PATENT

```c
    /* find a GDT space to patch starting from top */
    for( i = ((pdi->GdtLimit + 1) >> 2) - 2; i >= 2; i -= 2 )
        if( !(*(pgdt + i + 1)) )
            break;
    if( i < 2 ) {
        printf("\007 error: could not install service vectors.\n");
        return;
    }
    i -= 4;

#ifdef DEBUG
    fprintf(fd, "\nBase Selector %04x\n", i << 2);
#endif
    /* patch the GDT with our three service entries */
    *(pgdt + i) = *(pgdt + i + 2) = pdr->VivoGentries[0];
    *(pgdt + i + 1) = pdr->VivoGentries[1];
    *(pgdt + i + 3) = pdr->VivoGentries[3];
    *(pgdt + i + 4) = pdr->VivoGentries[4];
    *(pgdt + i + 5) = pdr->VivoGentries[5];

/* initialize some hardware ... */
    inp(phw->BasePort + 0x08);
    outp(phw->BasePort + 0x02, 0x03);     // NMI clr
    outp(phw->BasePort + 0x02, 0x00);     // UART reset
    outp(phw->BasePort + 0x06, 0x00);
    outp(phw->BasePort + 0x08, 0xfe);     // no Otto ints yet
    outp(phw->BasePort + 0x09, 0xaa);
    outp(phw->BasePort + 0x0a, 0x08);
    outp(phw->BasePort + 0x04, 0x03);
    outp(phw->BasePort + 0x05, 0x80 | (phw->DmaChan << 4));
    outp(phw->BasePort + 0x04, 0x04);
    outp(phw->BasePort + 0x05,
        (phw->WaveIrq == 9 ? 0x00 : phw->WaveIrq == 5 ? 0x04 : 0x08) |
        (phw->MidiIrq == 9 ? 0x00 : phw->MidiIrq == 7 ? 0x02 : 0x03));
    outp(phw->BasePort + 0x04, 0x06);
    outp(phw->BasePort + 0x05, 0x00);

outp(phw->WavePort, 0x0c);
    outp(phw->WavePort + 1, 0x50);
    outp(phw->WavePort, 0x49);
    outp(phw->WavePort + 1, 0x04);
    outp(phw->WavePort, 0x48);
    outp(phw->WavePort + 1, 0x00);
    outp(phw->WavePort, 0x0a);
    outp(phw->WavePort + 1, 0x80);
    outp(phw->WavePort, 0x1b);
    outp(phw->WavePort + 1, 0x08);
    outp(phw->WavePort, 0x10);
    outp(phw->WavePort + 1, 0x80);
    outp(phw->WavePort, 0x11);
    outp(phw->WavePort + 1, 0xc0);
    outp(phw->WavePort, 0x00);
    outp(phw->WavePort + 1, 0x8c);
    outp(phw->WavePort, 0x01);
    outp(phw->WavePort + 1, 0x8c);
    outp(phw->WavePort, 0x06);
    outp(phw->WavePort + 1, (phw->WaveVol ^ 0x7f) >> 1);
    outp(phw->WavePort, 0x07);
    outp(phw->WavePort + 1, (phw->WaveVol ^ 0x7f) >> 1);
    outp(phw->WavePort, 0x02);
    outp(phw->WavePort + 1, (phw->CdAuxVol ^ 0x7f) >> 2);
    outp(phw->WavePort, 0x03);
    outp(phw->WavePort + 1, (phw->CdAuxVol ^ 0x7f) >> 2);

/* now create the IDT entries for our NMI, MIDI, DOS and Int67 services */
    ClrI();
    tmp = (DWORD) i << 18;
    *(pidt + (0x02U << 1)) = tmp;
    *(pidt + (0x02U << 1) + 1) = 0x00008e00UL;
    *(pidt + ((WORD) midivect << 1)) = tmp | 0x0004U;
    *(pidt + ((WORD) midivect << 1) + 1) = 0x00008e00UL;
    *(pidt + (0x67U << 1)) = tmp | 0x000cU;
```

```
    *(pidt + (0x67U << 1) + 1) = 0x0000ee00UL;
    SetI();
#ifdef DEBUG
    fprintf(fd, "\nv86 Resident Data ...\n");
    fprintf(fd, "VIVO GDT 0 %081x %081x\n", pdr->VivoGentries[0], pdr->VivoGentries[1]);
    fprintf(fd, "VIVO GDT 1 %081x %081x\n", pdr->VivoGentries[2], pdr->VivoGentries[3]);
    fprintf(fd, "VIVO GDT 2 %081x %081x\n", pdr->VivoGentries[4], pdr->VivoGentries[5]);
    fprintf(fd, "XMS Paddr %081x\n", pdr->XmsPaddr);
    fprintf(fd, "Num Code Pages %04x\n", pdr->NumCodePages);
#endif
    /* fill-out the rest of the resident data struct */
    pdr->NumCodePages = NUM_CODEPAGES;
exit:
    if( dmsel )
        DosFree(dmsel);
    if( fp )
        fclose(fp);
#ifdef DEBUG
    fclose(fd);
endif return;
}

/* This function invokes the DPMI INT-31h call for allocating DOS memory. */

DWORD DosMalloc(DWORD size) { union REGS   r;

r.w.bx = (WORD) ((size + 15) >> 4);
        r.w.ax = 0x0100;
        int386(0x31, &r, &r);

if( r.w.cflag )
                return 0UL;

return (r.x.edx << 16) | r.w.ax;
}

/* This function invokes the DPMI INT-31h call for freeing DOS memory. */ void DosFree(WORD selector) { union REGS   r;

r.w.dx = selector;
        r.w.ax = 0x0101;
        int386(0x31, &r, &r);

return;
}

/* This function invokes the DOS-mode VCPI INT-67h call for acquiring the */
/* protected-mode interface. */

DWORD GetVcpi(WORD dmseg) { union REGS    r;
        struct SREGS  s;
        static struct {
            DWORD    edi;
            DWORD    esi;
            DWORD    ebp;
            DWORD    zero;
            DWORD    ebx;
            DWORD    edx;
            DWORD    ecx;
            DWORD    eax;
```

ENSQ-0153                                  105                              PATENT

```
        WORD    flags;
        WORD    es;
        WORD    ds;
        WORD    fs;
        WORD    gs;
        WORD    ip;
        WORD    cs;
        WORD    sp;
        WORD    ss;
    } RmRegs = { 0UL, 0x1000UL, 0UL, 0UL, 0UL, 0UL, 0UL, 0x0000de01UL,
                 0x3000, 0U, 0U, 0U, 0U, 0U, 0U, 0x1400U, 0U};

RmRegs.ds = dmseg;
    RmRegs.es = dmseg;
    RmRegs.ss = dmseg;

segread(&s);
    r.w.ax = 0x0300;
    r.w.bx = 0x0067;
    r.w.cx = 0;
    r.x.edi = (DWORD) &RmRegs;
    s.es = s.ds;
    int386x(0x31, &r, &r, &s);

return RmRegs.ebx;
}
```

What is claimed:

1. A method of providing device virtualization to an application running under a DOS extender within a protected-mode context created for said DOS extender within in a DOS-based operating system environment of a processor at run-time, said protected-mode context created for said DOS extender including an interrupt descriptor table for said DOS extender (DOS extender IDT), comprising the steps of:

storing device emulation code at a predetermined address in a memory accessible to said processor;

detecting a request from said DOS extender to switch to protected-mode;

upon detection of said request by said DOS extender, patching said DOS extender IDT, at run-time, to include a vector to said device emulation code for a predetermined interrupt; and when said processor detects said predetermined interrupt during execution of said application, said processor referencing said vector to said device emulation code patched into said DOS extender IDT.

2. The method of claim 1, wherein said predetermined address is in extended memory addressable by said processor, and said storing step comprises the step of storing said device emulation code at said predetermined address at boot-time.

3. The method of claim 1, wherein said DOS-based operating system environment includes a virtual control program interface (VCPI) through which said DOS extender acquires said protected-mode context, said detecting step comprising the steps of:

intercepting communications between said DOS extender and said VCPI during said execution of said application; and detecting startup of said DOS extender when a communication from said DOS extender to said VCPI is said request to switch to protected-mode.

4. The method of claim 1, wherein said step of patching said DOS extender IDT includes the steps of:

intercepting said request to said VCPI to switch to protected-mode, said request including a page directory of said DOS extender;

switching a page directory of a protected-mode context of said processor to said page directory of said DOS extender;

accessing said DOS extender IDT and searching for said vector to said device emulation code;

if said DOS extender IDT does not include said vector to said device emulation code, searching a global descriptor table of said DOS extender (DOS extender GDT) to determine what selector value corresponds to said device emulation code and then entering said selector value for said device emulation code into said DOS extender IDT;

switching said page directory back to said page directory of said protected mode context of said processor; and jumping to said VCPI to execute said request to switch to protected-mode.

5. The method of claim 1, wherein said predetermined interrupt is a non-maskable interrupt which is generated when said application attempts to address a predetermined address related to the device to be emulated.

6. A system which provides device virtualization to an application running under a DOS extender in a DOS-based operating system environment of a processor, said DOS extender executing within a protected-mode context created for said DOS extender within said DOS-based operating system environment of said processor at run-time, said protected-mode context created for said DOS extender including an interrupt descriptor table for said DOS extender (DOS extender IDT), said system comprising:

device emulation code stored at a predetermined address in a memory accessible to said processor;

a detection program which detects a request from said DOS extender to switch to protected-mode; and a driver which operates in said protected-mode context of said DOS extender and which, upon detection by said detection program of said request from said DOS extender to switch to protected-mode, patches said DOS extender IDT, at run-time, to include a vector to said device emulation code for a predetermined interrupt, whereby, when said processor detects said predetermined interrupt during execution of said application, said processor references said vector to said device emulation code patched into said DOS extender IDT by said driver.

7. The system of claim 6, wherein said predetermined address is in extended memory addressable by said processor, and said device emulation code is stored at said predetermined address at boot-time.

8. The system of claim 6, wherein said DOS-based operating system environment includes a virtual control program interface (VCPI) through which said DOS extender acquires said protected-mode context, and said detection program is a terminate-and-stay-resident (TSR) program which intercepts communications between said DOS extender and said VCPI during said execution of said application, said detection program detecting startup of said DOS extender when a communication from said DOS extender to said VCPI is said request to switch to protected-mode.

9. The system of claim 8, wherein said driver installs its interrupt vectors into the DOS extender IDT upon detection of said request to switch to protected-mode from said DOS extender to said VCPI, said interrupt vectors including said vector to said device emulation code for said predetermined interrupt, thereby making said device emulation code available to said DOS extender and said application in said protected-mode context of said DOS extender.

10. The system of claim 8, wherein said DOS extender sends said request to switch to protected-mode to said VCPI at system startup and again during execution of said application running under said DOS extender, said request including at least the following parameters: physical address of a Page Directory and a linear address and size of the DOS extender IDT and a global descriptor table of said DOS extender.

11. The system of claim 6, wherein said predetermined interrupt is a non-maskable interrupt which is generated when said application attempts to address a predetermined address related to the device to be emulated.

* * * * *